(12) United States Patent
Aldridge et al.

(10) Patent No.: US 10,986,267 B2
(45) Date of Patent: Apr. 20, 2021

(54) SYSTEMS AND METHODS FOR GENERATING TIME DELAY INTEGRATION COLOR IMAGES AT INCREASED RESOLUTION

(71) Applicant: LYNX SYSTEM DEVELOPERS, INC., Haverhill, MA (US)

(72) Inventors: Jeremy W. Aldridge, Evansville, IN (US); Kirk Sigel, Ithaca, NY (US); Douglas DeAngelis, Ipswich, MA (US); Mike E. Ciholas, Evansville, IN (US)

(73) Assignee: LYNX SYSTEM DEVELOPERS, INC., Haverhill, MA (US)

( * ) Notice: Subject to any disclaimer, the term of this patent is extended or adjusted under 35 U.S.C. 154(b) by 0 days.

(21) Appl. No.: 16/531,983

(22) Filed: Aug. 5, 2019

(65) Prior Publication Data
US 2020/0036891 A1 Jan. 30, 2020

Related U.S. Application Data

(63) Continuation of application No. 14/263,532, filed on Apr. 28, 2014, now Pat. No. 10,375,300.

(51) Int. Cl.
*H04N 5/232* (2006.01)
*H04N 5/235* (2006.01)
*H04N 5/374* (2011.01)

(52) U.S. Cl.
CPC ....... *H04N 5/23232* (2013.01); *H04N 5/2355* (2013.01); *H04N 5/3743* (2013.01)

(58) Field of Classification Search
CPC . H04N 5/23232; H04N 5/3743; H04N 5/2355
See application file for complete search history.

(56) References Cited

U.S. PATENT DOCUMENTS

| 4,743,971 | A | 5/1988 | Hugli |
| 5,500,904 | A | 3/1996 | Markandey et al. |
| 5,657,077 | A | 8/1997 | Deangelis et al. |
| 6,545,705 | B1 | 4/2003 | Sigel |
| 6,683,293 | B1* | 1/2004 | Wen ........................ H04N 5/335 250/208.1 |

(Continued)

OTHER PUBLICATIONS

"Restoration of images captured by a staggered time delay and integration camera in the presence of mechanical vibrations"—Gadi Hochman, Yitzhak Yitzhaky, Norman S. Kopeika, Yair Lauber, Meira Citroen, and Adrian Stern; Aug. 1, 2004, vol. 43, No. 22, Applied Optics (Year: 2004).*

*Primary Examiner* — Mainul Hasan
(74) *Attorney, Agent, or Firm* — Lathrop GPM LLP

(57) ABSTRACT

A method for generating time delay integration color images at increased resolution includes (a) capturing sequential digital two-dimensional color images of a scene using an area scan color image sensor including lines of color sensor pixels, wherein each color sensor pixel including a Bayer-type array of photosites, and (b) processing the sequential digital two-dimensional color images to generate a time delay integration color image of an object moving in the scene, wherein the processing includes increasing resolution of the time delay integration color image by including crossover pixels formed by combining photosites from sequentially captured two-dimensional color images.

17 Claims, 34 Drawing Sheets

(56) References Cited

U.S. PATENT DOCUMENTS

| | | | |
|---|---|---|---|
| 7,268,814 B1* | 9/2007 | Pain | H04N 5/3575 348/294 |
| 2002/0149679 A1 | 10/2002 | DeAngelis et al. | |
| 2003/0006364 A1* | 1/2003 | Katzir | H04N 5/37455 250/208.1 |
| 2003/0034988 A1 | 2/2003 | Raskar | |
| 2003/0035510 A1 | 2/2003 | Strommer | |
| 2004/0175028 A1* | 9/2004 | Cavan | G06T 3/4069 382/145 |
| 2006/0044630 A1 | 3/2006 | Feng | |
| 2006/0158526 A1 | 7/2006 | Kashiwa et al. | |
| 2008/0144898 A1 | 6/2008 | Hunt | |
| 2009/0141138 A1 | 6/2009 | DeAngelis | |
| 2010/0046853 A1 | 2/2010 | Goodnough et al. | |
| 2011/0115793 A1* | 5/2011 | Grycewicz | H04N 5/349 345/428 |
| 2011/0315834 A1 | 12/2011 | Lukic et al. | |
| 2012/0106944 A1 | 5/2012 | Johnson | |
| 2012/0203112 A1 | 8/2012 | Lazebnik | |
| 2013/0141602 A1 | 6/2013 | Kuriyama | |
| 2013/0148013 A1 | 6/2013 | Shiohara | |
| 2013/0300937 A1 | 11/2013 | Williams et al. | |
| 2013/0342674 A1* | 12/2013 | Dixon | G02B 21/36 348/79 |
| 2014/0085518 A1 | 3/2014 | Fox | |
| 2014/0184847 A1* | 7/2014 | Fujita | H04N 5/2354 348/222.1 |
| 2014/0204206 A1 | 7/2014 | Itoi et al. | |
| 2015/0015675 A1 | 1/2015 | Richard | |
| 2015/0312493 A1 | 10/2015 | Aldridge et al. | |
| 2015/0312494 A1 | 10/2015 | Aldridge et al. | |
| 2015/0312504 A1 | 10/2015 | Aldridge et al. | |

\* cited by examiner

SYSTEMS AND METHODS FOR GENERATING TIME DELAY INTEGRATION COLOR IMAGES AT INCREASED RESOLUTION

CROSS-REFERENCE TO RELATED APPLICATIONS

This application is a continuation of U.S. patent application Ser. No. 14/263,532, filed Apr. 28, 2014, which is incorporated herein by reference in its entirety.

BACKGROUND

Photo finish cameras capture images of a finish line to accurately time stamp when a race participant crosses the finish line and to separate two or more race participants. Line scan cameras have proven useful as photo finish cameras, because the finish line is projected onto the length of a linear detector of the line scan camera. The line scan camera captures a series of consecutive images as race participants cross the finish line and then stitches them together to form a two-dimensional representation of the participants. Since line scan cameras contain only a single line of pixels, signal processing is fast and the cameras can operate at high frame rates. Accordingly, line scan cameras provide high time resolution and therefore accurate timing of events.

SUMMARY

In an embodiment, a system processes event timing images and includes: area scan image sensor for generating sequential digital two-dimensional images of a scene; and time delay integration module for processing the sequential digital two-dimensional images to generate a time delay integration image of a moving object in the scene.

In an embodiment, a method for processing event timing images comprises: capturing sequential digital two-dimensional images of a scene using an area scan image sensor; and processing the sequential digital two-dimensional images to generate a time delay integration image of an object moving in the scene.

In an embodiment, a method for processing a plurality of input images associated with a respective plurality of input times, the input images and input times being provided by an event timing system, comprises: selecting an output frame rate; generating a plurality of output images, corresponding to the output frame rate, from the plurality of input images; and assigning to each output image a final output time provided by the event timing system, the final output time being the input time associated with an input image contributing to the output image.

In an embodiment, a method for processing images and associated event times provided by an event recording and timing system comprises: receiving (a) images and associated times and (b) a correspondence between times and events; selecting events of interest; and automatically discarding images not associated with an event of interest, using a processor and machine readable instructions.

In an embodiment, a system is provided for recording and timing of events, and includes: a camera system for capturing images of the events and comprising a clock; an event recorder for detecting the events and being communicatively coupled with the clock; and a data processing system capable of assigning times provided by the clock to the images captured by the camera system and events detected by the event recorder.

In an embodiment, an area scan image sensor includes: a plurality of color pixels, each color pixel comprising three different photosite types sensitive to three different colors, the photosites being arranged in a 3×3 array such that each row and each column of 3×3 array comprises the three photosite types and every row and column has photosite configuration different from any other row and column, respectively.

In an embodiment, a system for processing event timing images includes: a camera comprising (a) an area scan image sensor for capturing images of a scene including a line and (b) a level; an adjustable mount coupled with the camera; and an alignment control system for automatically adjusting the mount to align the camera with respect to the line.

In an embodiment, a system for processing event timing images includes: a camera comprising an image sensor for capturing images and a video generator for generating scoreboard type video; and a data processing module, communicatively coupled with the camera, for generating results data from images received from the camera and communicating the results data to the video generator.

In an embodiment, a software product includes instructions, stored on non-transitory computer-readable media, wherein the instructions, when executed by a computer, perform steps for processing sequential digital two-dimensional images of a scene comprising a moving object to form a time delay integration image, and wherein the instructions include instructions for segmenting at least of portion of each of the sequential digital two-dimensional images into input lines; and instructions for populating each line of the time delay integration image with an integral over a plurality of input lines, each of the plurality of input lines being selected from a different one of the sequential digital two-dimensional images to substantially match the movement of the moving object in a direction perpendicular to the input lines.

In an embodiment, a software product includes instructions, stored on non-transitory computer-readable media, wherein the instructions, when executed by a computer, perform steps for processing a plurality of input images associated with a respective plurality of input times, the input images and input times being provided by an event timing system, and wherein the instructions include: instructions for selecting an output frame rate; instructions for generating a plurality of output images, corresponding to the output frame rate, from the plurality of input images; and instructions for assigning to each output image a final output time provided by the event timing system, the final output time being the input time associated with an input image contributing to the output image.

DETAILED DESCRIPTION OF THE EMBODIMENTS

Disclosed herein are systems and methods for processing event timing images. In certain embodiments, such systems utilize area scan image sensors that capture a plurality of two-dimensional images of a scene, such as the finish line area of a race. The plurality of two-dimensional images are processed by a time delay integration module, separate from the area scan image sensor, to generate a time delay integration (TDI) image. Since time delay integration is performed separately from the image sensor, after image readout, the time delay integration process may be flexibly optimized during or after image capture.

Figure 1:
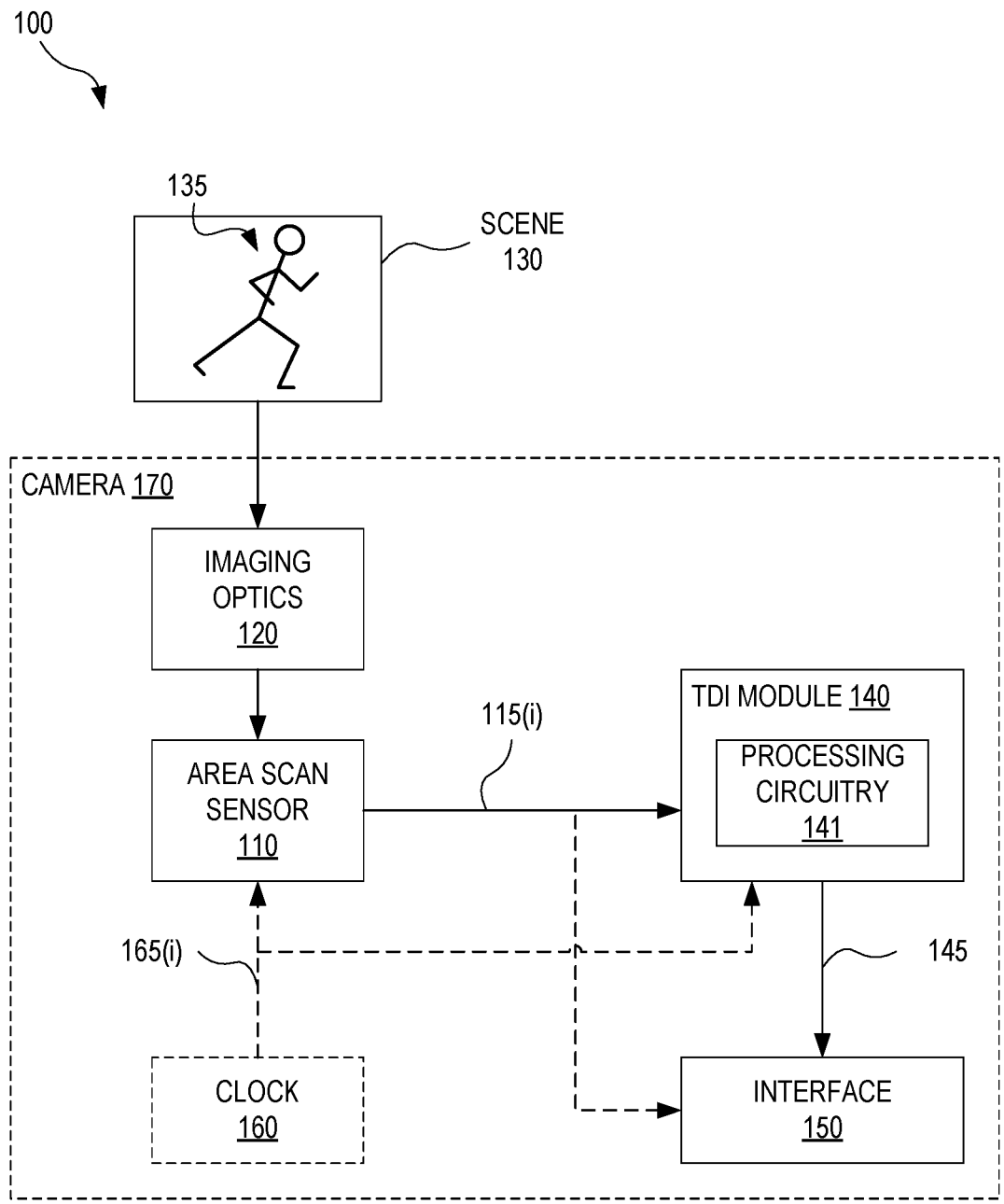
FIG. 1 illustrates a system for processing event timing images, according to an embodiment.

FIG. 1 illustrates one exemplary system 100 for processing event timing images. System 100 is for example useful in an event to capture images of a runner, car, or other type of race participant (shown as object 135) passing a finish line. System 100 includes an area scan image sensor 110 for capturing digital two-dimensional images 115 of a scene 130 imaged onto area scan image sensor 110 by imaging optics 120. System 100 further includes a time delay integration (TDI) module 140, an interface 150, and an optional clock 160 providing a time signal for area scan image sensor 110 and TDI module 140. TDI module 140 includes image processing circuitry 141. TDI module 140 optionally associates a capturing time 165, received from clock 160, with each digital two-dimensional image 115. TDI module 140 receives the series of consecutive digital two-dimensional images 115(i) from area scan image sensor 110 and processes image series 115(i) to provide TDI. Based thereupon, TDI module 140 outputs a single, integrated TDI image 145, which provides a snapshot in time of object 135 as it moves through scene 130.

In the prior art, TDI is performed on an image sensor as part of a readout process, and charges or voltages are added directly onboard the image sensor before TDI images are read. In the embodiment of system 100, on the other hand, image processing by TDI module 140 is performed externally to image sensor 110 and after readout of images 115, as shown in FIG. 1, and involves post-processing of digital images 115 rather than changes to pixel voltages or charges at image sensor 110.

Imaging optics 120, area scan sensor 110, TDI module 140, interface 150, and optional clock 160 may be integrated into a camera 170. In an alternative embodiment, TDI module 140 and interface 150 are implemented at an external device or computer (not shown in FIG. 1). Area scan image sensor 110 is for example a CMOS area scan image sensor configured with a global or rolling shutter, where the latter may be implemented with global or rolling reset. Image processing circuitry 141 is for example a field programmable gate array (FPGA) configured to process image series 115 and produce TDI image 145. Interface 150 communicates images to a user or an external computer and optionally facilitates control of TDI module 140. In certain embodiments, interface 150 is a wireless interface such as a WiFi or Bluetooth interface.

In an embodiment, image processing circuitry 141 includes machine-readable instructions encoded in non-volatile memory and a processor for executing these machine-readable instructions to generate TDI image 145 from image series 115. In another embodiment, image processing circuitry 141 includes volatile memory, for receiving machine-readable instructions encoded in non-volatile memory located elsewhere, and a processor for executing these machine-readable instructions to generate TDI image 145 from image series 115. For example, volatile memory of image processing circuitry 141 may receive machine-readable instructions from an erasable programmable read only (EPROM) memory or Flash memory coupled with system 100. In yet another embodiment, TDI module 140 includes machine-readable start-up instructions encoded in non-volatile memory, for example in the form of a boot record, which are executed upon starting system 100. The start-up instructions include instructions for retrieving through interface 150, and loading to image processing circuitry 141, machine-readable image processing instructions for processing digital two-dimensional images 115(i), and optionally capturing times 165, as discussed above. The start-up instructions may be stored in flash memory within TDI module 140. The image processing instructions are, for example, stored in a non-volatile memory within an external control system.

Figure 2:
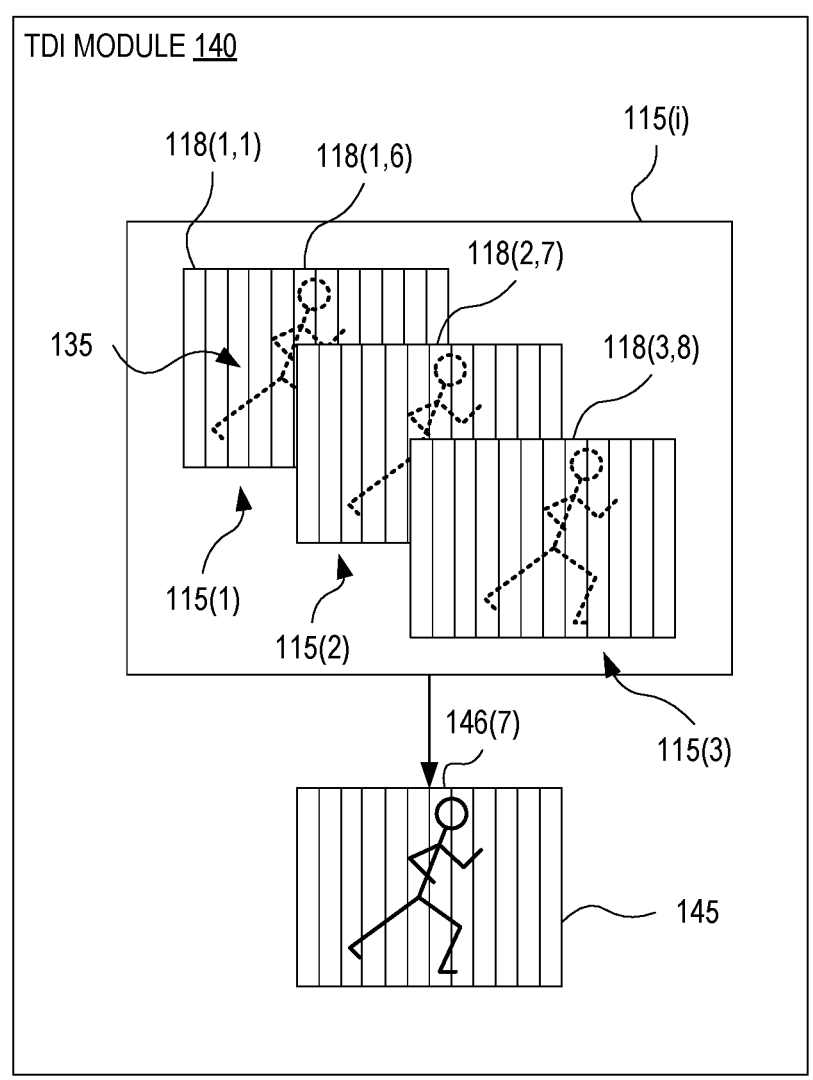
FIG. 2 shows a schematic transform of consecutive images into a time delay integration image performed by system of FIG. 1, according to an embodiment.
Figure 3:
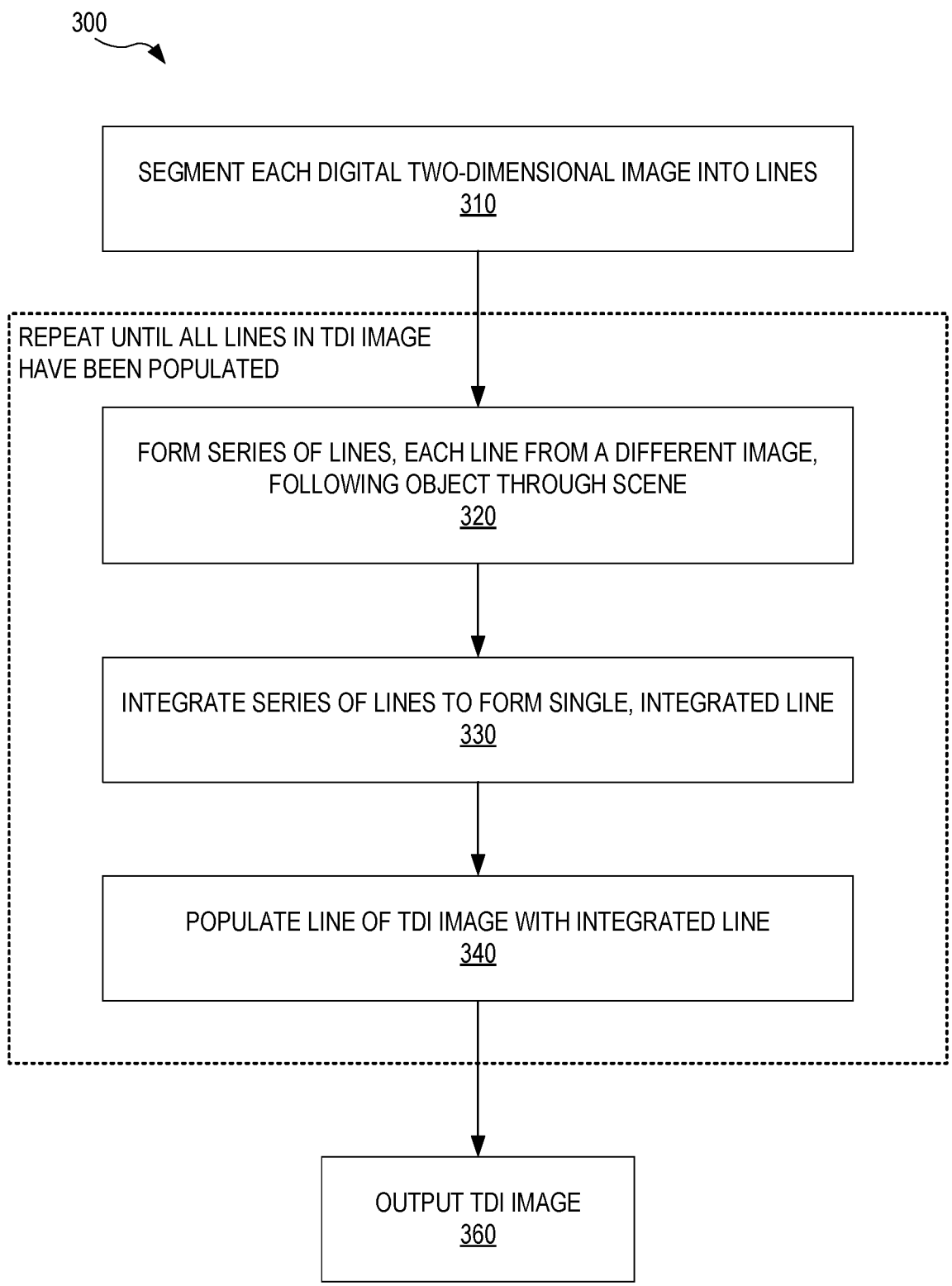
FIG. 3 illustrates a method for processing event timing images, according to an embodiment.

FIG. 2 shows one exemplary schematic transform 200 of consecutive digital two-dimensional images 115 into TDI image 145 performed by TDI module 140 using image processing circuitry 141. FIG. 3 shows one exemplary method 300 for TDI used by TDI module 140 in this process. FIGS. 2 and 3 are best considered together in the following description. In FIG. 2, each line 146(j) in TDI image 145 is an integral of a series of lines 118(i,j), where each line 118(i,j) is extracted from a different two-dimensional image 115(i). In an embodiment, the frame rate at which two-dimensional images 115(i) are captured, and the pitch between adjacent lines 118(i,j) measured in image space, are set to substantially match the speed of an object of interest moving through scene 130 (such that object 135 progresses through successive lines 118(i,j) at a rate of one line per frame). A "line" as used herein refers to image data formed by or into a single column or row of a two dimensional image. In a use scenario concerned with the timing of race participants crossing a finish line, lines 118 are advantageously oriented to be substantially parallel to the image of the finish line. It is further beneficial to align system 100 such that the finish line image coincides with given line 118.

In a step 310 of method 300, TDI module 140 segments each digital two-dimensional image 115 within the image series 115(i) into lines 118(i,j), where i indicates the image and j indicates the line within that image (not all lines are labeled in FIG. 2 for clarity of illustration). In one embodiment, TDI module 140 segments images 115 into lines 118, where images 115 are received by TDI module 140 from an external source in the form of two-dimensional images. In another embodiment, TDI module 140 receives images 115 in the form of lines 118 and step 310 is executed as an integral part of the receiving process.

TDI image 145 is also composed of multiple lines 146(i) (though only line 146(7) is labeled in FIG. 2 for clarity of illustration). In particular, in a step 320, TDI module 140 forms a series of lines 118(i,j), where each line is extracted from a different image 115(i). As object 135 moves through scene 130, the captured image of object 135 moves across lines 118(i,j). For example, as shown in FIG. 2, a particular portion of object 135 (the runner's torso) is located in line 118(1,6) in image 115(1), in line 118(2,7) in image 115(2), and in line 118(3,8) in image 115(3). The series of lines 118(i,j) formed in step 320 tracks the movement of object 135 as it progresses through sequentially captured images 115(i).

In a step 330, TDI module 140 integrates the series of lines 118(i,j) to form a single, integrated line 146(j). For example, the n'th pixel of the integrated line is the sum of all n'th pixels in the series of lines 118(i,j). In a step 340, line 146(j) of TDI image 145 is set to equal the integrated line generated in step 330. Using the example of the runner's torso in FIG. 2, line 118(1,6) from image 115(1), line 118(2,7) from image 115(2), and line 118(3,8) from image 115(3) are integrated in step 330 to form a single, integrated line 146(7). Step 330 may utilize fractional TDI, wherein the single, integrated line 146(7) is the integral of a non-integer number of lines 118(i,j). For example, line 146(7) may be formed as the line 118(1,6)+line 118(2,7)+x line 118(3,8), where x is a number greater than zero and smaller than one. Fractional TDI is discussed further in connection with method 900 of FIG. 9.

Steps 320 through 340 are repeated until all lines 146(j) of TDI image 145 have been generated. Note that different subsets of an image series 115(i) may be used to generate different lines 146(j) of TDI image 145.

In a step 360, the TDI image is outputted. For example, TDI module 140 (FIG. 1) outputs TDI image 145 to interface 150. Interface 150 may be connected to an external system, such as an external processing system, whereby TDI module 145 outputs the TDI image to the external processing system.

In the example in FIG. 2, three consecutive images 115(1), 115(2), and 115(3) are processed by TDI module 140 to generate TDI image 145. As object 135 moves through scene 130, the position of object 135 shifts by one line for each successive frame. A particular portion of object 135 (the runner's torso) is located in line 118(1,6) in image 115(1), in line 118(2,7) in image 115(2), and in line 118(3,8) in image 115(3). Line 146(7) of TDI image 145 is the integral of lines 118(1,6) of image 115(1), 118(2,7) of image 115(2), and 118(3,8) of image 115(3). Although similar to image 115(3), TDI image 145 shows object 135 with greater brightness and improved signal-to-noise ratio. Accordingly, images may be captured by area scan image sensor 110 at a higher frame rate to match the speed of a faster moving object, or in inferior lighting environments, as compared to systems not utilizing TDI processing of FIGS. 1-3. Without TDI processing, slower frame rates are required to capture images of sufficient sensitivity to identify objects of interest, resulting in coarser time resolution.

As illustrated in FIG. 2, TDI image 145 is suitable for timing of object 135 passing a line, such as a finish line, that is located to correspond to line 146(7) of TDI image 145. Accordingly, TDI image 145 may be given a timestamp that is the time associated with image 115(2), such as the capture time of image 115(2). The example thus illustrated in FIG. 2 may be modified for timing of object 135 passing a line that corresponds to another line 146(i) of TDI image 145, without departing from the scope hereof. For example, line 146(8) of TDI image 145 may be populated with the integral of lines 118(1,6) of image 115(1), 118(2,7) of image 115(2), and 118(3,8) of image 115(3), and the resulting TDI image 145 may be given a timestamp that is the time associated with image 115(3). Generally, the integrals contributing to TDI image 145 may be performed with any line 146(i) of TDI image 145 corresponding to a finish line, or other timing line. Consistent therewith, TDI image 145 may be given a timestamp that is the time of any image 115 contributing to TDI image 145.

Image processing circuitry 141 of TDI module 140 (FIG. 1) may be configured to process images 115(i) by assuming a direction of movement of objects passing through the scene, as discussed in connection with FIGS. 2 and 3. The processing performed by image processing circuitry 141 of TDI module 140 may also be adapted to optimize for different directions of object movement. In one embodiment, area scan image sensor 110 is implemented as a rectangular array of pixels, and lines 118(i,j) of images 115 are naturally oriented to coincide with either rows or columns of pixels of area scan image sensor 110. For each of these two orientations of lines 118(i,j), images 115 are processed to optimize for object movement in either of the two directions perpendicular to lines 118(i,j). An image series 115(i) may be processed by image processing circuitry 141 of TDI module 140 in several different ways to provide several different TDI images, each optimized for different directions of object movement.

In one embodiment, lines 118(i,j) of image 115(i) represent the full number of either rows or columns of area scan image sensor 110, implemented as a rectangular array of pixels, corresponding to using the full active area of area scan image sensor 110. In another embodiment, images 115 include only a portion of the active area, such that lines 118(i,j) of image 115(i) represent only a subset of the rows and/or columns of area scan image sensor 110. In yet another embodiment, image 115 includes the full active area but only a portion thereof is utilized by TDI module 140, such that lines 118(i,j) of image 115(i) represent only a subset of the rows and/or columns of area scan image sensor 110.

In certain embodiments, steps 320 through 360 are repeated for two different, non-contiguous portions of the active area of area scan image sensor 110 to generate two respective TDI images representative of different subsets of a scene. For example, area scan image sensor 110 and imaging optics 120 may be aligned such that the finish line of a race intersects the optical axis of imaging optics 120. One selected portion of images 115 captured by area scan image sensor 110 of a scene 130 shows race participants crossing the finish line of a race, while another selected portion of images 115 shows race participants crossing a secondary "pre-finish line", located before the actual finish line. In the TDI image generated from the finish line portion of images 115, race participants may occlude each other. Since the pre-finish line does not intersect the optical axis of imaging optics 120, the TDI image generated from the pre-finish line portion of images 115 will show race participants in a more frontal view. Race participants may therefore be more easily separated in the view provided by the pre-finish line TDI image.

The systems and methods of FIGS. 1-3 differ from prior art charge-coupled devices (CCD) systems directly outputting a TDI image. In the prior art CCD, photo-induced charges accumulated at different times, and at different locations on the CCD, are integrated as part of a synchronized image sensor readout process to generate the TDI image. In contrast, the systems and methods of FIGS. 1-3 are based on generation of two-dimensional images and the image pixel values of these two-dimensional images are processed outside the image sensor to generate a TDI image, enabling post-capture optimization of a variety of aspects of a TDI image. Such aspects include, but are not limited to, TDI image brightness, dynamic range, sharpness, noise level, and resolution (see, for example, FIGS. 4-18). Furthermore, the presently disclosed systems and methods for generating TDI images generate and/or utilize two-dimensional images that may be used for other purposes than TDI, such as camera alignment (FIGS. 27-31) or video generation (FIGS. 32-34); and different portions of the two-dimensional images generated may be processed and/or utilized differently (see, for example, FIGS. 3, 10, 11, and 19).

Figure 4:
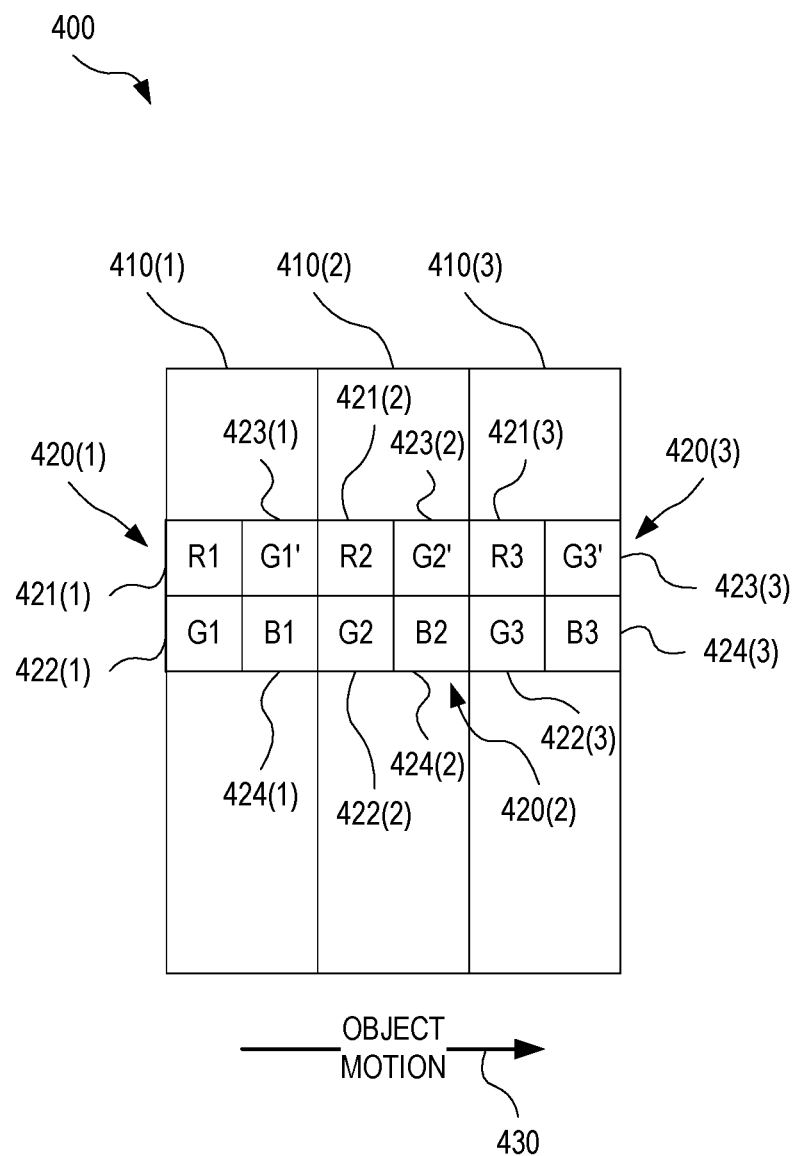
FIG. 4 illustrates a Bayer type color area scan image sensor for capturing event timing images, according to an embodiment.

FIG. 4 illustrates one exemplary Bayer type color area scan image sensor 400. Color area scan image sensor 400 is an embodiment of area scan image sensor 110 of FIG. 1. Color area scan image sensor 400 includes a Bayer type pixel array. In the present disclosure, a Bayer type pixel array is a type of pixel array wherein each color pixel is composed of one first-type photosite sensitive to a first color, one second-type photosite sensitive to a second color, and two third-type photosites sensitive to a third color. Each color pixel 420 of color area scan image sensor 400 is composed of four photosites 421, 422, 423, and 424. In an embodiment, photosite 421 is sensitive to red (R) light, photosites 422 and 423 are sensitive to green (G) light, and photosite 424 is sensitive to blue (B) light. Color area scan image sensor 400 is illustrated in FIG. 4 as having three lines 410(1), 410(2), and 410(3) of color pixels. In an embodiment, lines 410 are oriented substantially perpendicular to the direction of motion of an object, for example object 135 (FIG. 1). Each line 410 includes multiple color pixels 420. Only one color pixel 420 is illustrated for each line 410 in FIG. 4. Line 410(1) includes a color pixel 420(1), line 410(2) includes a color pixel 420(2), and line 410(3) includes a color pixel 420(3). Color pixels 420(1), 420(2), and 420(3) are located at the same vertical position within corresponding lines 410(2), 410(2), and 410(3). As the object travels, substantially the same portion of the object may be imaged by each of color pixels 420(1), 420(2), and 420(3) as time progresses. For example, color area scan image sensor 400 may capture images at a frame rate that matches the speed with which the object moves through the frame, as discussed in connection with FIGS. 2 and 3. Color area scan image sensor 400 may be composed of more than three lines 410 without departing from the scope hereof. Likewise, photosites 421, 422, 423, and 424 may be arranged differently within color pixel 420, without departing from the scope hereof. For example, the locations of two or more of photosites 421, 422, 423, and 424 may be swapped as compared to the illustration of FIG. 4. An exemplary direction of movement of an object is indicated by arrow 430.

Figure 5:
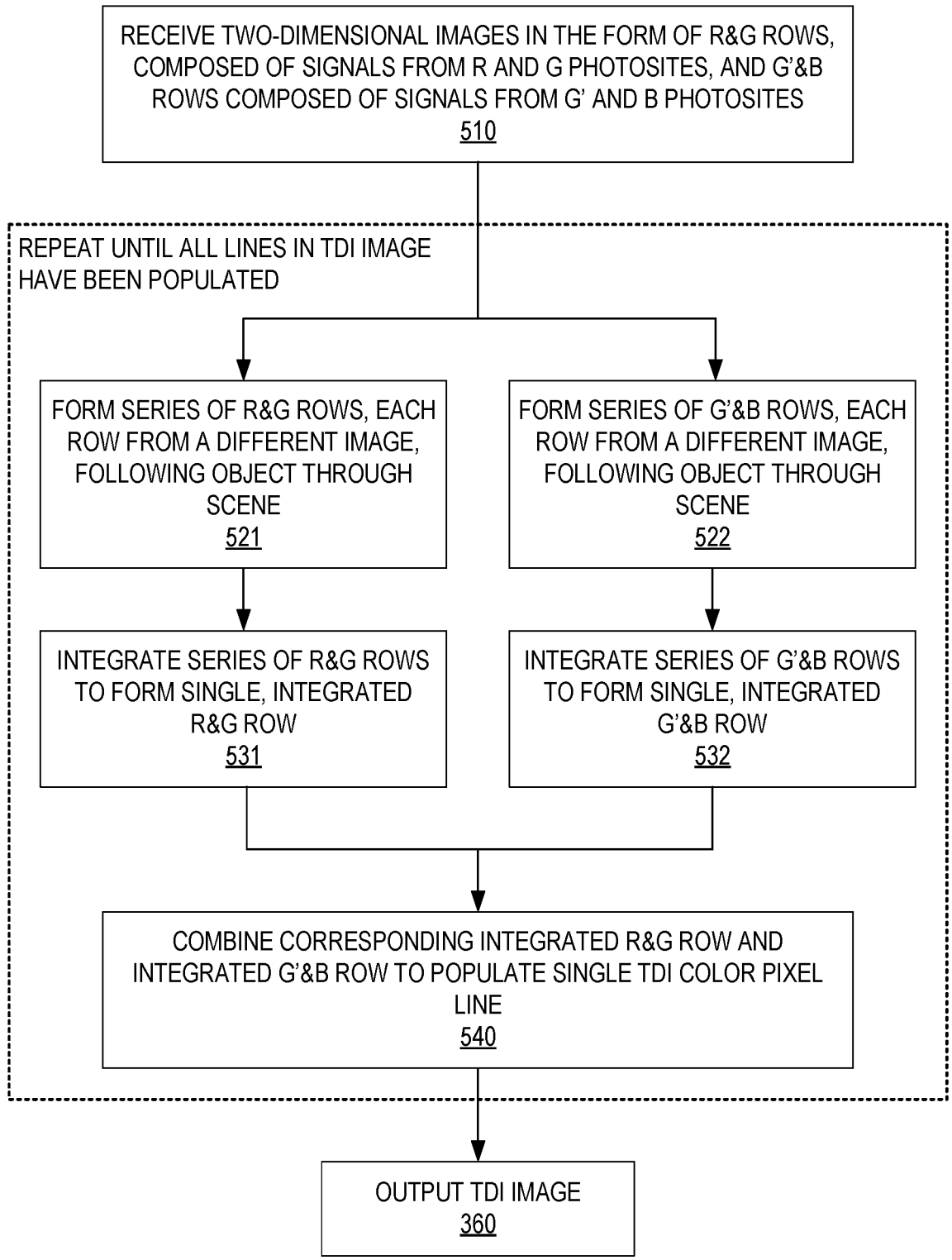
FIG. 5 illustrates a method for processing event timing images captured by a Bayer type color area scan image sensor, according to an embodiment.

FIG. 5 illustrates one exemplary method 500 for generating a TDI image from images captured by a color area scan image sensor having a Bayer type pixel array. Method 500 may be extended to generating a TDI image from images captured by a color area image sensor where each color pixel is composed of a two-by-two photosite array, without departing from the scope hereof. Method 500 is an embodiment of method 300 (FIG. 3) applicable to generation of TDI images by system 100 (FIG. 1) with color area scan image sensor 400 of FIG. 4 implemented as area scan image sensor 110 (FIG. 1). Method 500 assumes that the color area scan image sensor captures images 115 (FIGS. 1 and 2) at a frame rate such that an object of interest progresses through lines 118 (FIG. 2) of the color area scan image sensor at a rate of one line per frame. For example, color area scan image sensor 400 (FIG. 4) captures images of scene 130 (FIG. 1) at a rate such that object 135 (FIG. 1) progresses through lines 410 (FIG. 4) at a rate of one line per frame in the direction indicated by arrow 430 (FIG. 4). Method 500 is performed, for example, by TDI module 140 (FIG. 1).

In a step 510, each two-dimensional image captured by the color area scan image sensor is received in the form of rows. The rows are oriented parallel with the lines of method 300 (FIG. 3), such that a line of method 300 corresponds to two rows of method 500. The two rows are an R&G row composed of signals from R and G photosites and a G'&B row composed of signals from G' and B photosites. For example, TDI module 140 (FIG. 1) receives two-dimensional images 115 (FIG. 1) captured by color area scan image sensor 400 (FIG. 4) as rows, such that each line 410 (FIG. 4) is associated with two rows: (a) a row composed of all R1 (421(1)) and G1 (422(1)) photosite signals from line 410 and (b) a row composed of all G1' (423(1)) and B1 (424(1)) photosite signals from line 410. In another example, TDI module 140 (FIG. 1) receives two-dimensional images 115 (FIG. 1), captured by color area scan image sensor 400 (FIG. 4), in an arbitrary format. TDI module 140 (FIG. 1) processes the two-dimensional images 115 (FIG. 1) to generate rows, such that each line 410 (FIG. 4) is associated with two rows: (a) a row composed of all R1 and G1 photosite signals from line 410 and (b) a row composed of all G1' and B1 photosite signals from line 410.

Following step 510, method 500 proceeds to populate each line of the TDI image by performing steps 521, 522, 531, 532, and 540 for each line in the TDI image. Steps 521 and 531 are performed sequentially, as are steps 522 and 532. Sequential steps 521 and 531 may be performed in parallel or series with sequential steps 522 and 532. In step 521, a series of R&G rows is formed, wherein each R&G row is extracted from a different image. The series of R&G rows follows the progression of an object through a scene, as discussed in connection with FIGS. 2 and 3. For example, TDI module 140 (FIG. 1) forms a series of R&G rows associated with the respective series of lines 410(1), 410(2), and 410(3) of color area scan image sensor 400 (FIG. 4). The series of R&G rows are extracted from a respective series of sequentially captured images 115 (FIG. 1), where images 115 are captured at a frame rate such that an object 135 (FIG. 1) moves through the frame at a rate of one line 410 per frame. In step 531, the series of R&G rows generated in step 521 is integrated to form a single, integrated R&G row. For example, TDI module 140 (FIG. 1) integrates the series of R&G rows generated in step 521 to form a single, integrated R&G row. In step 522, a series of G'&B rows, each from a different image, is formed. The series of G'&B rows follows the progression of an object through a scene, as discussed in connection with FIGS. 2 and 3. For example, TDI module 140 (FIG. 1) forms a series of G'&B rows associated with the respective series of lines 410(1), 410(2), and 410(3) of color area scan image sensor 400 (FIG. 4). The series of G'&B rows are extracted from a respective series of sequentially captured images 115 (FIG. 1), where images 115 are captured at a frame rate such that an object 135 (FIG. 1) moves through the frame at a rate of one line 410 per frame. In step 532, the series of G'&B rows generated is step 522 is integrated to form a single, integrated G'&B row. For example, TDI module 140 (FIG. 1) integrates the series of G'&B rows generated in step 522 to form a single, integrated G'&B row.

In step 540, the single, integrated R&G row generated in step 531 is combined with the single, integrated G'&B row generated in step 532 to form a single color pixel line. This color pixel line includes the combined R, G, G', and B color data and forms a line of a TDI image. For example, TDI module 140 (FIG. 1) combines the R&G row with the G'&B row. In one embodiment of step 530, the combination is performed such that each color pixel of the TDI line is represented by a quadruplet composed of the four individual R, G, G', B values. In another embodiment, the combination is performed such that each color pixel of the TDI line is represented by a triplet composed of three individual values: R, the average of G and G', and B. In yet another embodiment, the combination is performed such that each color pixel of the TDI line is represented by two triplets: one triplet composed of R, G, and B values and one triplet composed of R, G', and B values. Following step 540, method 500 proceeds to perform step 360 of method 300 (FIG. 3).

While area scan image sensor 400 of FIG. 4 and method 500 of FIG. 5 are discussed in the context of a Bayer type color filter array, both area scan image sensor 400 and method 500 may be extended to non-Bayer type color filter arrays without departing from the scope hereof. In one embodiment, photosites 421, 422, 423, and 444 (FIG. 4) are sensitive to four different colors, such that G' represents a color different from G. This corresponds to an embodiment of method 500 (FIG. 5) where photosites G' correspond to a color different from photosites G. Area scan image sensor 400 (FIG. 4) and method 500 (FIG. 5) may be further extended to color filter arrays having other geometrical photosite configurations. For example, each color pixel may be composed of a larger number of photosites, such as 3×3 photosites. In another example, each color pixel has a number of photosites that are vertically stacked as in the Foveon X3 sensor from Foveon, Inc.

Figure 6:
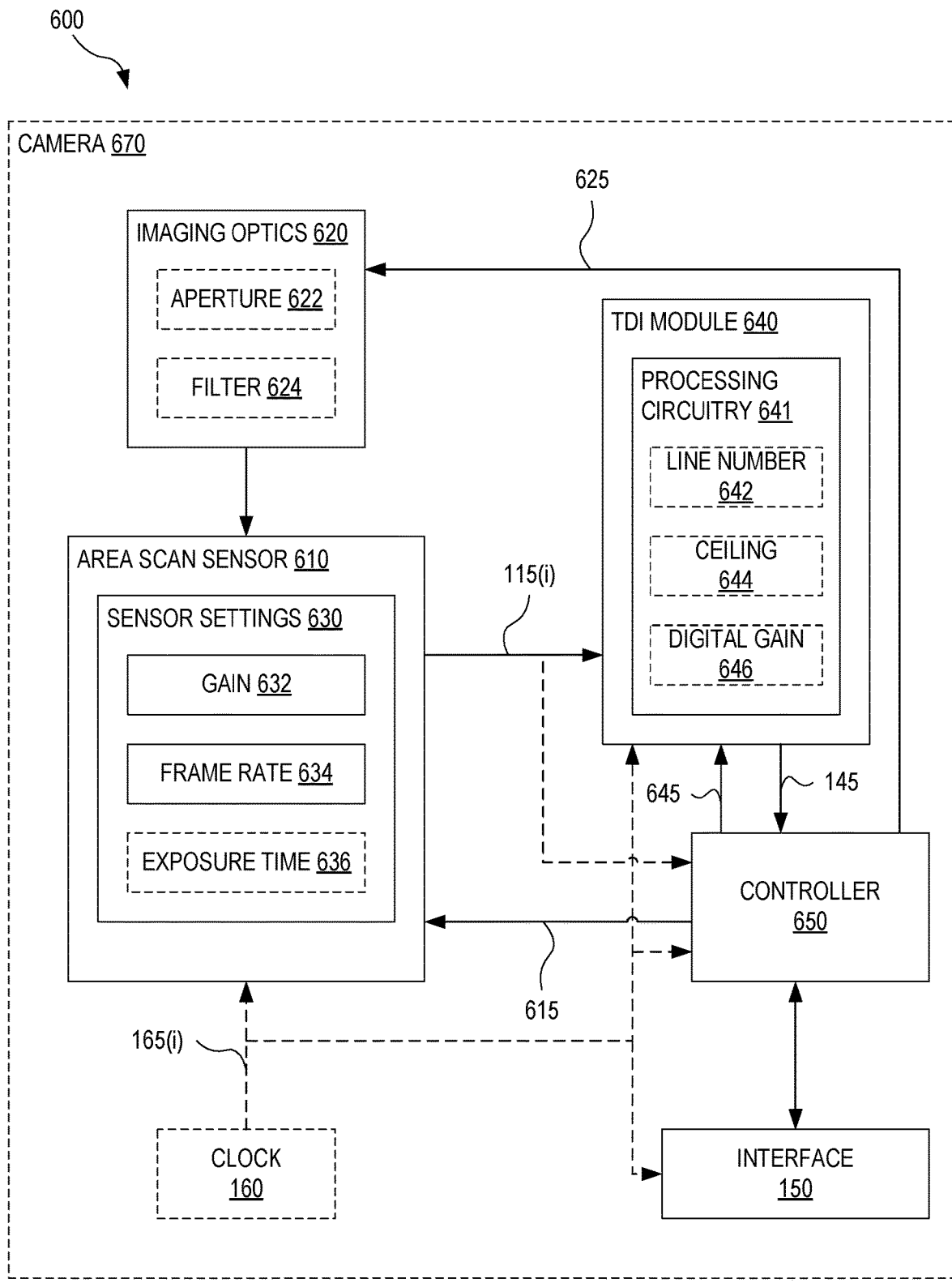
FIG. 6 illustrates an embodiment of the system of FIG. 1 for adjusting brightness of TDI images, according to an embodiment.

FIG. 6 illustrates one exemplary system 600 for processing event timing images, which is an embodiment of system 100 of FIG. 1. System 600 incorporates functionality for adjusting the brightness of TDI images by adjustment of one or more of several parameters, including the number of lines 118 (FIGS. 1 and 2) in a series of sequentially captured two-dimensional images 115 (FIGS. 1 and 2) used to generate each line 146 (FIG. 2) of the TDI image 145 (FIGS. 1 and 2).

System 600 includes area scan image sensor 610, imaging optics 620, and TDI module 640, which are embodiments of area scan image sensor 110, imaging optics 120, and TDI module 140, respectively, of system 100 (FIG. 1). Area scan image sensor 610 includes sensor settings 630. Sensor settings 630 include a gain setting 632 that defines the electronic gain of area scan image sensor 610, a frame rate setting 634 that defines the rate at which area scan image sensor 610 captures frames, for example images 115 (FIGS. 1 and 2), and an exposure time setting 636 that defines the exposure time for images captured by area scan image sensor 610.

Imaging optics 620 includes an optional, adjustable aperture 622, such as an iris, that affects the amount of light transported through imaging optics 620. Thus, optional aperture 622 may be adjusted to achieve a certain brightness of the image formed by imaging optics 620 on area scan image sensor 610. Optionally, imaging optics 620 further includes a configurable filter 624. In an embodiment, configurable filter 624 includes one or more of (a) an infrared filter portion for blocking at least a portion of infrared light from reaching area scan image sensor 610, (b) one or more neutral density filters for reducing the amount of light transmitted by imaging optics 620, and (c) a blank filter for transmitting light without filtering. In an embodiment, configurable filter 624 is motorized and may be controlled by an electrical control signal.

TDI module 640 further includes image processing circuitry 641 as an embodiment of image processing circuitry 141 (FIG. 1). Image processing circuitry 641 includes an optional line number setting 642, an optional ceiling value 644, and an optional digital gain setting 646. Line number setting 642 is the number of lines 118 in images 115 (FIGS. 1 and 2). Line number setting 642 may be set to the maximum number of lines that area scan image sensor 610 can provide, or a subset thereof. Ceiling value 644 is a ceiling for the value that a single TDI image pixel may achieve during the generation thereof. Digital gain setting 646 defines a digital gain applied to images 115 (FIGS. 1 and 2) and/or a TDI image generated therefrom. TDI module 640 may utilize line number setting 642 and/or digital gain setting 646 in conjunction with method 700 of FIG. 7, discussed below, to adjust the brightness of TDI images 145. TDI module 640 may further utilize digital gain setting 646 in conjunction with method 900 of FIG. 9, discussed below, to perform fractional TDI. TDI module 640 may utilize ceiling value 644 in conjunction with method 800 of FIG. 8, discussed below, to adjust the brightness of TDI images 145 on an individual pixel basis, and thereby improve the dynamic range of TDI images 145.

In certain embodiments, system 600 includes clock 160 (FIG. 1) for communicating a time signal, such as capturing time 165, to area scan image sensor 610, TDI module 640, interface 150, and a controller 650. Area scan image sensor 610, imaging optics 620, TDI module 640, controller 650, interface 150, and optional clock 160 may be integrated into a camera 670. Camera 670 is an embodiment of camera 170 (FIG. 1).

Controller 650 communicates control signals 615, 625, and 645 to area scan image sensor 610, imaging optics 620, and TDI module 640, respectively. Control signal 615 adjusts gain setting 632, frame rate setting 634, and, optionally, exposure time 636. In an embodiment, area scan image sensor 610 is configured to maximize exposure time setting 636 for images 115 (FIGS. 1 and 2) given a frame rate setting 634. In this case, exposure time setting 636 is approximately the inverse value of frame rate setting 634. Therefore, frame rate setting 634 defines exposure time setting 636 and may be adjusted to adjust the brightness of images 115 (FIGS. 1 and 2). In an alternative embodiment exposure time setting 636 may be reduced compared to the maximum exposure time associated with a given frame rate setting 634. In this case, control signal 615 may adjust the exposure time directly.

In an embodiment, control signal 625 adjusts one or both of aperture 622 and configurable filter 624. For example, control signal 625 adjusts the diameter of aperture 622 to adjust the brightness of images formed on area scan image sensor 610. In another example, control signal 625 adjusts which portion of configurable filter 624 is in the light path.

Figure 8:
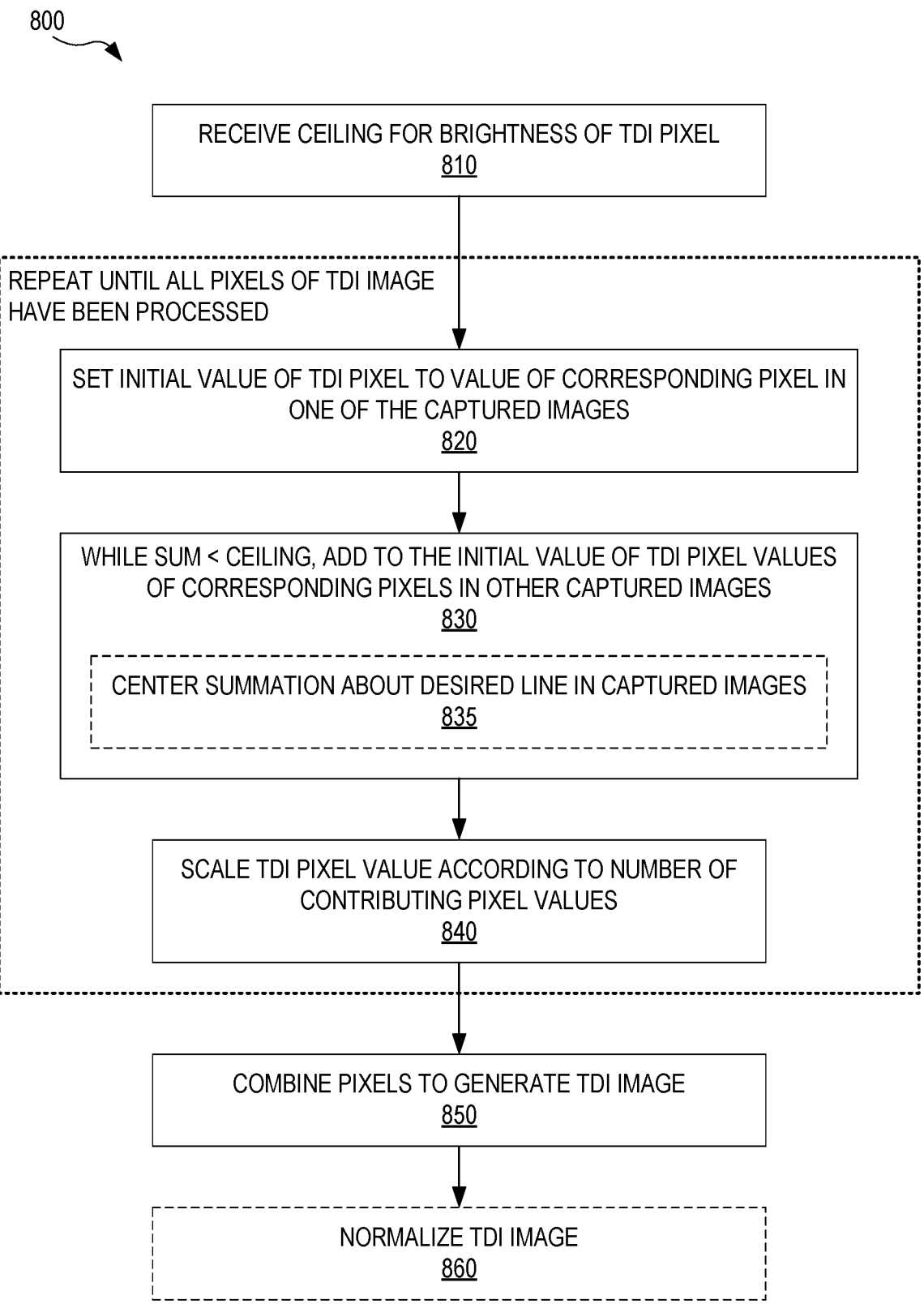
FIG. 8 illustrates a method for improving the dynamic range of TDI images by selecting the number of lines included in the time delay integration on an individual pixel basis, according to an embodiment.

In another embodiment, control signal 645 adjusts line number setting 642, ceiling value 644, and/or digital gain 646. The number of lines 118 used to generate a TDI line 146 is a parameter that may be adjusted to adjust the brightness of object 135 (FIGS. 1 and 2) in TDI image 145. For example, the brightness of object 135 in a TDI line 146 generated from twenty lines 118 is twice that achieved in a TDI line 146 generated from ten lines 118. Likewise, ceiling value 644, as discussed below in connection with FIG. 8, is a parameter that may be adjusted to adjust the appearance, by local brightness adjustment, of object 135 (FIGS. 1 and 2) in TDI image 145. Digital gain setting 646 is a parameter that may be used to globally or locally adjust brightness of TDI image 145.

Accordingly, system 600 provides eight adjustable parameters for achieving a certain brightness of TDI image 145: gain setting 632, frame rate setting 634, exposure time 636, size of aperture 622, setting of configurable filter 624, line number setting 642, ceiling value 644, and digital gain 646. Generally, gain setting 632, frame rate setting 634, and the size of aperture 622 all impact properties of images 115 other than brightness. In certain embodiments, exemplified by the illustration in FIG. 2, frame rate setting 634 is fixed in order to match the rate of movement of object 135 to the spacing of lines 118 of images 115. Hence, the frame rate setting 634 is not available for brightness adjustment. Exposure time setting 636 is upwards-limited by frame rate setting 634 and may not be available to increase the brightness. Typically, gain setting 632 affects the noise level of images 115, such that an increased value of gain setting 632 is associated with increased noise in images 115.

In use scenarios where the brightness of object 135 (FIG. 1) is too high, for example so high that portions of an image captured by area scan image sensor 610 is saturated, the setting of configurable filter 624 may be adjusted to reduce the amount of transmitted light. However, such adjustment can typically be made only in discrete increments. Exposure time setting 636 and/or digital gain setting 646 may be used in such a scenario to more finely adjust the brightness of object 135 (FIG. 1), for example in conjunction with adjusting the setting of configurable filter 624.

In use scenarios where the brightness of object 135 in the image formed on area scan image sensor 610 is low, the range of gain setting 632 may be limited to a range that produces images 115 of a required signal-to-noise ratio. The size of aperture 622 is, in most optical imaging systems, related to the depth of focus. The size of aperture 622 may be increased in order to increase the brightness of image 115 (FIGS. 1 and 2); however, this decreases the depth of focus. Thus, in some use scenarios, the size of aperture 622 is upwards-limited by depth of focus requirements. Digital gain setting 646 may be used to increase the brightness of object 135; however, digital gain setting 646 will, generally, affect signal and noise equally such that the signal-to-noise ratio is unimproved. It is therefore advantageous to be able to adjust the brightness of TDI image 145 through line number setting 642, either alone or in combination with adjustment of one or more of gain setting 632, frame rate setting 634, exposure time setting 636, digital gain setting 646, the size of aperture 622, and setting of configurable filter 624. As an alternative to adjusting the brightness through line number setting 642, the brightness may be adjusted through ceiling value 644. Ceiling value 644 facilitates a local brightness adjustment, which may be used to improve the dynamic range of the TDI image 145 in addition to adjusting the overall brightness of TDI image 145.

Controller 650 may communicate with TDI module 640, area scan image sensor 610 and, optionally, imaging optics 620 through interface 150, without departing from the scope hereof. Likewise, all or portions of the functionality of controller 650 may be placed externally to system 600 and be communicatively coupled to system 600 through interface 150, without departing from the scope hereof.

Figure 7:
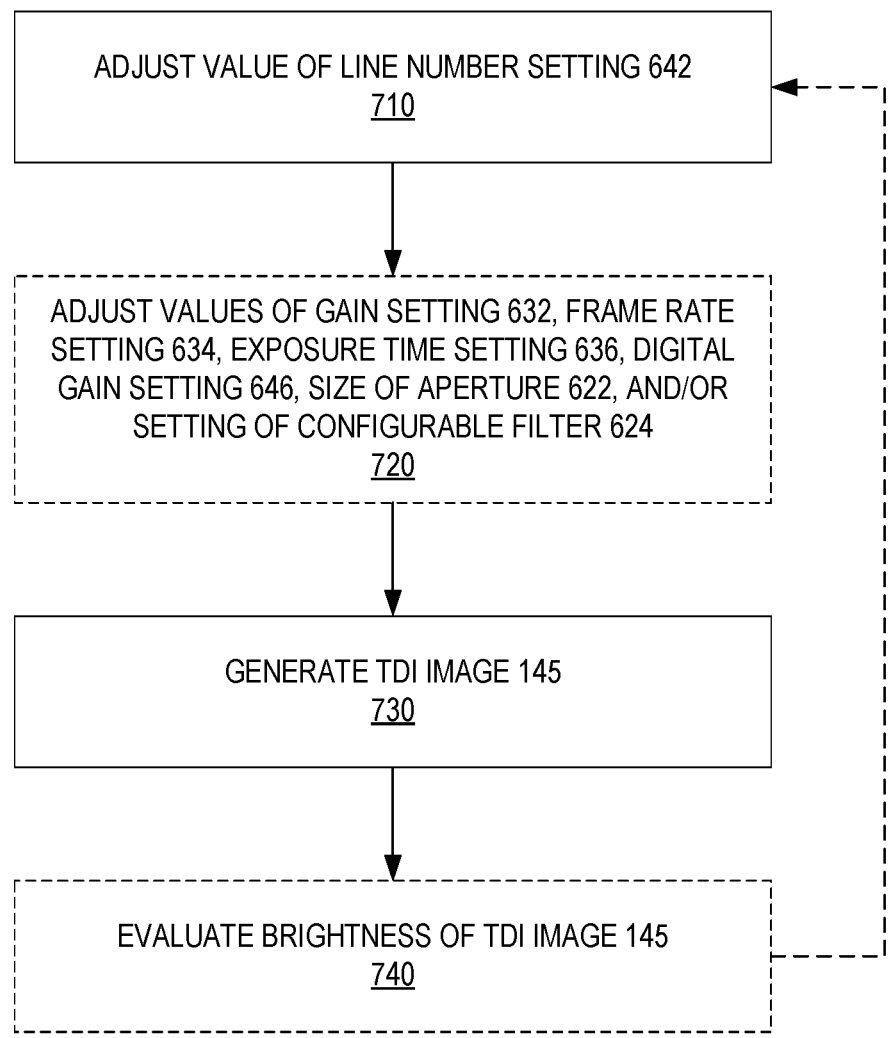
FIG. 7 illustrates a method for adjusting brightness of time delay integration images by varying the number of lines included in the time delay integration, according to an embodiment.
Figure 9:
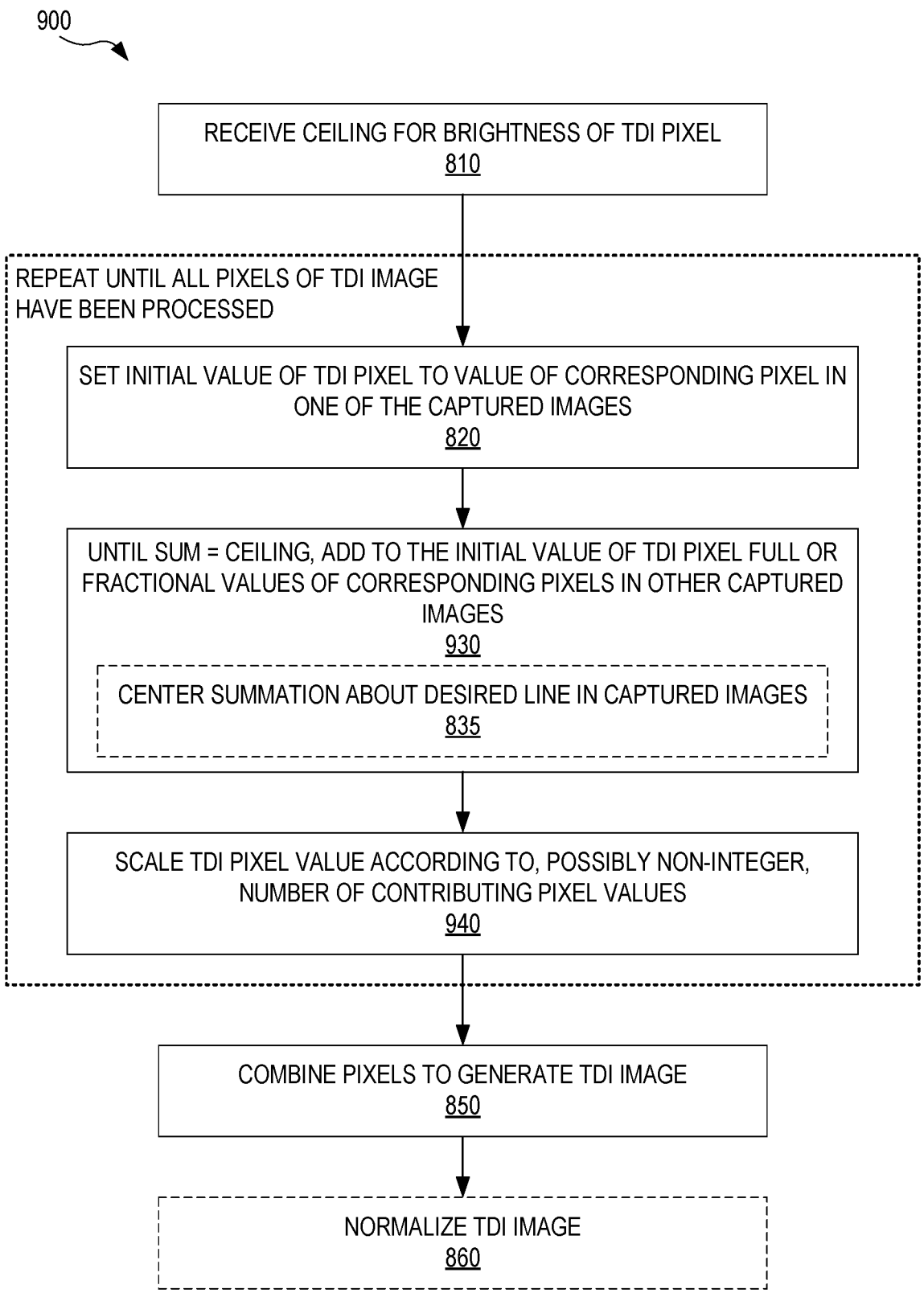
FIG. 9 illustrates a method for improving the dynamic range of TDI images using fractional TDI, according to an embodiment.

FIG. 7 illustrates one exemplary method for adjusting the brightness of TDI image 145 (FIGS. 1 and 2) using system 600 of FIG. 6. In a step 710, the line number setting 642 is set to a certain value. For example, controller 650 (FIG. 6) communicates control signal 645 (FIG. 6) to TDI module 640 (FIG. 6). In certain embodiments, line number setting 642 is a non-integer value as discussed in connection with method 900 (FIG. 9). In an optional step 720, the values of one or more of gain setting 632 (FIG. 6), frame rate setting 634 (FIG. 6), exposure time setting 636 (FIG. 6), digital gain setting 646 (FIG. 6), the size of aperture 622 (FIG. 6), and setting of configurable filter 624 (FIG. 6) are adjusted. For example, controller 650 (FIG. 6) communicates control signals 615 (FIG. 6) and/or 625 (FIG. 6) to area scan image sensor 610 and imaging optics 620, respectively. The order of step 710 and optional step 720 may be reversed, or step 710 and optional step 720 may be executed in parallel. In a step 730, a TDI image 145 (FIGS. 1 and 2) is generated. For example, a series of images 115(*i*) (FIGS. 1 and 2) are captured by area scan image sensor 610 (FIG. 6), and processed by TDI module 640 (FIG. 6), according to method 500 (FIG. 5), using image processing circuitry 641.

In an optional step 740, the brightness of TDI image 145 is evaluated. Based on the result of the evaluation, method 700 may return to step 710 for further brightness adjustment. In one embodiment, step 740 is performed automatically by controller 650 or by a computer externally to system 600. In another embodiment, step 740 is performed manually by an operator.

In certain embodiments, the parameters available for brightness adjustment in steps 720 and 730 are associated with one or more of target value, minimum value, and maximum value. Further, each of the parameters may be assigned a priority such that method 700 is performed according to a specified sequence of parameter adjustments. Method 700 may be performed automatically and/or by an operator.

In an exemplary use scenario, images are captured during sunset such that the environment steadily loses light and method 700 is automatically performed to increase TDI image brightness. Gain setting 632 may initially be at a specified target value. In order to increase brightness, method 700 may first increase the size of aperture 622 to a specified maximum value, for example a value known to not adversely affect other image properties. If adjustment is insufficient, method 700 may proceed to increasing the value of line number setting 642 to a specified maximum value. If this also proves insufficient, method 700 may, after approval by an operator, increase gain setting 632 beyond a specified target value to its maximum value.

None of the steps of method 700 require an area scan image sensor or area scan images. Hence, method 700 may be extended to systems equivalent to system 600 of FIG. 6, with area scan image sensor 610 replaced by another type of image sensor such as a line scan image sensor, without departing from the scope hereof. Furthermore, the operations of step 720 may be applied to a camera based on an area scan image sensors or a non-area scan image sensor, such as a line scan image sensor, where these cameras are used in applications that do not include TDI. In this case, the captured images are directly evaluated to guide the performance of step 720.

FIG. 8 illustrates one exemplary method 800 for providing an improved dynamic range of a TDI system. Method 800 is an extension of method 700 (FIG. 7), wherein the number of lines used to generate a TDI image is automatically determined on an individual pixel basis. A scene, for example scene 130 (FIG. 1), imaged by a TDI system may include bright areas and dim areas. The object of interest, such as object 135 (FIG. 1), may be significantly less bright than other objects that are not of interest. Likewise, some portions of the object of interest may be much brighter than other portions thereof. Method 800 allows for utilizing more lines when populating pixels of the TDI image associated with dark areas and fewer lines when populating pixels of the TDI image associated with bright areas.

Generally, noise is more apparent in a dark area, while blur is more apparent in a bright area. Blur may result from a mismatch between the image capture frame rate and the local or global movement rate of the object. Hence, for a given bright portion of an object of interest, the number of lines used to generate a pixel of the TDI image is advantageously kept low in order to minimize the amount of potential blur associated with mismatch between the image capture frame rate and the rate of movement of the given object portion. For a dim portion of an object of interest, the number of lines used in the TDI process is advantageously increased in order to increase the signal-to-noise ratio. Method 800 increases the dynamic range of a TDI image beyond the dynamic range of the image sensor used to capture the images, from which the TDI image is generated. Accordingly, method 800 may be advantageously utilized by an event timing system to ensure high quality TDI images.

Method 800 is performed, for example, by TDI module 140 of system 100 (FIG. 1), or by TDI module 640 of system 600 (FIG. 6) using ceiling value 642 (FIG. 6).

In an exemplary scenario, scene 130 is a finish area of a night time horse race, object 135 is a racing horse, and the finish area is illuminated by stadium lighting. Some portions of the racing horse appear very bright due to stadium light reflections off of the racing horse. Other portions of the racing horse, which are in a shadow, appear very dark. Method 800 provides for increasing the dynamic range of the TDI image beyond the dynamic range of the image sensor used for image capture, such that bright portions of the racing horse appear with minimal blur while dark portions of the racing horse appear with maximum signal-to-noise ratio.

In a step 810, a ceiling value for the brightness of a TDI pixel is received. For example, TDI module 640 (FIG. 6) receives a ceiling value from interface 150 (FIGS. 1 and 6)) through controller 650 and stores this ceiling value to ceiling value 644 (FIG. 6). Following step 810, method 800 performs steps 820, 830, and 840 for each pixel of the TDI image.

In step 820, the initial value of the TDI image is set to the value of a corresponding pixel in one of the captured images. For example, TDI module 640 (FIG. 6) sets the initial value of the TDI pixel to the value of a corresponding pixel from one of images 115 (FIGS. 1 and 6) received from area scan image sensor 110 (FIGS. 1 and 6).

In step 830, values of corresponding pixels of other captured images are sequentially added to the initial value generated in step 820, while the sum is less than the ceiling value received in step 810. Thus, in the case of a bright image portion, the summation may be limited to a small subset of the available pixel values. Conversely, in the case of a dark image portion, the summation may include all available pixel values. Corresponding pixels from other captured images are selected according to discussion in connection with step 320 of method 300 (FIG. 3), to match the progression of an object of interest through the scene. TDI module 640 generates a TDI pixel value that corresponds to stopping the summation before the sum exceeds the ceiling value. For example, TDI module 640 (FIG. 6) sequentially adds to the initial value of the TDI pixel values of corresponding pixels of images 115 (FIGS. 1, 2, and 6) different from the image 115 used in step 820, while the TDI pixel value is less than ceiling value 644 (FIG. 6).

In certain embodiments, step 830 includes an optional step 835 for centering the pixel values used in the summation about a desired line in the captured images, such as a line corresponding to a finish line location. Step 835 ensures that all pixels in the TDI image are based on optimally centered input data. Step 835 may be incorporated into step 830 in an iterative fashion. For example, TDI module 640 (FIG. 6) may use a total of only two pixel values in steps 820 and 830, where the two pixel values are extracted from the earliest captured images 115 (FIGS. 1, 2, and 6). This corresponds to an object of interest, such as object 135 (FIGS. 1 and 2) being at its leftmost position in images 115. However, the image of the finish line may be shifted from this position by a number of pixels and step 830 repeats the summation using two lines of images 115 that are optimally centered about the finish line image.

In step 840, the TDI pixel value is scaled according to the number of pixel values used in step 830. This maintains the original relative scale of dark and bright portions of the image. For example, TDI module 640 (FIG. 6) multiplies the TDI pixel value generated in step 830 with a value included in digital gain setting 646 (FIG. 6). This value may be the factor $N_{max}/N_{used}$, where $N_{max}$ is the full number of pixel values available in step 830, and $N_{used}$ is the number of pixel values used in step 830.

After performing steps 820, 830, and 840 for all pixels of the TDI image, the TDI pixels are combined to form the TDI image in a step 850. For example, TDI module 640 (FIG. 6) combines all TDI pixel values generated by step 830 to form TDI image 145 (FIGS. 1 and 6).

In an optional step 860, TDI images generated in step 850 are normalized to represent the images with a lower dynamic range. For example, TDI module 640 (FIG. 6) applies standard image processing methods known to a person ordinarily skilled in the art, such as gamma corrections, to generate a normalized TDI image with a bit depth identical to that of area scan image sensor 610 used to capture images 115.

In certain embodiments, method 800 is executed such that the number of lines used to generate the TDI image is determined on an individual TDI line basis. These embodiments may advantageously be performed with step 860 included in method 800. In these embodiments, the number of contributing pixel values in steps 830 and 840 is identical for all TDI pixels belonging to a given TDI line. Step 830 may be executed with "sum" being, for example, the maximum value of individual TDI pixel sums associated with the TDI line under consideration. In this case, the brightest TDI pixel defines the number of contributing pixel values for the TDI line. Alternatively, step 830 may be executed with "sum" being the average value of individual TDI pixel sums associated with the TDI line under consideration. In another example, step 830 is executed with "sum" being n'th percentile of individual TDI pixel sums associated with the TDI line under consideration, where n is a number between 0 and 100.

FIG. 9 illustrates one exemplary method 900 for improving the dynamic range of TDI images using fractional TDI. Method 900 is an embodiment of method 800 of FIG. 8 further including fractional TDI. Fractional TDI allows for the inclusion of fractions of captured image pixel values contributing to a TDI pixel. For comparison, method 800 is restricted to integer steps in the number of captured image pixel values contributing to a TDI pixel. Hence, two adjacent TDI pixels, associated with similar brightness in the captured images and generated using method 800, may have, for example, two and three contributing pixel values, respectively. In some situations, a discreet step in noise and/or blur properties between the two adjacent TDI pixels may result therefrom. Method 900, on the other hand, allows for adding fractional pixel values such that the two adjacent TDI pixels discussed above show a smooth transition in noise and/or blur properties.

Method 900 first performs step 810 (FIG. 8). Next, method 900 performs steps 820 (FIG. 8), 930, and 940 for all pixels in the TDI image. Step 930 is a modification of step 830 (FIG. 8) further utilizing fractional pixel values. In step 930, values of corresponding pixels of other captured images are sequentially added to the initial value generated in step 820, until the sum equals the ceiling value received in step 810. Generally, the last pixel value added is a fractional pixel value. For example, TDI module 640 (FIG. 6) sequentially adds to the initial value of the TDI pixel, extracted from line 118(1,6) (FIG. 2), the value of the corresponding pixel of line 118(2,7) (FIG. 2) and a fraction x of the corresponding pixel value from line 118(3,8) (FIG. 2), where the fraction x is between zero and one. Thus, in this example, a total of 2+x pixel values contribute to the TDI pixel value. In an embodiment, step 930 further includes step 835, as discussed in connection with FIG. 8. Step 940 is a modification of step 840 (FIG. 8) that allows for non-integer scaling of the TDI pixel value generated in step 930 to account for the inclusion of fraction pixel values in step 930. For example, TDI module 640 (FIG. 6) multiplies the TDI pixel value generated in step 930 with a value included in digital gain setting 646 (FIG. 6). This value may be the factor $N_{max}/N_{used}$, where $N_{max}$ is the full number of pixel values available in step 930, and $N_{used}$ is the, possibly non-integer, number of pixel values used in step 930. Using the example discussed in connection with step 930, $N_{used}$ is 2+x. After completing steps 820, 930, and 940 for all pixel of the TDI image, method 900 performs step 850 (FIG. 8) and optionally step 860 (FIG. 8).

As discussed for method 800 of FIG. 8, method 900 may be executed such that the number of lines used to generate the TDI image is determined on an individual TDI line basis.

Figure 10A:
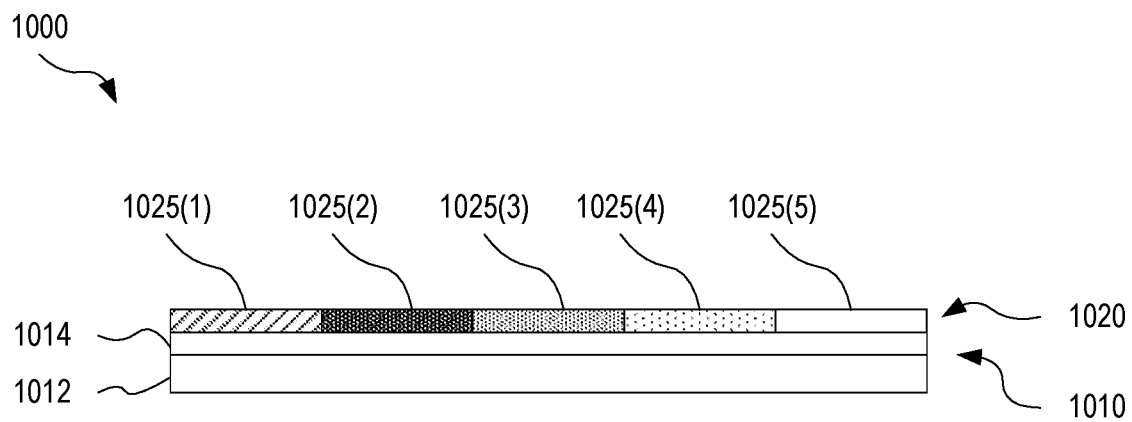
FIG. 10A and FIG. 10B illustrate an area scan image sensor that includes a position dependent filter for providing image capture at different brightness level, according to an embodiment.
Figure 10B:
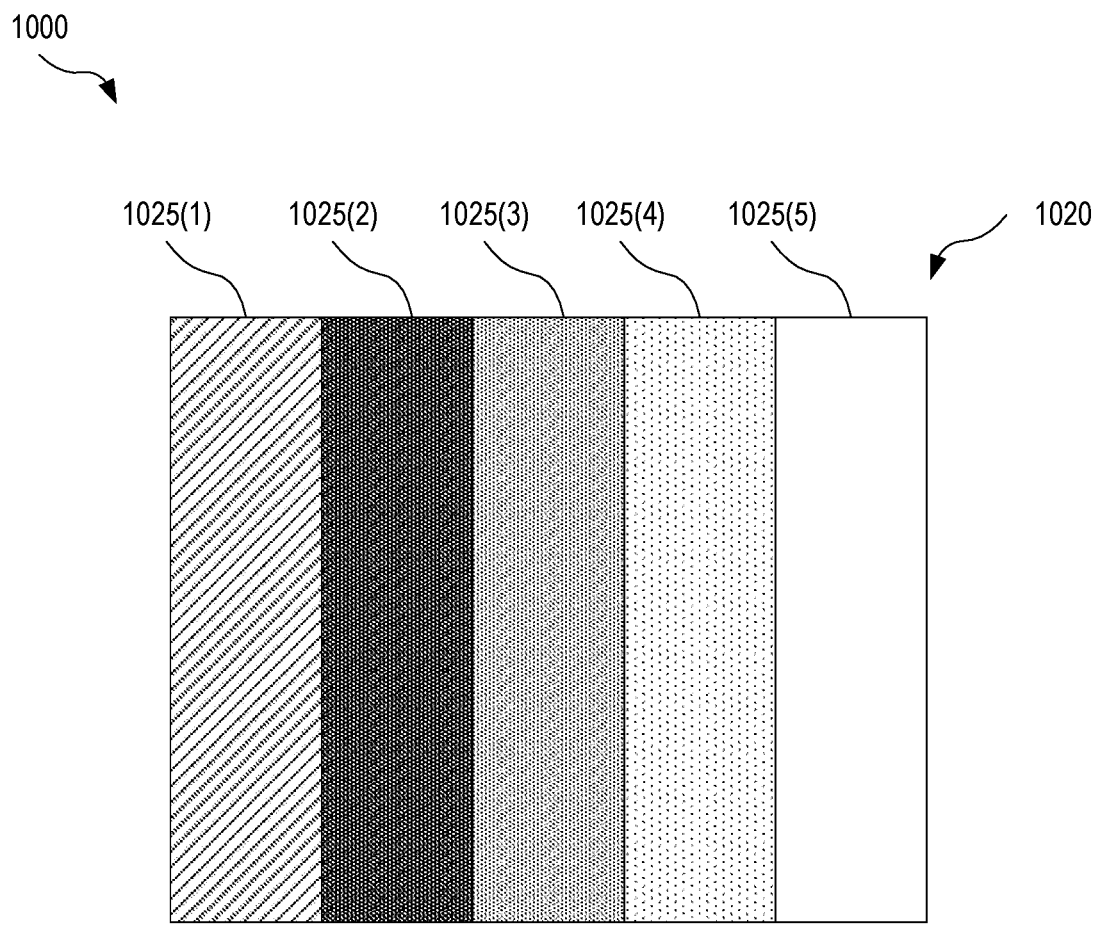

FIGS. 10A and 10B illustrate one exemplary filtered area scan image sensor 1000 that includes an area scan image sensor 1010 and a position dependent filter 1020. FIGS. 10A and 10B may sometimes be collectively referred to herein as FIG. 10. Filtered scan image sensor is an embodiment of area scan image sensor 100 of FIG. 1 and of area scan image sensor 610 of FIG. 6. FIG. 10A illustrates filtered area scan image sensor 1000 in elevational view. FIG. 10B illustrates filtered area scan image sensor 1000 in top plan view. Area scan image sensor 1010 includes a photosensitive pixel array 1012 and, optionally, a color filter array 1014 for providing color information. Optional color filter array 1014 is, for example, a Bayer type array.

Position dependent filter 1020 includes five spatially separated filter portions 1025(1), 1025(2), 1025(3), 1025(4), and 1025(5) for filtering light propagating towards area scan image sensor 1010. Filter portion 1025(1) is an infrared filter for at least partially blocking infrared light. Filter portions 1025(2), 1025(3), and 1025(4) are neutral density filters with three different transmission coefficients. Filter portion 1025

(5) is a blank filter for transmitting substantially all incident light. In one embodiment, position dependent filter 1020 is fixed to area scan image sensor 1010. Filter 1020 is, for example, applied to area scan image sensor 1010 using one or more coating methods known in the art. In another embodiment, position dependent filter 1020 is mounted close to area scan image sensor 1010 and fixed in relation thereto. The brightness of an object 135 (FIG. 1), as captured by filtered area scan image sensor 1000, depends on the position of object 135 in the image. For example, object 135 will appear brighter in a portion of the image associated with blank filter portion 1025(5) than in a portion of the image associated with neutral density filter 1025(2).

Filtered area scan image sensor 1000 may include more or fewer filter portions 1025 than illustrated in FIG. 10 without departing from the scope hereof. Additionally, filtered area scan image sensor 1000 may include other types of brightness adjusting filter portions than those illustrated in FIG. 10 without departing from the scope hereof.

Figure 11:
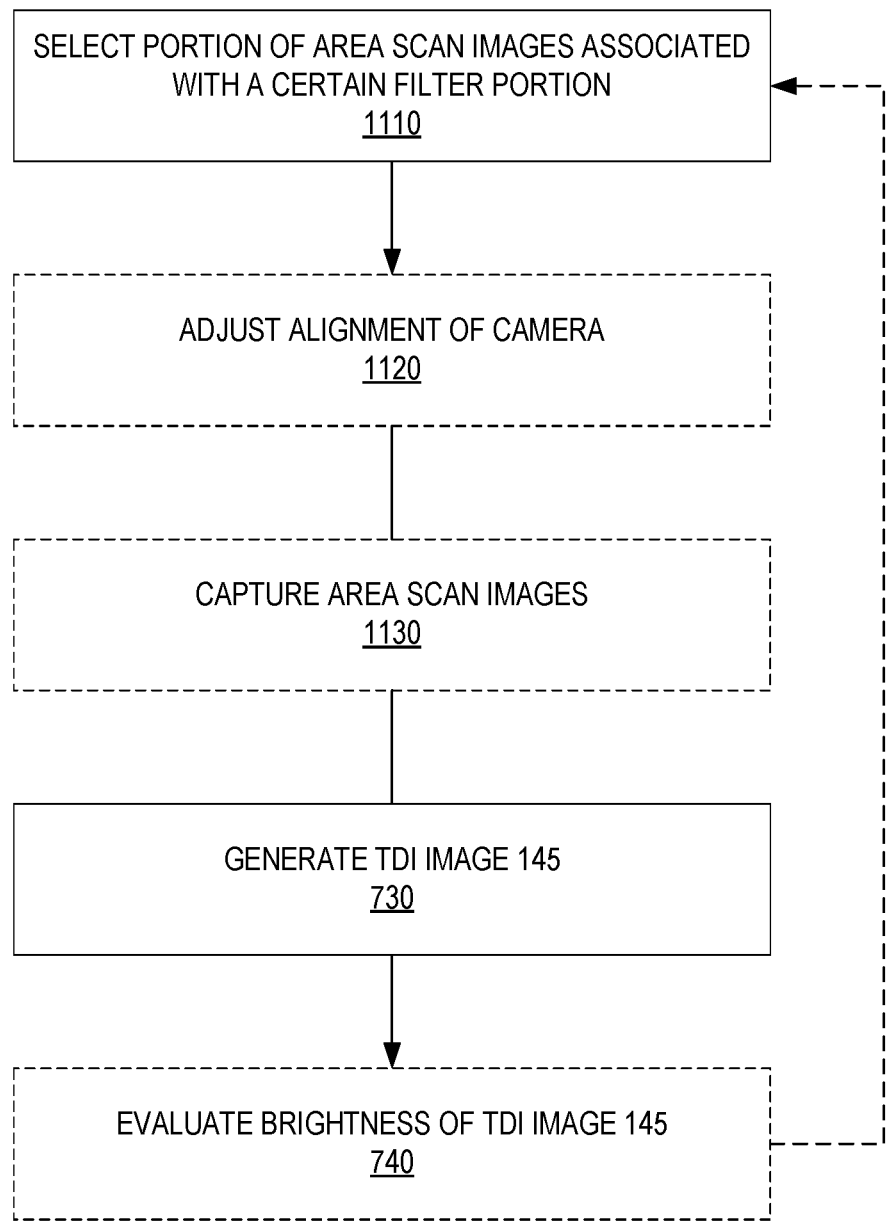
FIG. 11 illustrates a method for processing event timing images to adjust the brightness of a TDI image using the area scan image sensor of FIG. 10A and FIG. 10B, according to an embodiment.

FIG. 11 illustrates one exemplary method 1100 for processing event timing images to adjust the brightness of a TDI image by using an area scan image sensor with a position-dependent filter. Method 1100 may be performed, for example, by system 100 (FIG. 1) with filtered area scan image sensor 1000 (FIG. 10) implemented as area scan image sensor 110 (FIG. 1), or by system 600 with area scan image sensor 1000 (FIG. 10) implemented as area scan image sensor 610 (FIG. 1).

In a step 1110, a portion of the two-dimensional images, captured by an area scan image sensor with a position-dependent filter, is selected. The portion is associated with a certain filter portion. Step 1110 may serve to adjust the brightness of a TDI image generated therefrom. For example, in system 600 (FIG. 6) with filtered area scan image sensor 1000 (FIG. 10) implemented as area scan image sensor 610, TDI module 640 selects a spatial portion of images 115 (FIGS. 1 and 6) associated with a certain filter portion 1025 (FIG. 10) to achieve a desired brightness of TDI image 145 (FIGS. 1 and 6).

In an optional step 1120, the alignment of a camera that houses the scan image sensor with a position dependent filter is adjusted. This is relevant in a use scenario where the camera has been aligned such that, for example, a finish line is imaged onto a particular line of pixels of the image sensor. The finish line may not be imaged onto a portion of the sensor associated with the selection made in step 1110. Optional step 1120 is performed, for example, by system 600 (FIG. 6), with filtered area scan image sensor 1000 (FIG. 10), implemented into TDI camera system 2000 (FIG. 20) as TDI camera 2010. Using method 2100 (FIG. 21) and/or method 2300 (FIG. 23), alignment control system 2040 (FIG. 20) realigns camera 670 (FIG. 6) such that a finish line is imaged onto a portion of filtered area scan image sensor 1000 associated with the spatial portion of images 115 selected in step 1110. In an optional step 1130, area scan images area captured with the new camera alignment achieved in step 1120. For example, area scan image sensor 610 (FIG. 6) captures two-dimensional images 115 (FIGS. 1 and 6).

Next, method 1100 proceeds to perform step 830, and optionally step 840, of method 800 (FIG. 8). If performing optional step 840, method 1100 may return to step 1110 for further adjustment.

Optional steps 1120 and 1130 are performed, for example, in a scenario where step 1110 is performed prior to the occurrence of an event of interest, such as the finish of a race. In this exemplary scenario, step 1110 and optional step 1120 may be performed during setup of an event timing system, while optional step 1130 is performed during the event. In another exemplary scenario, method 1100 is processing event timing images during an event such as the finish of a race. In this scenario, steps 1110, 830, and optionally step 840, are performed while race participants cross a finish line. If time allows, for example if there is a sufficient time gap between two subsequent race finishers, this example may include performing optional steps 1120 and 1130 during the interim between the two subsequent race finishers crossing the finish line.

All of methods 800 (FIG. 8), 900 (FIG. 9), and 1100 (FIG. 11) are concerned with achieving a certain brightness of a TDI image. Two or more of these methods may be performed in conjunction, or one or more of the methods may be performed separately, to generate a TDI image.

Figure 12:
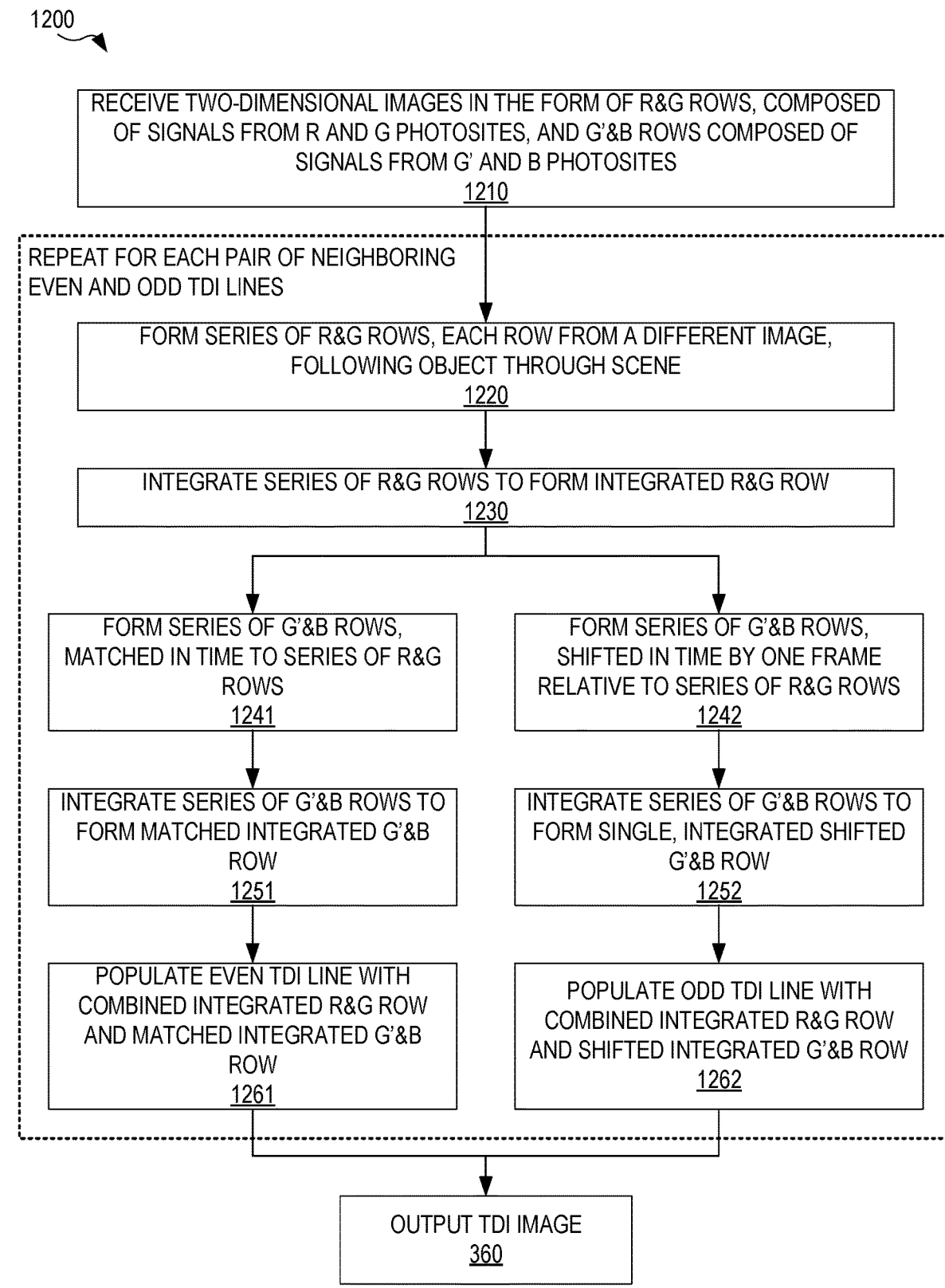
FIG. 12 illustrates a method for processing captured images to generate a TDI image with twice the resolution of the captured images, according to an embodiment.

FIG. 12 illustrates one exemplary method 1200 for processing event timing images captured by a color area scan image sensor having a Bayer type pixel array. Method 1200 generates a color TDI image with twice the resolution of the color area scan image sensor. Accordingly, the TDI image generated by method 1200 provides twice the time resolution as compared to the TDI images generated by method 500 (FIG. 5). Method 1200 is applicable, for example, to the generation of TDI images by system 100 (FIG. 1) with color area scan image sensor 400 (FIG. 4) implemented as area scan image sensor 110 (FIG. 1). As discussed in connection with FIG. 4, photosites 421, 422, 423, and 424 may be arranged differently within color pixel 420. For example, the locations of two or more of photosites 421, 422, 423, and 424 may be swapped as compared to the illustration of FIG. 4. Method 1200 may be correspondingly modified from the embodiment illustrated in FIG. 12 to apply to such alternate image sensor layouts, without departing from the scope hereof. In terms of resolution, each line 118 (FIG. 2) of a captured two-dimensional image 115 (FIGS. 1 and 2) corresponds to two neighboring lines of the TDI image. Method 1200 assumes that the images 115 (FIGS. 1 and 2) are captured by the color area scan image sensor at a frame rate such that an object of interest progresses through lines 118 (FIG. 2) of the color area scan image sensor at a rate of one line per frame. For example, color area scan image sensor 400 (FIG. 4) captures images of scene 130 (FIG. 1) at a rate such that object 135 (FIG. 1) progresses through lines 410 (FIG. 4) at a rate of one line per frame. Method 1200 processes such images and is performed, for example, by TDI module 140 (FIG. 1).

In a step 1210, each two-dimensional image, captured by the color area scan image sensor, is received in the form of rows. The rows are oriented parallel with the lines of method 300 (FIG. 3), such that a line of method 300 corresponds to two rows of method 500. The two rows are an R&G row composed of signals from R and G photosites and a G'&B row composed of signals from G' and B photosites. In one embodiment, the images are received from a stored location. In another embodiment, the images are received from the area scan image sensor used to capture the images. For example, TDI module 140 (FIG. 1) receives two-dimensional images 115 (FIG. 1) captured by color area scan image sensor 400 (FIG. 4) as rows, such that each line 410 (FIG. 4) is associated with two rows: (a) a row composed of all R1 (421) and G1 (422) photosite signals from line 410 and (b) a row composed of all G1' (423) and B1 (424) photosite signals from line 410. In another example, TDI module 140 (FIG. 1) receives two-dimensional images 115 (FIG. 1), captured by color area scan image sensor 400 (FIG. 4), in any arbitrary format. TDI module 140 (FIG. 1)

processes the two-dimensional images 115 (FIG. 1) to generate rows, such that each line 410 (FIG. 4) is associated with two rows: (a) a row composed of all R1 (421) and G1 (422) photosite signals from line 410 and (b) a row composed of all G1' (423) and B1 (424) photosite signals from line 410.

The TDI image, generated by method 1200, is composed of lines zero through N, where N is an odd integer. The lines of the TDI image generated by method 1200 are equivalent to lines 146 of FIG. 2, except that each line 146 of FIG. 2 corresponds to two lines of the TDI image generated by method 1200. Following step 1210, method 1200 performs steps 1220, 1230, 1241, 1242, 1251, 1252, 1261, and 1262 for each pair of neighboring even and odd TDI lines.

In step 1220, a series of R&G rows, each from a different image, is formed. The series of R&G rows follows the progression of an object through a scene, as discussed in connection with FIGS. 2 and 3. For example, TDI module 140 (FIG. 1) forms a series of R&G rows associated with the respective series of lines 410(1), 410(2), and 410(3) of color area scan image sensor 400 (FIG. 4). The series of R&G rows are extracted from a respective series of sequentially captured images 115 (FIG. 1). In step 1230, the series of R&G rows generated in step 1220 is integrated to form a single, integrated R&G row. For example, TDI module 140 (FIG. 1) integrates the series of R&G rows generated in step 1220 to form a single, integrated R&G row. Step 1230 may performed at any time after step 1220 and before steps 1261 and 1262. Method 1200 proceeds to perform sequential steps 1241, 1251, and 1261 to populate the even TDI line and steps 1242, 1252, and 1262 to populate the odd TDI line. Sequential steps 1241, 1251, and 1261 may be performed in series or parallel with sequential steps 1242, 1252, and 1262.

In step 1241, a series of G'&B rows are formed. The series of G'&B rows is matched to the series of R&G rows formed in step 1220, such that each G'&B row from the series of G'&B rows is extracted from the same line of the same captured image as a respective one of the series of R&G rows generated in step 1220. For example, TDI module 140 (FIG. 1) forms a series of G'&B rows associated with the respective series of lines 410(1), 410(2), and 410(3) of color area scan image sensor 400 (FIG. 4), where the series of R&G rows formed in step 1220 is also associated with the respective series of lines 410(1), 410(2), and 410(3).

In step 1251, the matched series of G'&B rows generated in step 1241 is integrated to form a single, matched integrated G'&B row. For example, TDI module 140 (FIG. 1) integrates the matched series of G'&B rows to form a single, matched integrated G'&B row.

In step 1261, the integrated R&G row generated in step 1230 and the matched integrated G'&B row generated in step 1251 are combined to form a single color line including at least R, G", and B data for each pixel. The even TDI line is populated with this single color line. In one embodiment, the R, G", and B data of each pixel of the single color line includes (a) the R data from the corresponding integrated R&G row, (b) the average of the G and G' data, to form the G" data, from the corresponding pixels of the integrated R&G row and the matched integrated G'&B row, respectively, and (c) the B data of the from the corresponding integrated G'&B row. In another embodiment, both G data from the integrated R&G row and G' data from the matched integrated G'&B row are retained. In this embodiment, the R, G", and B data of each pixel of the single color line includes (a) the R data of the from the corresponding integrated R&G row, (b) the G data from the corresponding pixel of the integrated R&G row, (c) the G' data from the corresponding pixel of the integrated G'&B row, and (d) the B data of the from the corresponding integrated G'&B row. In this embodiment, the G" data includes the G data and the G' data. For example, TDI module 140 (FIG. 1) combines the integrated R&G row generated in step 1130 with the matched integrated G'&B row generated in step 1251 to populate the even TDI line.

In step 1242, a series of G'&B rows are formed. The series of G'&B rows is shifted in time by one image frame relative to the series of R&G rows formed in step 1220. Hence, each G'&B row from the series of of G'&B rows is extracted from the same line position as the corresponding R&G row, but from an image that is one frame earlier than the image from which the corresponding R&G row is extracted. For example, TDI module 140 (FIG. 1) forms a series of G'&B rows associated with the respective series of lines 410(1), 410(2), and 410(3) of color area scan image sensor 400 (FIG. 4), where the series of R&G rows formed in step 1220 is also associated with the respective series of lines 410(1), 410(2), and 410(3). However, the series of G'&B rows is extracted from a respective series of sequentially captured images that is shifted in time by one frame, as compared to the series of sequentially captured images used in step 1220.

In step 1252, the shifted series of G'&B rows generated in step 1242 is integrated to form a single, shifted integrated G'&B row. For example, TDI module 140 (FIG. 1) integrates the shifted series of G'&B rows to form a single, shifted integrated G' &B row.

In step 1262, the integrated R&G row generated in step 1230 and the shifted integrated G'&B row generated in step 1252 are combined to form a single color line including at least R, G", and B data for each pixel. The odd TDI line is populated with this single color line. Thus, the odd TDI line is composed of "crossover" color pixels, as each pixel of the odd TDI line is generated from sets of photosites extracted from different image frames. In one embodiment, the R, G", and B data of each pixel of the single color line includes (a) the R data of the from the corresponding integrated R&G row, (b) the average of the G and G' data from the corresponding pixels of the integrated R&G row and the matched integrated G'&B row, respectively, and (c) the B data of the from the corresponding integrated G'&B row. In another embodiment, both G data from the integrated R&G row and G' data from the matched integrated G' &B row are retained. In this embodiment, the R, G", and B data of each pixel of the single color line includes (a) the R data of the from the corresponding integrated R&G row, (b) the G data from the corresponding pixel of the integrated R&G row, (c) the G' data from the corresponding pixel of the integrated G'&B row, and (d) the B data of the from the corresponding integrated G'&B row. For example, TDI module 140 (FIG. 1) combines the integrated R&G row generated in step 1230 with the shifted integrated G'&B row generated in step 1252 to populate the odd TDI line.

Following steps 1241 and 1242, method 1200 proceeds to perform step 360 of method 300 (FIG. 3).

Referring to the direction of object movement 430 in FIG. 4, the object moves from R and G photosites 421(1) and 422(2), respectively, to G' and B photosites 423(1) and 424(1), respectively, as time progresses. The even TDI lines are matched to the object position when the object is centered on a given line 410(*i*). The odd TDI lines are matched to the object position when the object is centered on the dividing line between the line 410(*i*) and the line 410(*i*+1). Accordingly, method 1200 utilizes the individual photosites of Bayer type color area scan image sensor 400 (FIG. 4) to generate a TDI image with double resolution.

Method 1200 may be extended to other orientations of Bayer-type photosite layout without departing from the scope hereof. For example, method 1200 may be extended to a Bayer-type photosite layout rotated by ninety degrees as compared to the layout illustrated in FIG. 4. Method 1200 may also be extended to non-Bayer type color area scan sensors without departing from the scope hereof. For example, method 1200 may be utilized to process images captured by color area scan image sensors, wherein each color pixel is composed of four unique photosites. Such color area scan image sensors include color area scan image sensors configured with an RGBE (red, green, blue, emerald) or a CYGM (cyan, yellow, green, magenta) color filter array.

Figure 15:
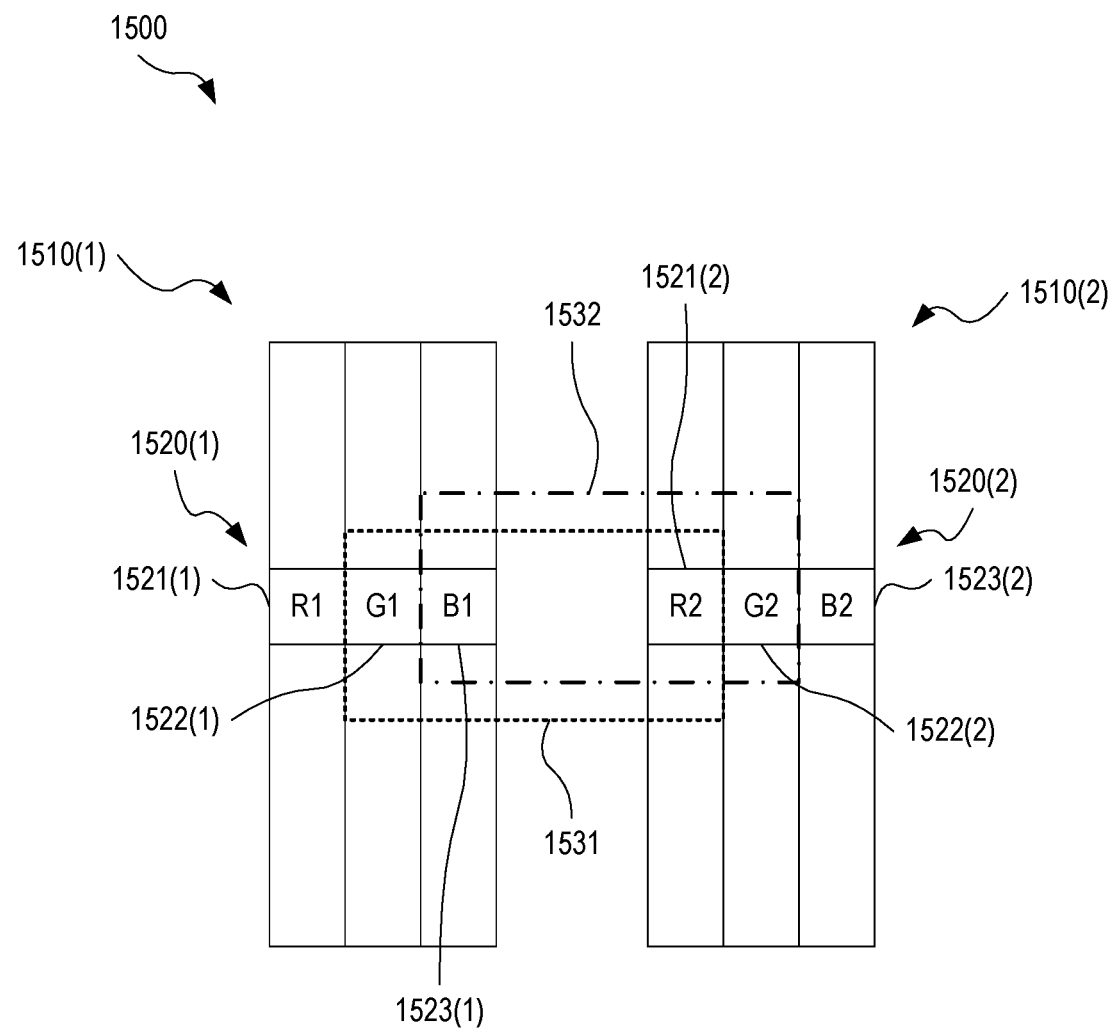
FIG. 15 illustrates a trilinear color image sensor, where individual lines of photosite are used to triple spatial resolution of a camera, according to an embodiment.

In another example, method 1200 is extended to process images captured by trilinear color image sensor 1500 of FIG. 15. In this case, the two parallel sets of sequential steps (steps 1241, 1251, and 1261, and steps 1242, 1252, and 1262) are replaced by three equivalent parallel sets of sequential steps: (a) a set of steps processing R, G, and B lines from a series of sequentially captured color pixel lines following the progression of an object through the image frame, (b) a set of steps processing R and G lines from one series of sequentially captured color pixel lines, following the progression of an object through the image frame, with B lines from another series shifted therefrom in time by one image frame, and (c) a set of steps processing R lines from one series of sequentially captured color pixel lines, following the progression of an object through the image frame, with G and B lines from another series of color pixel lines shifted therefrom in time by one image frame. Accordingly, method 1200 generates TDI images with triple temporal resolution as compared to TDI images generated using method 300 (FIG. 3).

Figure 13:
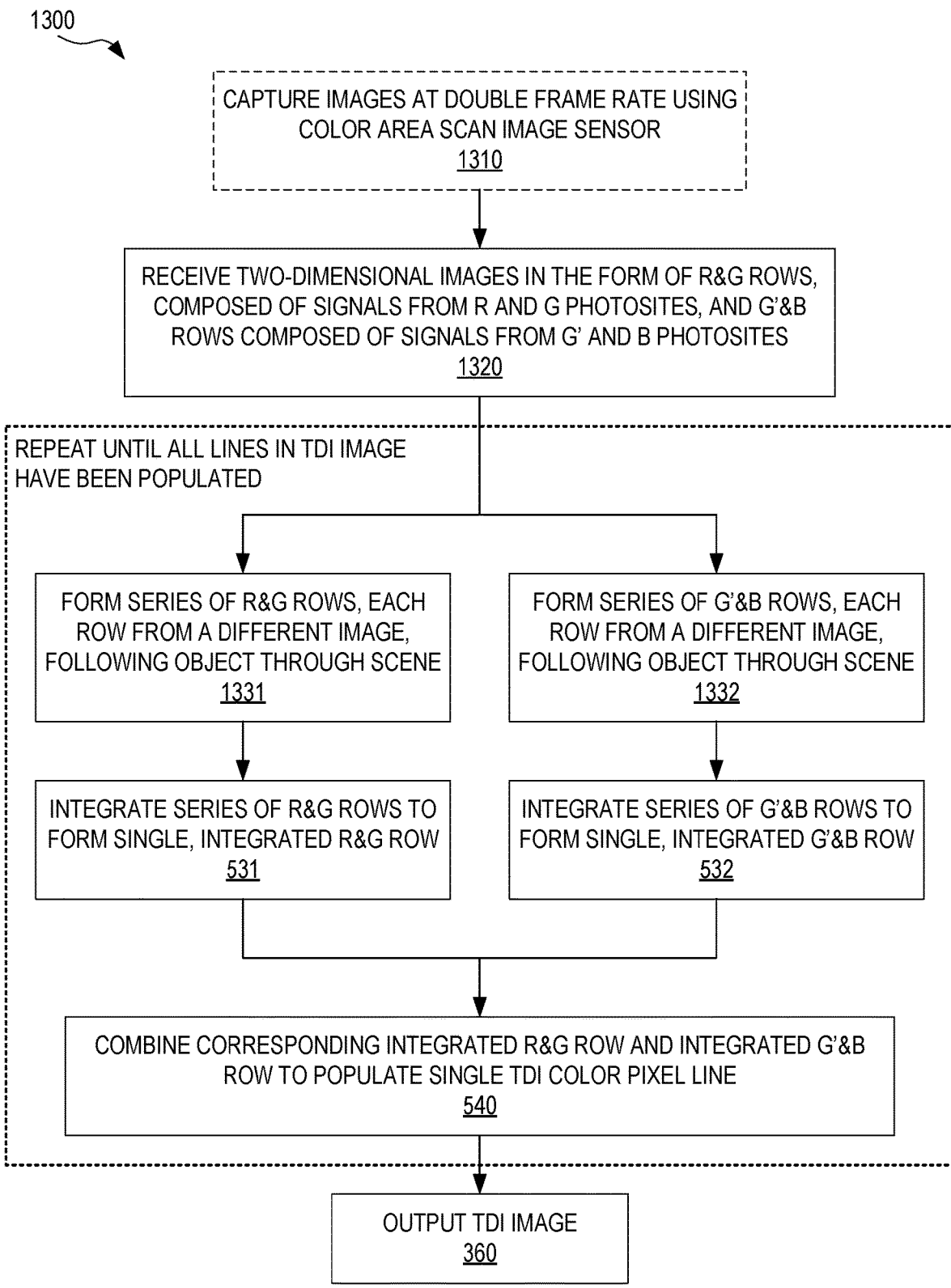
FIG. 13 illustrates a method for processing images captured by a color area scan image sensor at double frame rate to generate a TDI image with twice the resolution of the captured images, according to an embodiment.

FIG. 13 illustrates one exemplary method 1300 for generating a TDI image from images captured by a color area scan image sensor having a Bayer type pixel array. Method 1300 generates TDI images showing an object of interest with twice the resolution, as compared to the TDI images generated by method 500 (FIG. 5). Method 1300 utilizes images captured at twice the frame rate, as compared to the images processed in method 500 (FIG. 5), as well as processing of individual photosites. In the context of an event timing system, the TDI image generated by method 1300 provides twice the time resolution as compared to the TDI images generated by method 500 (FIG. 5). Method 1300 is applicable, for example, to the generation of TDI images by system 100 (FIG. 1) with color area scan image sensor 400 (FIG. 4) implemented as area scan image sensor 110 (FIG. 1). In the present discussion of method 1300, color area scan image sensor is a Bayer type image sensor. However, method 1300 may be extended to generating a TDI image using images captured by any color area image sensor where each color pixel is composed of a two-by-two photosite array, without departing from the scope hereof.

Method 1300 assumes that images 115 (FIG. 2) are captured by the color area scan image sensor at a frame rate such that an object of interest progresses through lines 118 (FIG. 2) of the color area scan image sensor at a rate of half a line per frame. The image processing of method 1300 is similar to method 500 (FIG. 5) except that the image processing of method 1300 accounts for the images being captured at twice the frame rate. Method 1300 is performed, for example, by system 100 (FIG. 1) with color area scan image sensor 400 (FIG. 4) implemented as area scan image sensor 110 (FIG. 1).

In an optional step 1310, a color area scan image sensor captures sequential images 0 through N, where N is an odd integer, of an object passing through a scene. Hence, the image series is composed of alternating even and odd number images. The color area scan image sensor captures images at a frame rate such that an object of interest progresses through the frame at a rate of half a line per frame. For example, color area scan image sensor 400 (FIG. 4) captures images 115 (FIG. 1) at a frame rate such that object 135 (FIG. 1) progresses through scene 130 (FIG. 1) at a rate of half a line 118 (FIG. 2) per frame.

In a step 1320, each two-dimensional image captured by the color area scan image sensor is received in the form of R&G rows and G'&B rows, as defined above. In an embodiment of method 1200 that includes optional step 1310, step 1320 receives the images captured in step 1310. In an embodiment of method 1300 that does not include optional step 1310, the images may be received from elsewhere, for example from a stored location. The rows are oriented parallel with the lines of method 300 (FIG. 3) such that a line of method 300 corresponds to two rows of method 1300: an R&G row composed of all R and G photosite signals, and a G'&B row composed of all G' and B photosite signals. Accordingly, an object of interest passes through the sequentially captured images at a rate of half a line per image frame. For example, TDI module 140 (FIG. 1) receives two-dimensional images 115 (FIG. 1) captured by color area scan image sensor 400 (FIG. 4) as rows, such that each line 410 (FIG. 4) is associated with two rows: (a) a row composed of all R (421) and G (422) photosite signals from line 410 and (b) a row composed of all G' (423) and B (424) photosite signals from line 410. In another example, TDI module 140 (FIG. 1) receives two-dimensional images 115 (FIG. 1), captured by color area scan image sensor 400 (FIG. 4) in an arbitrary format. TDI module 140 (FIG. 1) processes the two-dimensional images 115 (FIG. 1) to generate rows, such that each line 410 (FIG. 4) is associated with two rows: (a) a row composed of all R and G photosite signals from line 410 and (b) a row composed of all G' and B photosite signals from line 410.

Following step 1320, method 1300 proceeds to populate each line of the TDI image by performing steps 1331, 1332, 531 (FIG. 5), 532 (FIG. 5), and 540 (FIG. 5) for each line in the TDI image. Steps 1331 and 531 are performed sequentially, as are steps 1332 and 532. Sequential steps 1331 and 531 may be performed in parallel or series with sequential steps 1332 and 532.

In step 1331, a series of R&G rows, each from a different image, is formed. The series of R&G rows follows the progression of an object through a scene. The series of R&G rows is extracted from at least a portion of the even-numbered images. For example, TDI module 140 (FIG. 1) forms a series of R&G rows associated with the respective series of lines 410(1), 410(2), and 410(3) of color area scan image sensor 400 (FIG. 4). The series of R&G rows are extracted from a respective series of sequentially captured even-numbered images 115 (FIG. 1). After performing step 1331, method 1300 proceeds to perform step 531 of method 500 (FIG. 5).

In step 1332, a series of G'&B rows, each from a different image, is formed. The series of G'&B rows follows the progression of an object through a scene. The series of G'&B rows is extracted from at least a portion of the odd-numbered images. For example, TDI module 140 (FIG. 1) forms a series of G'&B rows associated with the respective series of lines 410(1), 410(2), and 410(3) of color area scan image sensor 400 (FIG. 4). The series of G'&B rows are extracted from a respective series of sequentially captured odd-numbered images 115 (FIG. 1). After performing step 1332, method 1200 proceeds to perform step 532 of method 500 (FIG. 5).

Following the performance of steps 531 and 532, method 1300 proceeds to perform step 540 of method 500 (FIG. 5) and step 360 of method 300 (FIG. 3).

Method 1300 may be extended to other orientations of Bayer-type photosite layout without departing from the scope hereof. For example, method 1300 may be extended to a Bayer-type photosite layout rotated by ninety degrees as compared to the layout illustrated in FIG. 4. Method 1300 may also be extended to non-Bayer type color area scan sensors without departing from the scope hereof. For example, method 1200 may be utilized to process images captured by color area scan image sensors, wherein each color pixel is composed of four unique photosites. Such color area scan image sensors include color area scan image sensors configured with an RGBE (red, green, blue, emerald) or a CYGM (cyan, yellow, green, magenta) color filter array.

In another example, method 1300 is extended to process images captured by trilinear color image sensor 1500 of FIG. 15. In this case, images are captured at triple frame rate. The two parallel sets of sequential steps (steps 1331 and 531, and steps 1332 and 532) are replaced by three equivalent parallel sets of sequential steps: (a) a set of steps processing R lines from a series of sequentially captured color pixels lines following the progression of an object through the image frame, (b) a set of steps processing G lines from a series of sequentially captured color pixels lines following the progression of an object through the image frame, and (c) a set of steps processing B lines from a series of sequentially captured color pixels lines following the progression of an object through the image frame. Accordingly, the TDI image generated by method 1300 has temporal resolution triple that of TDI images processed according to method 300 (FIG. 3).

Figure 14:
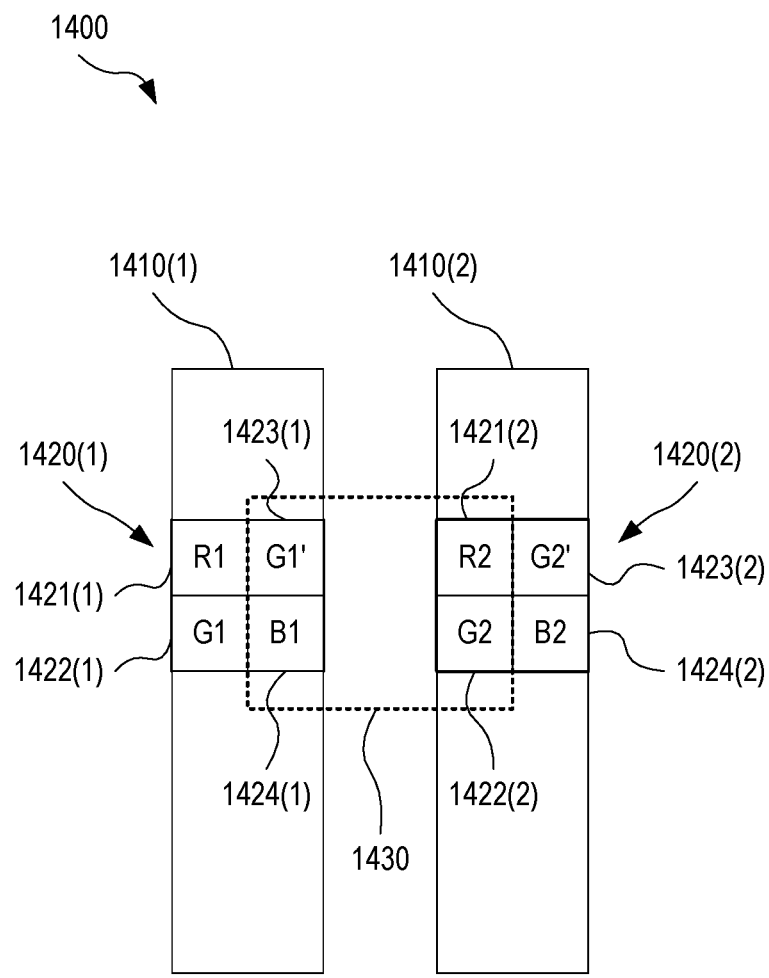
FIG. 14 illustrates a Bayer type color area scan image sensor, where individual photosites are used to double the spatial resolution of a camera, according to an embodiment.

FIG. 14 illustrates two adjacent image lines produced by a portion of one exemplary Bayer type color area scan image sensor 1400, where individual photosites are used to double the spatial resolution of a camera. Thus, color area scan image sensor 1400 is advantageously implemented in an image based event timing system. Color area scan image sensor 1400 includes a Bayer type pixel array. Each color pixel 1420 of an image generated by color area scan image sensor 1400 is composed of four photosite signals 1421, 1422, 1423, and 1424. In an embodiment, photosite signal 1421 represents red (R) light, photosite signals 1422 and 1423 represent green (G) light, and photosite signal 1424 represents blue (B) light. For a pair of adjacent image lines 1410(1) and 1410(2), three output image lines are generated. Two of the output image lines are simply the original image lines 1410(1) and 1410(2), each pixel thereof being composed of photosite signals R1 (1421(1)), G1 (1422(1)), G1' (1423(1)), and B1 (1424(1)) for image line 1410(1), and R2 (1421(2)), G2 (1422(2)), G2' (1423(2)), and B2 (1424(2)) for image line 1410(2). The third output image line is generated as crossover color pixels 1430, each composed of a combination of photosite signals from the original image lines 1410(1) and 1410(2), specifically photosite signals G1' (1423(1)) and B1 (1424(1)) of image line 1410(1) and photosites R2 (1421(2)) and G2 (1422(2)) of image line 1410(2).

An image composed of crossover color pixels in addition to original color pixels provides color pixel lines at twice the spatial resolution as compared to a color image generated without the use of crossover color pixels, as every pair of adjacent original image lines may be used to form a third image line composed of crossover color pixels. A series of such images, captured sequentially, may be processed to form a TDI image with lines at twice the resolution as compared to a TDI image based on conventional color images without crossover pixels.

The lines generated from color area scan image sensor 1400 may be used as input to TDI processing of images as discussed in connection with FIGS. 1, 2, and 3. In an embodiment, color area scan image sensor 1400 is implemented as area scan image sensor 110 in system 100. TDI module 140 processes standard color images to (a) generate higher resolution images composed of original color pixels and crossover color pixels and (b) form a TDI image, according to method 300 (FIG. 3), using both crossover pixel lines and original pixel lines. For system 100, used for example as a photo finish camera, where images are used to time an event or separate two or more events in time, this results in a doubling of the time resolution over that provided by the original images.

For comparison, the crossover color pixels of method 1200 (FIG. 12) result from a temporal cross-over of photosites performed while combining rows from different images to form the TDI image. The crossover color pixels of FIG. 14 result from a spatial cross-over of photosites in the originally captured images.

FIG. 15 illustrates two adjacent image lines produced by a portion of one exemplary trilinear color image sensor 1500, where individual lines of photosites are used to triple the spatial resolution of a camera. Accordingly, trilinear color image sensor 1500 is advantageously implemented in an image based event timing system. In one embodiment, trilinear color image sensor 1500 is a line scan image sensor with a single set of photosite lines to form a single line of color pixels. In another embodiment, trilinear color image sensor 1500 is an area scan image sensor with a plurality of sets of photosite lines forming a corresponding plurality of color pixel lines. This embodiment of trilinear color image sensor 1500 may be implemented in system 100 as area scan image sensor 110. For both of these two embodiments, each color pixel line of trilinear color image sensor 1500 is composed of three lines of photosites, each line of photosites having a different color sensitivity. In an embodiment, a color pixel line 1510 of an image generated by trilinear color image sensor 1500 is composed of signals from three photosite lines such that each color pixel 1520 of color pixel line 1510 is composed of three photosite signals 1521, 1522, and 1523 representative of red, green, and blue light, respectively.

For a pair of adjacent image lines 1510(1) and 1510(2), three output image lines are generated. Two of the output image lines are the original line image frames 1510(1) and 1510(2), each pixel thereof being composed of photosite signals R1 (1521(1)), G1 (1522(1)), and B1 (1523(1)) for image line 1510(1), and R2 (1521(2)), G2 (1522(2)), and B2 (1523(2)) for image line 1510(2). A third output image line is generated as crossover color pixels 1531, each composed of a combination of photosites from the original adjacent image lines 1510(1) and 1510(2), specifically photosite signals G1 (1522(1)) and B1 (1523(1)) of image line 1510(1) and photosite signal R2 (1521(2)) of image line 1510(2). Similarly, a fourth output image line is generated as crossover color pixels 1532 composed of combination photosites from the original adjacent image lines 1510(1) and 1510(2), specifically photosite signal B1 (1523(1)) of image line 1510(1) and photosite signal R2 (1521(2)) and G2 (1522(2)) of image line 1510(2). An image composed of crossover color pixels provides color pixel lines at three times the spatial resolution of the original color images, as every pair of adjacent original image lines may be used to form two additional line image frames composed of crossover pixels.

As discussed for FIG. 14, the image lines generated from trilinear color image sensor 1500 may be used as input to TDI processing. In an embodiment, trilinear color image sensor 1500 is implemented as area scan image sensor 110 in system 100. TDI module 140 processes standard color images to (a) generate higher resolution images composed of original color pixels and crossover color pixels and (b) form a TDI image, according to method 300 (FIG. 3), using both crossover pixel lines and original pixel lines. For system 100, used for example as a photo finish camera, where images are used to time an event or separate two or more events in time, this results in a tripling of the time resolution over that provided by the original images.

For comparison, the crossover color pixels of method 1200 (FIG. 12) result from a temporal cross-over of photosites performed while combining rows from different images to form the TDI image. The crossover color pixels of FIG. 15 result from a spatial cross-over of photosites in the originally captured images.

Figure 16:
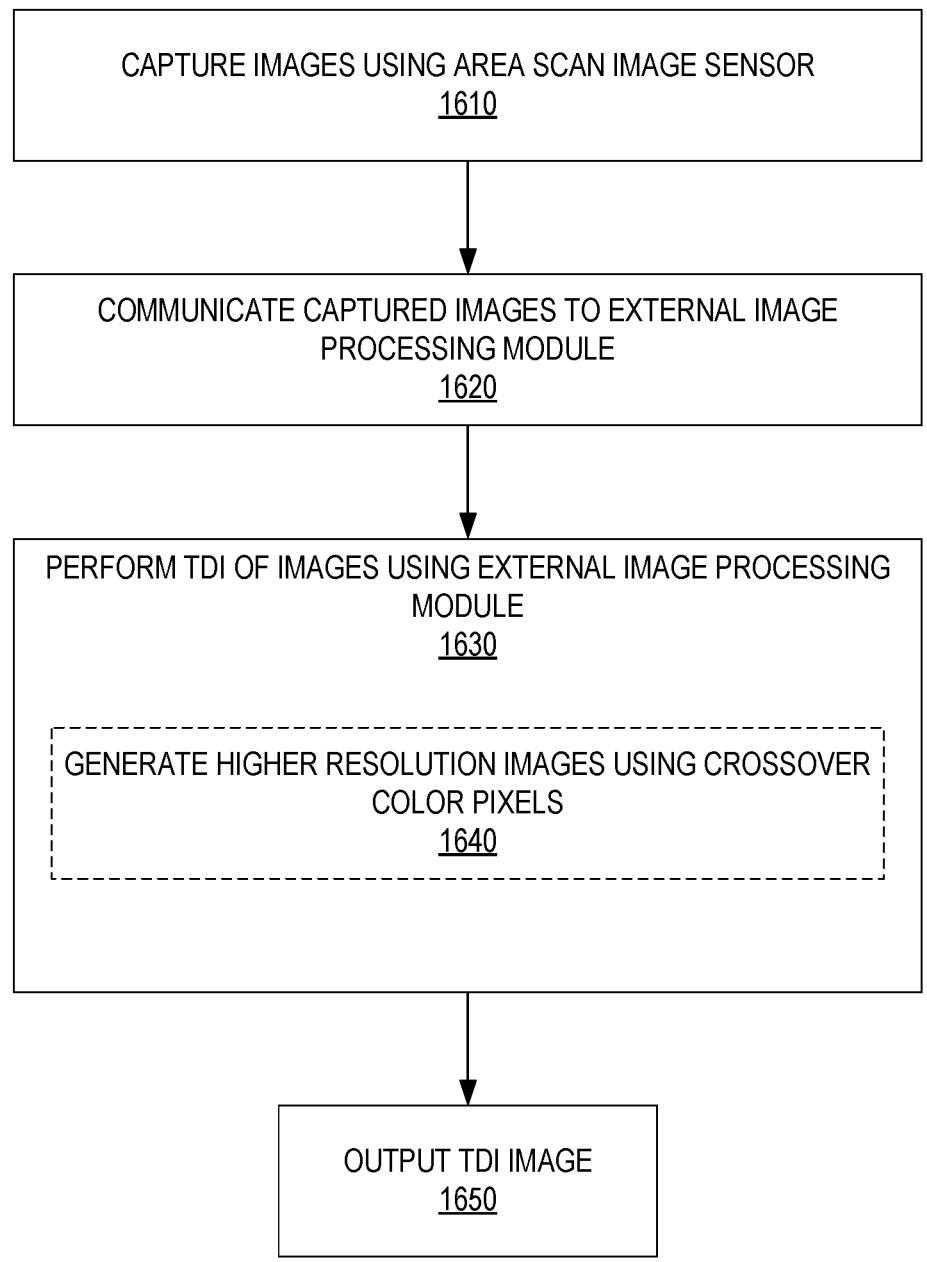
FIG. 16 illustrates a method for processing event timing images, according to an embodiment.
Figure 17:
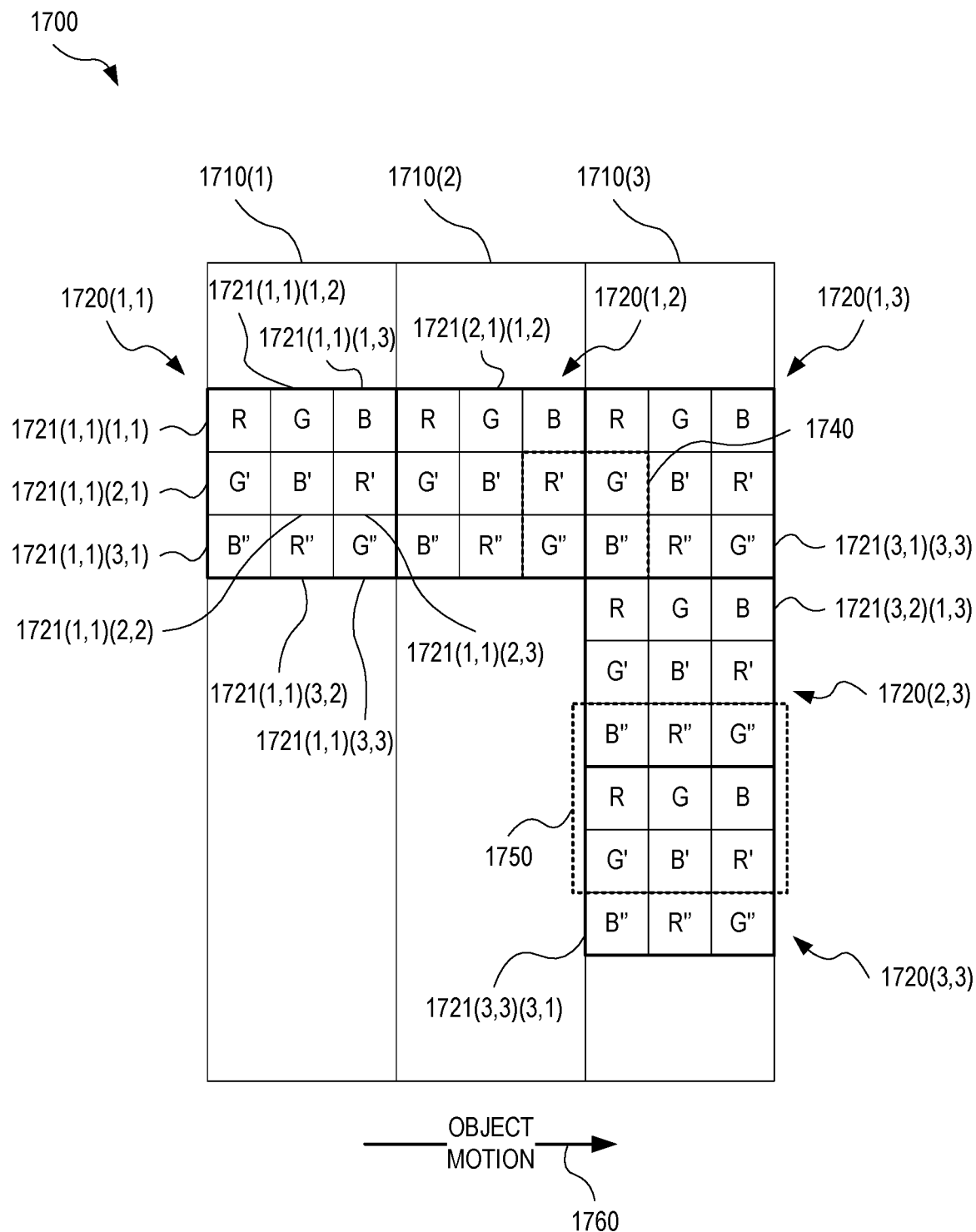
FIG. 17 illustrates a diagonal color filter array area scan image sensor, wherein individual color pixels include a 3×3 photosite array, according to an embodiment.

FIG. 16 illustrates one exemplary method 1600 for capturing and processing event timing images. Method 1600 may be executed by system 100 of FIG. 1 or system 600 of FIG. 6, for example. In a step 1610, two-dimensional images are captured by an area scan image sensor, for example area scan image sensor 110 of FIG. 1, color area scan image sensor 400 of FIG. 4, filtered area scan image sensor 1000 of FIG. 10, color area scan image sensor 1400 of FIG. 14, trilinear color image sensor 1500 of FIG. 15, or diagonal CFA area scan image sensor 1700 (FIG. 17). In a step 1620, the captured images are communicated to an external image processing module, for example TDI module 140 of FIG. 1. In a step 1630, the external image processing module performs TDI of the captured images and/or the high resolution images generated in optional step 1630. If the captured images are color images captured by a color sensor such as color area scan image sensor 400 (FIG. 4), color area scan image sensor 1300 (FIG. 13), trilinear color image sensor 1400 (FIG. 14), or diagonal CFA area scan image sensor 1700 (FIG. 17), step 1630 may include a step 1640, wherein higher resolution images may be generated using crossover color pixels. This is discussed for temporal cross-over in connection with method 1200 (FIG. 12), and for spatial cross-over in connection with FIGS. 14 and 15. TDI may be performed by TDI module 140 (FIG. 1) using method 300 of FIG. 3, method 500 of FIG. 5, method 1200 of FIG. 12, or method 1300 of FIG. 13. A step 1650 outputs the TDI image. Step 1650 may be performed by interface 150 of FIG. 1.

In one embodiment, the external image processing module outputs the TDI image when complete. In another embodiment, the external image processing module outputs the TDI image one pixel, row, or line at a time, in the manner that the pixels, rows, or lines are generated by the external image processing module.

In certain embodiments, steps 1610 and 1620 are omitted. A data processing system, such as TDI module 140 (FIG. 1) or a computer with image processing capability, receives images captured by an area scan image sensor and performs steps 1630 and 1650.

FIG. 17 illustrates one exemplary diagonal color filter array (CFA) area scan image sensor 1700, wherein each color pixel includes a 3×3 photosite array. Diagonal CFA area scan image sensor 1700 offers enhanced image processing flexibility and extends the high one-dimensional resolution provided by trilinear color image sensor 1500 (FIG. 15) to two dimensions. Diagonal CFA area scan image sensor 1700 is composed of lines 1710($i$), where i is a positive integer. Three exemplary adjacent lines 1710(1), 1710(2), and 1710(3) are shown in FIG. 17, although diagonal CFA image sensor 1700 may have any number of lines 1710, without departing from the scope hereof. Each line 1710($i$) is composed of color pixels 1720($i,j$), where j indicates the vertical position, as oriented in FIG. 17, of color pixel 1720($i,j$) within line 1710($i$). FIG. 17 shows three exemplary color pixels: color pixel 1720(1,1) in line 1710(1), color pixel 1720(1,2) in line 1710(2), and color pixels 1720(1,3), 1720(2,3), and 1720(3,3) in line 1710(3). Each line 1710($i$) may include any number of color pixels 1720 ($i,j$). In certain embodiments, all lines 1710 include the same number of color pixels 1720.

Each color pixel 1720($i,j$) includes a 3×3 array of photosites 1721($i,j$)($n,m$), where n and m are positive integers smaller than or equal to three. Not all photosites 1721 are explicitly numbered in FIG. 17. Each color pixel 1720($i,j$) includes photosites 1721($i,j$)(1,1), 1721($i,j$)(2,3), and 1721($i,j$)(3,2), sensitive to a first color, photosites 1721($i,j$)(1,2), 1721($i,j$)(2,1), and 1721($i,j$)(3,3), sensitive to a second color, and photosites 1721($i,j$)(1,3), 1721($i,j$)(2,2), and 1721($i,j$)(3,1), sensitive to a third color. In an embodiment, the first, second, and third colors are red (R), green (G), and blue (B). However, diagonal CFA image sensor 1700 may be implemented using other color sensitivity configurations, such as cyan, magenta, and yellow, without departing from the scope hereof. According to the illustration in FIG. 17, photosites of same color sensitivity form diagonal lines. Color pixels 1720 may be oriented differently, for example such that the diagonal lines formed by photosites of same color sensitivity are rotated by ninety degrees, as compared to FIG. 17, without departing from the scope hereof. Photosites 1721 are arranged such that any column of three photosites includes a first-color photosite, a second-color photosite, and a third-color photosite, and any row of three photosites includes a first-color photosite, a second-color photosite, and a third-color photosite, wherein the first-, second-, and third-color photosites are sensitive to light of first, second, and third color, respectively. This arrangement offers increased flexibility for grouping of photosites 1721 during processing of photosite signals generated by photosites 1721 of diagonal CFA area scan image sensor 1700.

In one use scenario, images captured by diagonal CFA image sensor 1700 are processed retaining individual color pixels 1720 as separate items throughout processing. In this scenario, images are processed according to, for example, method 300 (FIG. 3). Method 500 of FIG. 5 is extendable to processing of images captured by diagonal CFA image sensor 1700, for example as hereinafter discussed. Step 510 is extended to receive three rows: an R&G'&B" row, a G&B'&R" row, and a B&R'&G" row. Parallel processes including steps 521 and 531 and steps 522 and 532 are extended to include three equivalent parallel processes operating on the R&G'&B", G&B'&R", and B&R'&G" rows, respectively. Step 540 is extended to combine data from three integrated rows.

In another use scenario, images captured by diagonal CFA image sensor 1700 are processed using 2×2 photosite groups. Each 2×2 photosite groups may be fully within a single color pixel 1720 or include photosites from two, three, or four adjacent color pixels 1720. In the latter case, a "full coverage set" of 2×2 photosite groups may be selected such that the set spans all photosites of diagonal CFA image sensor 1700, or a contiguous portion thereof. An exemplary 2×2 photosite group is indicated in FIG. 17 as 2×2 crossover color pixel 1740. This is equivalent to Bayer type color area scan image sensor 400 (FIG. 4) except that the 2×2 photosite groups of diagonal CFA image sensor 1700 do not all have the same photosite layout. However, all 2×2 photosite groups include three different photosite types and therefore provide as complete color information as the color pixels of a Bayer type image sensor, such as color pixels 420 of Bayer type color area scan image sensor 400 (FIG. 4). In this use scenario, images captured by diagonal CFA image sensor 1700 are processed according to one or more of methods 300 (FIG. 3), 500 (FIG. 5), 1200 (FIG. 12), 1300 (FIG. 13), or 1600 (FIG. 16). When processing images captured by diagonal CFA image sensor 1700 according to methods 1300 (FIG. 13) or 1600 (FIG. 16), a full coverage set of 2×2 photosite groups may be utilized to produce TDI images with twice the resolution of captured images segmented into 2×2 photosite groups. When processing images according to methods 500 (FIG. 5), 1300 (FIG. 13), or 1600 (FIG. 16), processing is adapted to account for the fact that not all 2×2 photosite groups have the same photosite layout. Further, in the case of method 1300 (FIG. 13) applied to diagonal CFA image sensor 1700, images are captured at triple frame rate, such that an object of interest moves at a rate of a third of a line 1710 per frame.

In yet another use scenario, images captured by diagonal CFA image sensor 1700 are processed using color pixels 1720 as well as horizontal crossover color pixels composed of 3×3 photosite arrays spanning portions of two adjacent color pixels 1720 located at the same vertical position in FIG. 17. Horizontal crossover pixels are processed, for example, in the same way as images captured by trilinear color image sensor, according to methods 1200 (FIG. 12), 1300 (FIG. 13), and 1600 (FIG. 16).

Diagonal CFA area scan image sensor 1700 has utility for generation of TDI images, but may also be advantageous for use in other applications typically performed by line-scan cameras.

Figure 18:
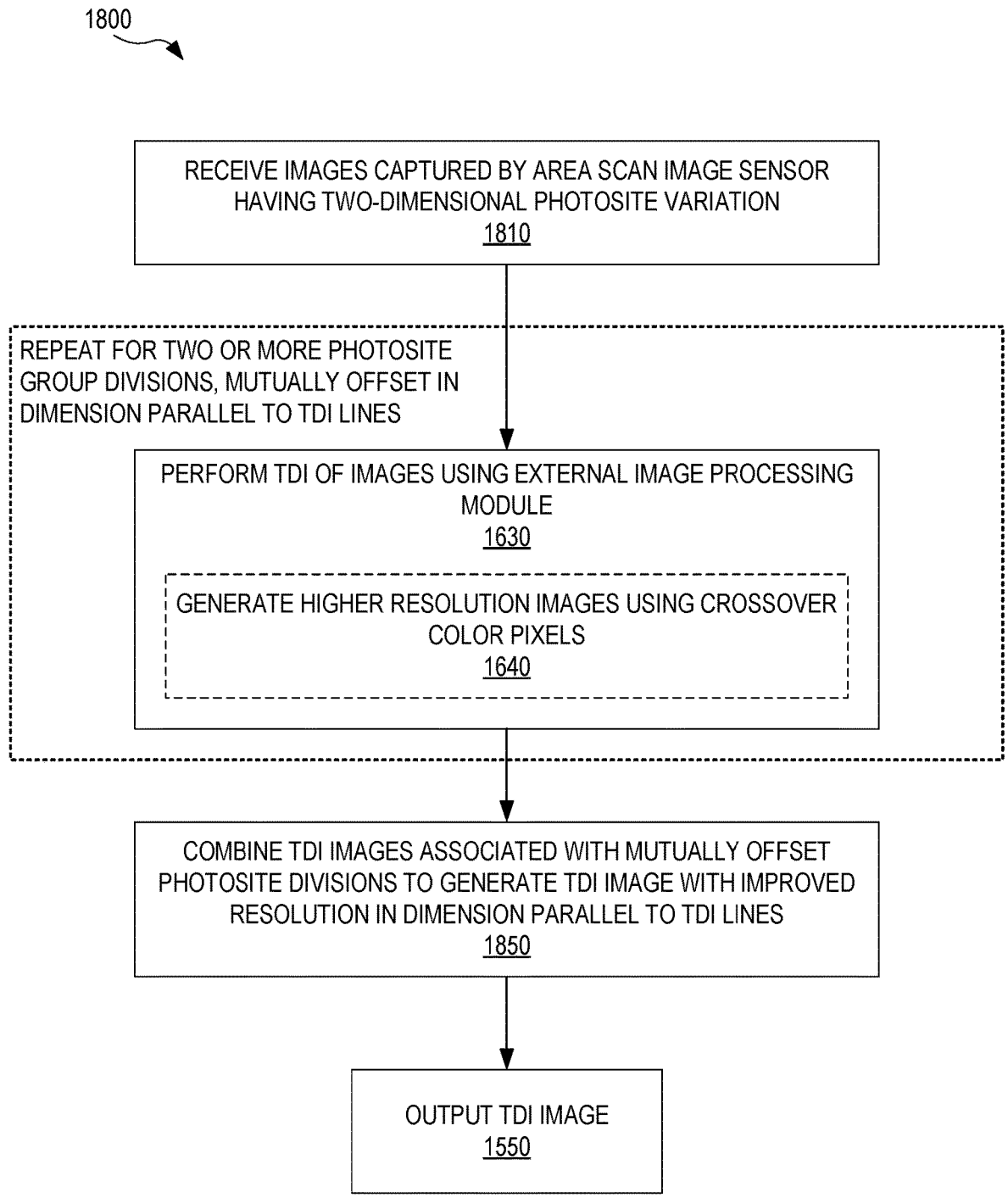
FIG. 18 illustrates a method for processing event timing images captured by a color area scan image sensor having color pixels with two-dimensional photosite variation, according to an embodiment.

FIG. 18 illustrates one exemplary method 1800 for processing event timing images captured by a color area scan image sensor having color pixels with two-dimensional photosite variation. Examples of color area scan images sensors having two-dimensional photosite variation include Bayer type color area scan image sensor 400 (FIG. 4) and diagonal CFA area scan image sensor 1700 (FIG. 17). Method 1800 generates TDI images with improved resolution in the dimension parallel to the TDI lines. Optionally, TDI is performed at improved resolution such that the TDI image has improved resolution in two dimensions. Method 1800 is performed, for example, by TDI module 140 (FIG. 1).

In a step 1810, method 1800 receives images captured by a color area scan image sensor having color pixels with two-dimensional photosite variation. For example, TDI module 140 receives images captured by diagonal CFA image sensor 1700 (FIG. 17) implemented as area scan image sensor 110 (FIG. 1). After performing step 1810, method 1800 performs step 1630 (FIG. 16) for two or more photosite group divisions of the captured images, where the two or more photosite group divisions are mutually shifted in the dimension parallel to the TDI lines.

Referring to FIG. 17, an assumed direction of motion for an object of interest is indicated by arrow 1760. Hence, TDI lines are orthogonal to arrow 1760 and parallel with lines 1710. For images captured by diagonal CFA image sensor 1700, step 1630 is performed for (a) a photosite group division aligned, in the dimension parallel with lines 1710, with color pixels 1720, (b) a photosite group division shifted from color pixels 1720 by one photosite row, in the dimension parallel with lines 1710 (for example aligned with photosite group 1750), and (c) a photosite group division shifted from color pixels 1720 by two photosite rows, in the dimension parallel with lines 1710.

Referring to FIG. 4, an assumed direction of motion for an object of interest is indicated by arrow 430. Hence, TDI lines are orthogonal to arrow 430 and parallel with lines 410. For images captured by Bayer type color area scan image sensor 400, step 1630 is performed for (a) a photosite group division aligned, in the dimension parallel with lines 410, with color pixels 420, and (b) a photosite group division shifted from color pixels 420 by one photosite row, in the dimension parallel with lines 410.

The multiple iterations of step 1630 generate respective TDI images with its respective color pixels centered on mutually shifted locations, in the dimension parallel with the TDI lines. Optionally, step 1630 includes step 1640 such that the TDI image has improved resolution in the dimension orthogonal to the TDI lines. In an embodiment not illustrated in FIG. 18, step 1630 is replaced by method 1300 (FIG. 13), which also provides improved resolution in the dimension orthogonal to the TDI lines.

In a step 1850, the TDI images generated in the multiple iterations of step 1630 are combined to form a TDI image with improved resolution in the dimension parallel with the TDI lines. For example, TDI module 140 combines TDI images generated in step 1630. This may be done using the same method as discussed in connection with FIG. 14, however in the orthogonal dimension. After performing step 1850, method 1800 performs step 1650 (FIG. 16).

Accordingly, method 1800 is capable of utilizing the individual photosite data to maximize resolution in both dimensions. In the case of images captured by Bayer type color area scan image sensor 400 (FIG. 4), the resolution may be doubled in both dimensions, as compared to the color pixel resolution of Bayer type color area scan image sensor 400. In the case of images captured by diagonal CFA image sensor 1700 (FIG. 17), the resolution may be tripled in both dimensions as compared to the color pixel resolution of diagonal CFA image sensor 1700.

Figure 19:
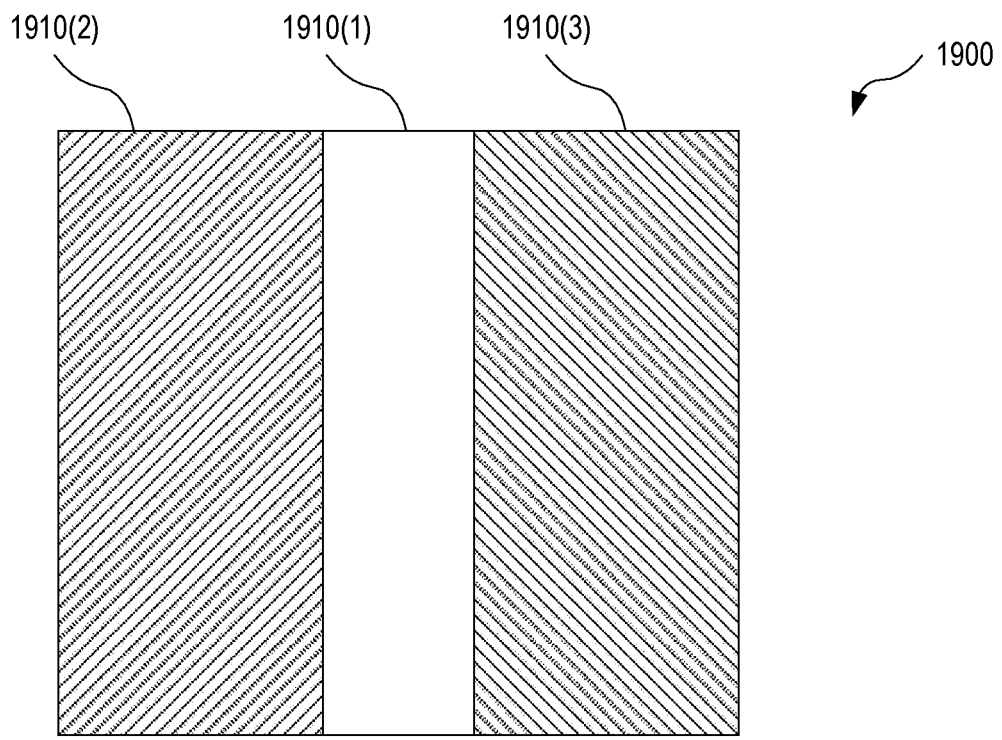
FIG. 19 illustrates two exemplary color area scan image sensors having multiple regions with different color filter array properties, according to embodiments.
Figure 19:
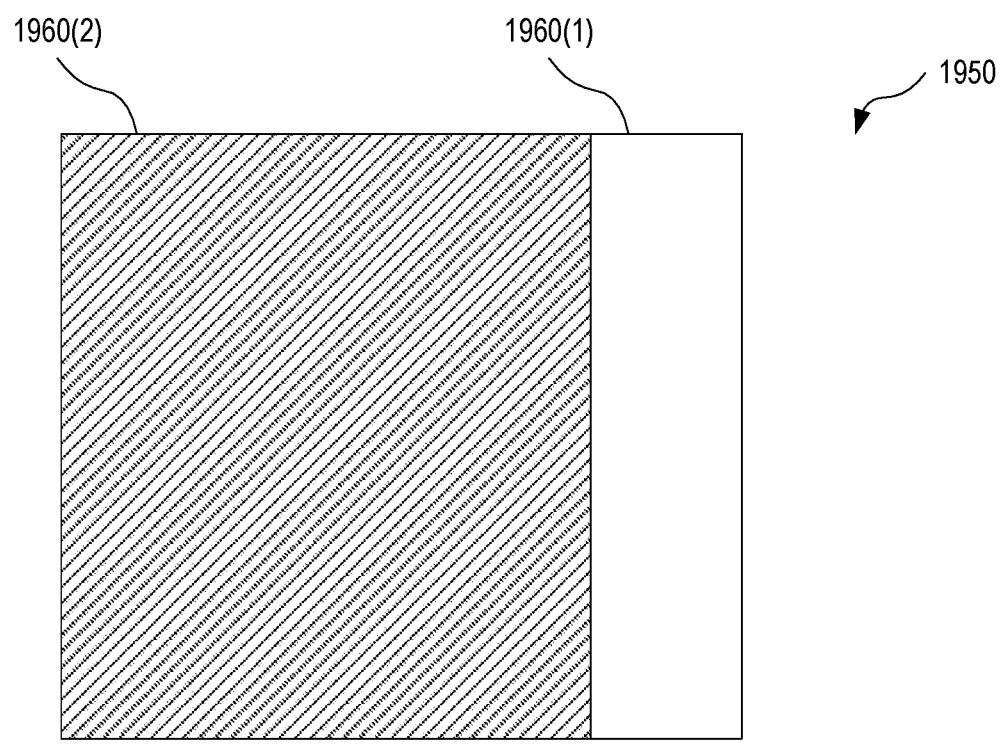

FIG. 19 illustrates two exemplary color area scan image sensors 1900 and 1950 having multiple regions with different color filter array properties. Color area scan image sensors 1900 and 1950 are advantageously implemented in an event timing system such as system 100 (FIG. 1).

Color area scan image sensor 1900 includes three regions: region 1910(1) configured with a color filter array optimized for high-resolution TDI, and regions 1910(2) and 1910(3) configured with a Bayer-type color filter array as discussed in connection with FIG. 4. In certain embodiments, region 1910(1) is located on the optical axis of the imaging objective used to form images on color area scan image sensor 1900. Thus, a TDI image generated from images captured by region 1910(1) may form an ideal side view of an object of interest travelling in a direction orthogonal to the optical axis. For example, color area scan image sensor 1900 is implemented as area scan image sensor 110 in system 100 (FIG. 1), and region 1910(1) is located on the optical axis of imaging objective 120. TDI image information may be extracted from region 1910(1) while regions 1910(2) and 1910(3) provide standard two-dimensional images and/or additional TDI images.

Color area scan image sensor 1950 includes two regions: region 1960(1) configured with a color filter array optimized for high-resolution TDI, and region 1960(2) configured with a Bayer-type color filter array as discussed in connection with FIG. 4. In certain embodiments, region 1960(1) is located on the optical axis of the imaging objective used to form images on color area scan image sensor 1950. Thus, a TDI image generated from images captured by region 1960(1) may form an ideal side view of an object of interest travelling orthogonal to the optical axis. For example, color area scan image sensor 1950 is implemented as area scan image sensor 110 in system 100 (FIG. 1), and region 1960(1) is located on the optical axis of imaging objective 120. This requires shifting the center of color area scan image sensor 1950 away from the optical axis of imaging objective 120. TDI image information may be extracted from region 1960(1) while region 1960(2) provides standard two-dimensional images and/or additional TDI images.

Color area scan image sensor 1900 and 1950 may be modified to include more regions and/or regions of other color filter array configurations, in addition to the respective TDI dedicated regions 1910 and 1920, without departing from the scope hereof.

Figure 20:
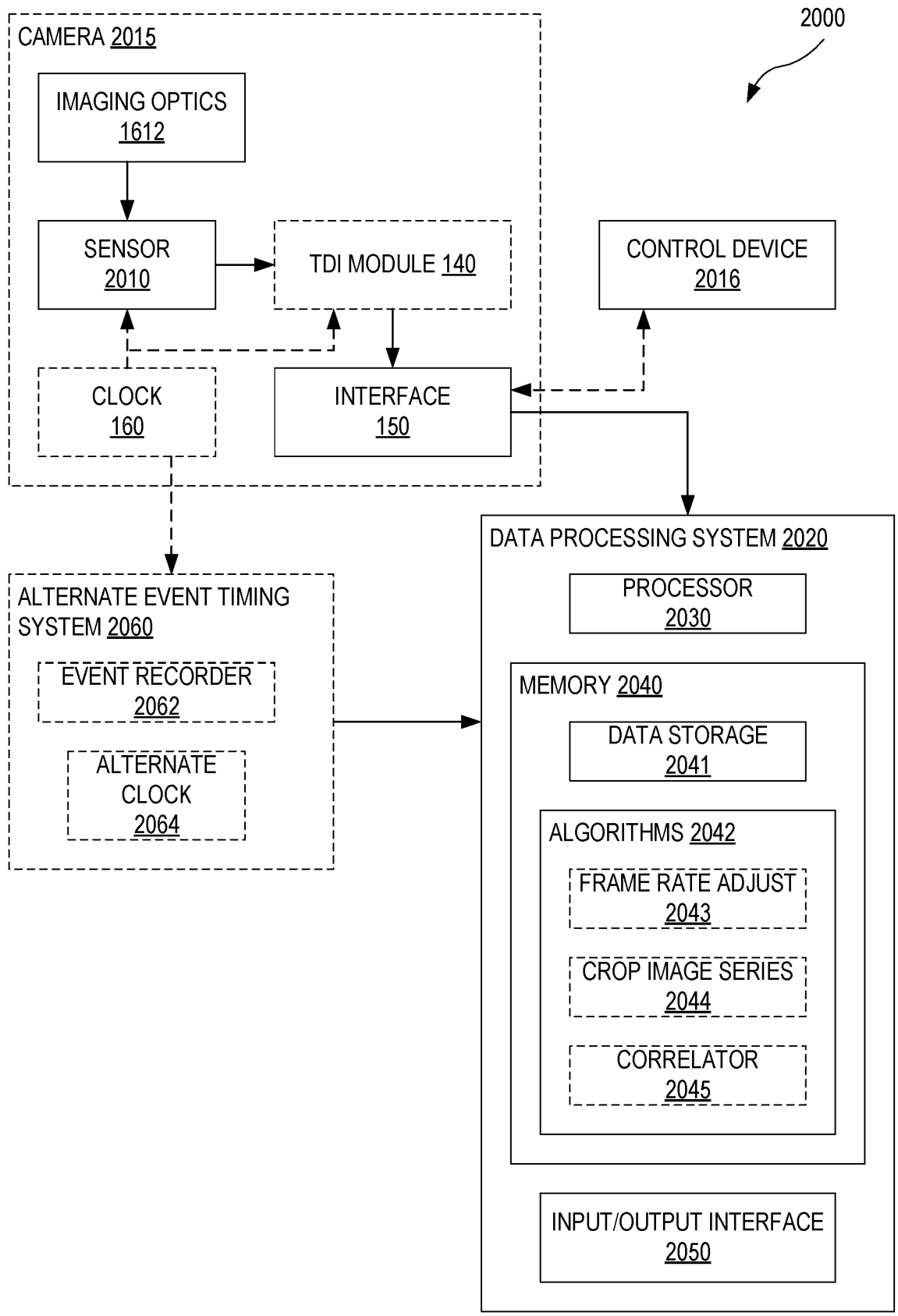
FIG. 20 illustrates a system for recording and optionally event timing images, according to an embodiment.

FIG. 20 shows one exemplary system 2000 for image capture and, optionally, timing of events using a sensor 2010. In an embodiment, system 2000 incorporates system 100 of FIG. 1. Sensor 2010 is in communication with a data processing system 2020 through interface 150 (FIGS. 1 and 2). Optionally, TDI module 140 (FIG. 1) performs TDI processing of images captured by sensor 2010, through imaging optics 2012, and communicates TDI images to data processing system 2020 through interface 150. Sensor 2010, or optional TDI module 140, may time stamp images using time from clock 160. In one embodiment, sensor 2010 is an area scan image sensor, for example a CMOS area scan image sensor. In another embodiment, sensor 2010 is a line scan sensor. In yet another embodiment, sensor 2010 is color area scan image sensor 400 of FIG. 4 or color area scan image sensor 1400 of FIG. 14. In a further embodiment, sensor 2010 is trilinear color image sensor 1500 of FIG. 15. In an additional embodiment, sensor 2010 is filtered area scan image sensor 1000 of FIG. 10. Sensor 2010, imaging optics 2012, optional TDI module 140, interface 150, and optional clock 160 may be integrated in a camera 2015. Data processing system 2020 includes a processor 2030, memory 2040, and an input/output interface 2050. Memory 2040 includes a data storage 2041, for storing images sent to data processing 2020 from interface 150 and results of processing performed by data processing 2020. Memory 2040 further includes algorithms 2042, implemented as machine-readable instructions in a memory 2040, for processing of images received from interface 150. In an embodiment, algorithms 2042 are located in a non-volatile portion of memory 2040. In another embodiment, data processing system 2020 retrieves algorithms 2042 from a non-volatile memory, located externally to data processing system 2020, and stores algorithms 2042 to a volatile portion of memory 2040. Input/output interface 2050 provides two-way communication with a user.

In certain embodiments, input/output interface 2050 is a wireless interface. For example, input/output interface 2050 is a WiFi or Bluetooth interface. In this embodiment, a mobile device, such as a cellular phone or a smartphone, may be used to control camera 2015 and/or receive data therefrom. This mobile device may function as data processing system 2020, or be a separate control device 2016.

Optionally, system 2000 includes an alternate event timing system 2060. Alternate event timing system 2060 includes an event recorder 2062 and, optionally, an alternate clock 2064. Alternate event timing system 2060 detects and identifies events and assigns a time to each such event using a clock. In an embodiment, time is provided by alternate clock 2064. In another embodiment, time is provided by clock 160. Alternate event timing system 2060 may not be based on imaging of the events but use other forms of event detection. In one embodiment, alternate event timing system 2060 provides timing at greater or lesser accuracy than that provided by the camera based system composed of camera 2015, clock 160, and optional TDI module 140. Alternate clock 2064 may be based on a Global Positioning System (GPS) time signal. A GPS based embodiment of clock 2064 has particular utility when system 2000 is operated in conjunction with other event timing systems, such that these may be synchronized with each other.

In certain embodiments, alternate event timing system 2060 is based on a radio-frequency identification. Objects, e.g., race participants, are tagged with a radio-frequency identification (RFID) chip. Event recorder 2062 and alternate clock 2064 are a radio-frequency timing system that detects and identifies RFID chips when they come into proximity to event recorder 2062.

Figure 21:
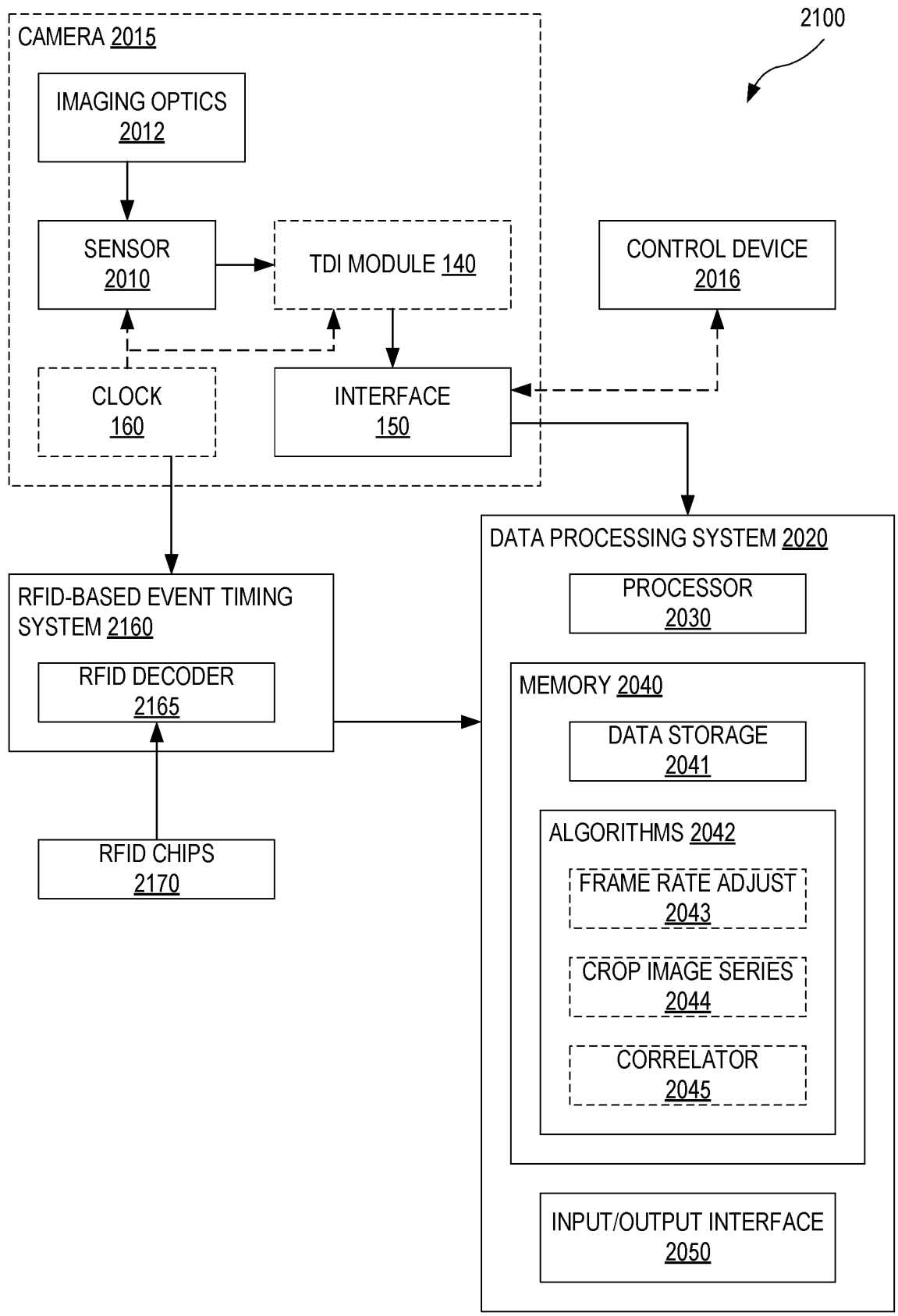
FIG. 21 illustrates a system for processing event timing images using a camera and radio-frequency identification, according to an embodiment.

FIG. 21 illustrates one exemplary embodiment of system 2000 of FIG. 20, in which alternate event timing system 2060 is an RFID-based event timing system 2160 that includes an RFID decoder 2165. Objects are tagged with RFID chips 2170 that are detected and identified by RFID decoder when in proximity. RFID-based event timing system 2160 receives time from clock 160 associated with camera 2010, eliminating the need for synchronization of two separate clocks.

Figure 22:
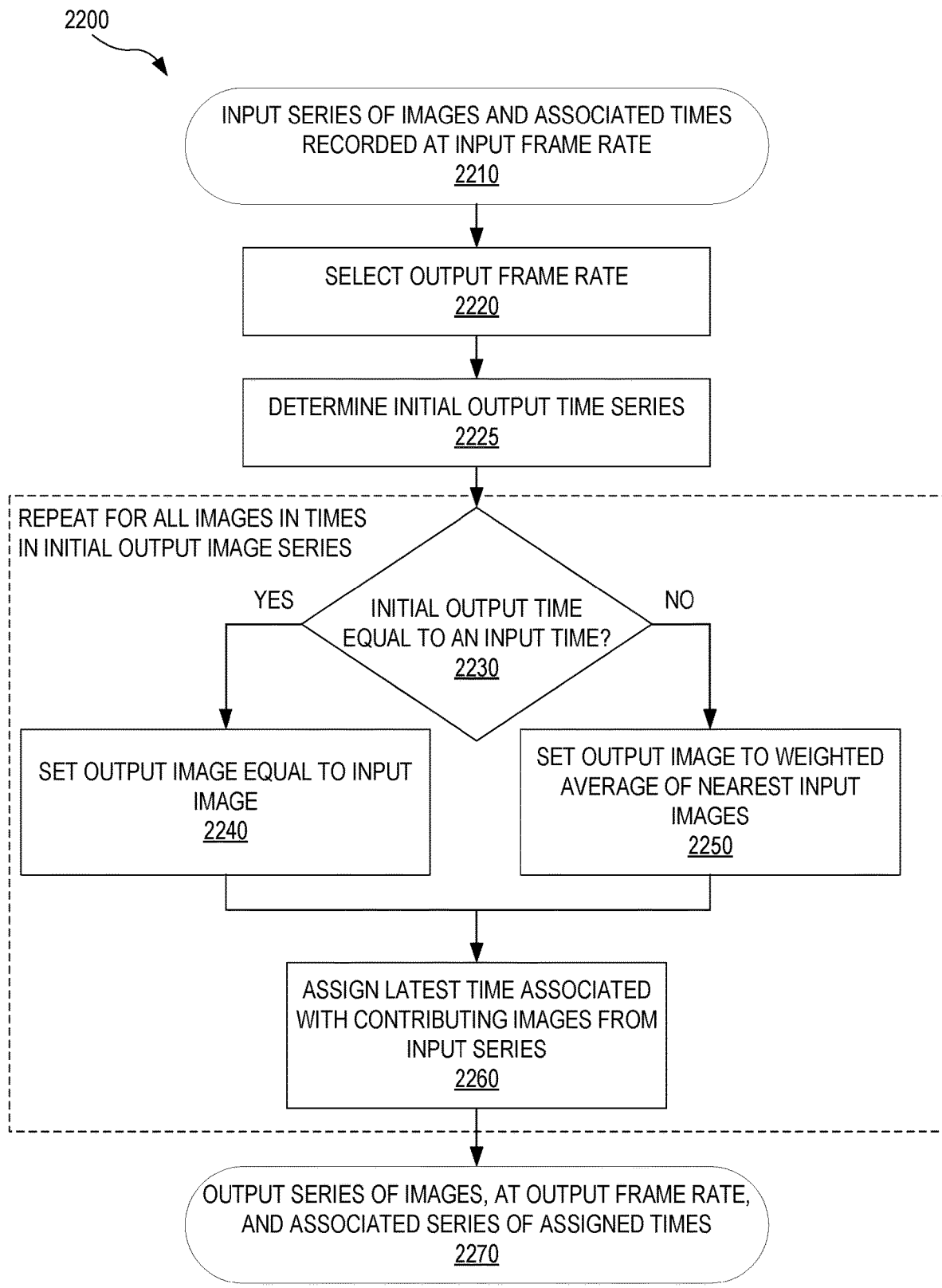
FIG. 22 illustrates a method for capturing event timing images, according to an embodiment.

FIG. 22 is a flowchart illustrating one exemplary method 2200 for processing a series of input images, captured at an input frame rate, and associated times to generate a series of output images, corresponding to an arbitrary frame rate, and associated times. The images are provided by an event recording and timing system, e.g., systems 100, 600, 2000 or 2100 of FIGS. 1, 6, 20 and 21, respectively. Method 2200 may be used to modify the time resolution of an image based event timing system subsequent to image capture. In an embodiment, method 2200 is implemented in data processing system 2020 (FIGS. 20 and 21) as frame rate adjust algorithm 2043 and executed by processor 2030 of data processing system 2020.

A series of input images, captured at an input frame rate, and timing are received from, e.g, interface 150 of system 2000 (FIG. 20) or 2100 (FIG. 21) in a step 2210. In a step 2220, an output frame rate is selected. In one example of step 2220, a user specifies an output frame rate. This output frame rate is communicated to data processing system 2020 of system 2000 (FIG. 20) or 2100 (FIG. 21) through input/output interface 2050. In a step 2225, an initial output time series is determined, where the initial output time series corresponds to images captured at the output frame rate selected in step 2220.

Steps 2230 through 2260 are repeated for all initial output times. A step 2230 evaluates the initial output time under consideration. If the initial output time is identical to an input time, method 2200 proceeds to step 2240, wherein the output image is set to equal the input image associated with the input time. If the initial output time is not identical to an input time, method 2200 proceeds to a step 2250. In step 2250, the output image associated with the initial output time is calculated as a weighted average of input images captured close to the initial output time. In an embodiment, the output image is calculated as a weighted average of two input images: the input image captured nearest the initial output time and prior thereto and the input image captured nearest the initial output time and subsequent thereto. The weights of the weighted average may decrease with increasing time difference between the initial output time and the input time associated with input images contributing to the weighted average. From both step 2240 and 2250, method 2200 proceeds to a step 2260. In step 2260, a final output time is assigned to the output image generated in either step 2240 or step 2250. The final output time is set to equal the latest of the input times associated with input images contributing to the output image. Steps 2225 through 2260 may be executed by processor 2030 of FIGS. 20 and 21 according to instructions in frame rate adjust algorithm 2043 (FIGS. 20 and 21). In a step 2270, the output images and associated final output times are outputted, for example to a user or computer system by input/output interface 2050 (FIGS. 20 and 21).

Figure 23:
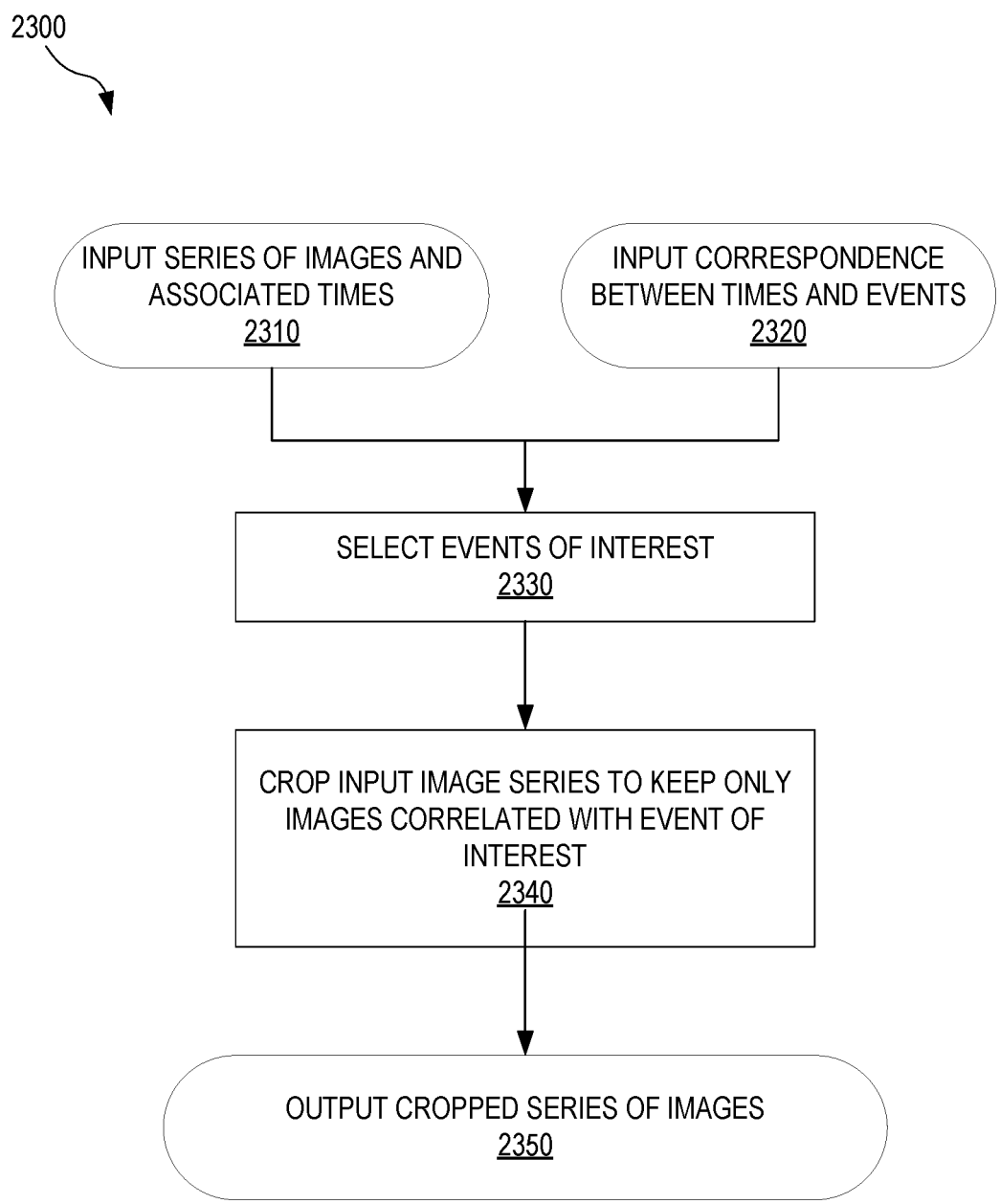
FIG. 23 illustrates a method for cropping an image series to remove images not associated with an event of interest, according to an embodiment.

FIG. 23 is a flowchart illustrating one exemplary method 2300 for automatically reducing the amount of image data generated by an event timing system utilizing image capture, such as systems 100 (FIG. 1), 600 (FIG. 6), 2000 (FIG. 20), and 2100 (FIG. 21). Method 2300 may be implemented in data processing system 2020 (FIGS. 20 and 21) as algorithm crop image series 2044. In a step 2310, a series of image and associated times are provided, for example by interface 150 (FIGS. 1, 20, and 21). In a step 2320, the correspondence between events, such as a race participant crossing the finish line, and times are provided. The correspondence provided in step 2320 may be generated by processor 2030 (FIGS. 20 and 21) according to instructions in a correlator algorithm 2045 (FIGS. 20 and 21). In one embodiment, events are identified by alternate event timing system 2060 (FIG. 20) or RFID based event timing system 2160 (FIG. 21). In another embodiment, events are identified by TDI module 140 (FIGS. 1, 20, and 21) using edge detection.

After performing steps 2310 and 2320, method 2300 proceeds to step 2330, wherein events of interest are selected. Events of interest may be predefined as, e.g., the first N events (where N is a specified, positive integer), events associated with certain RFIDs, or events associated with the occurrence of multiple events within a short time frame. In a step 2340, the image series is cropped by removing images not associated with an event of interest, e.g., images captured a specified time interval before or after the time associated with the event of interest. Steps 2330 and 2340 may be performed exclusively by processor 2030 (FIGS. 20 and 21) based on the instructions embedded in crop image series algorithm 2044, or in combination with user input provided through input/output interface 2050 (FIGS. 20 and 21). A step 2350 outputs the cropped images series generated in step 2040. In an embodiment, step 2350 is performed by input/output interface 2050 (FIGS. 20 and 21).

In embodiments where events are identified in real time, using one or more of alternate event timing system 2060 (FIG. 20), RFID based event timing system 2160 (FIG. 17), and TDI module 140 (FIGS. 1, 20, and 21), method 2300 may be performed only at times when events are identified. For example, TDI module 140 (FIGS. 1, 20, and 21) may include a circular buffer. TDI module 140 may evaluate the circular buffer using edge detection. Upon detection of an edge, indicative of an event, the relevant input series is communicated to data processing system 2020 (FIGS. 20 and 21) for execution of steps 2340 and 2350.

Figure 24:
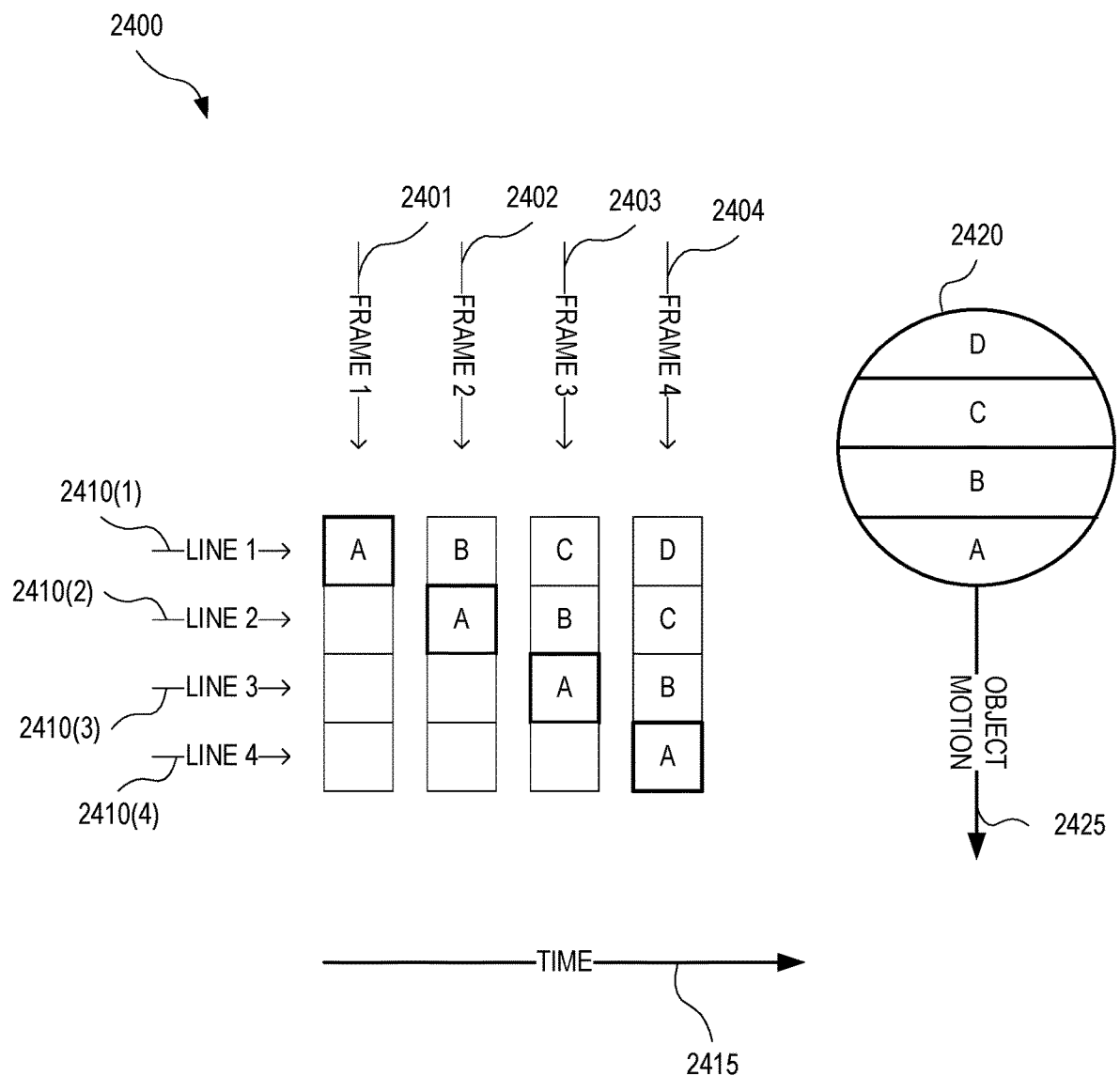
FIG. 24 illustrates a method for processing event timing images, including generating time delay integration images of a moving object, according to an embodiment.

FIG. 24 illustrates one exemplary scenario 2400 and associated method for capturing images of a moving object 2420 using an image sensor with four lines 2410(1), 2410(2), 2410(3), and 2410(4). In an embodiment, lines 2410(i) are pixel lines of an area scan sensor. In certain embodiments, lines 2410(i) are pixel lines selected from a larger number of pixel lines of an area scan sensor. In the scenario illustrated in FIG. 24, four frames 2401, 2402, 2403, and 2404 are captured as a function of time (2415) while object 2420 moves across the image field associated with lines 2410(1), 2410(2), 2410(3), and 2410(4). The lines 2410(i) are oriented perpendicular to the direction of motion (2425) of object 2420.

For illustration purposes, object 2420 is segmented into four areas A, B, C, D of equal size in the dimension parallel to the direction of motion of object 2420. The frame rate at which frames 2401, 2402, 2403, and 2404 are captured is matched to the speed of object 2420, such that the image of each of areas A, B, C, D shifts by one line 2410(i) between each frame. Specifically, as object 2420 moves, area A is imaged onto line 2410(1) in frame 2401, line 2410(2) in frame 2402, line 2410(3) in frame 2403, and line 2410(4) in frame 2404.

TDI may be performed by integrating lines across frames while taking into account the frame-to-frame shifts of the captured image of object 2420. An enhanced image of area A of object 2420 is formed by integrating line 2410(1) of frame 2401, line 2410(2) of frame 2402, line 2410(3) of frame 2403, and line 2410(4) of frame 2404. The example illustrated in FIG. 24 is non-limiting and is readily extended to any number of lines 2410(i), any number of frames, any number of objects, and any number of areas. In an embodiment, frames 2401, 2402, 2403, and 2404 are captured by area scan image sensor 110 of FIG. 1. In certain embodiments, TDI is performed off-sensor, e.g., by TDI module 140 (FIG. 1), using for example method 300 of FIG. 3. In a further embodiment, increased resolution is achieved using systems 400 (FIG. 4), 1400 (FIG. 14) or 1500 (FIG. 15) and associated methods.

In one embodiment, frames 2401, 2402, 2403, and 2404 are captured by an interline charge coupled device (CCD) area scan sensor with lines 2410(1), 2410(2), 2410(3), and 2410(4). In an interline CCD area scan sensor, the process of reading out pixel charges imposes no delay between integration of different frames. Each pixel of the interline CCD area scan sensor has an associated masked pixel. The readout process is initiated by a reset operation that shifts all pixel charges accumulated during integration of one frame to the corresponding masked pixels, and integration of the next frame follows immediately after the reset operation. The light collection efficiency of the interline CCD area scan sensor is therefore 100%, assuming that the delay associated with the reset operation is negligible.

Figure 25:
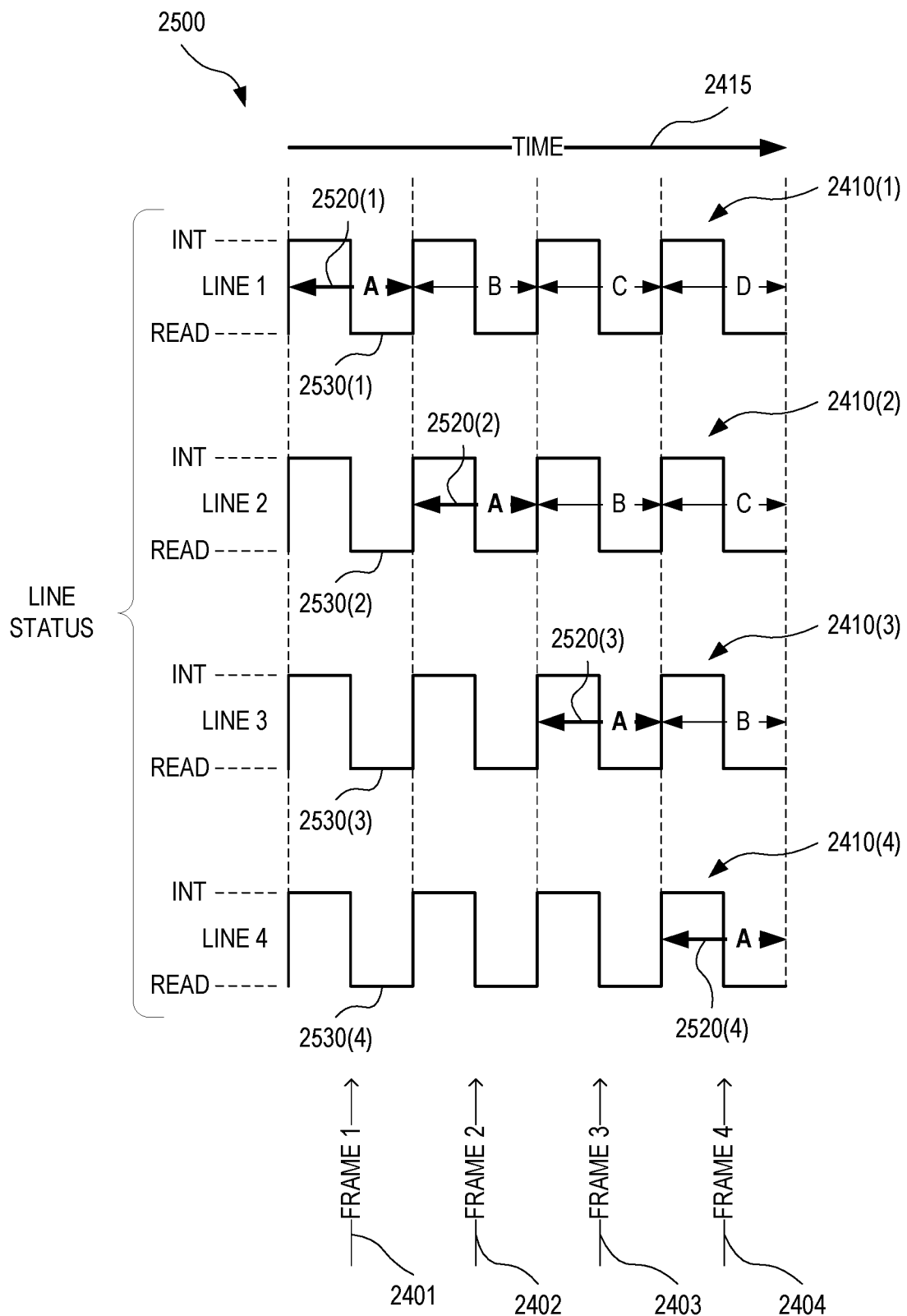
FIG. 25 illustrates integration and readout processes for the method of FIG. 24, according to an embodiment.
Figure 26:
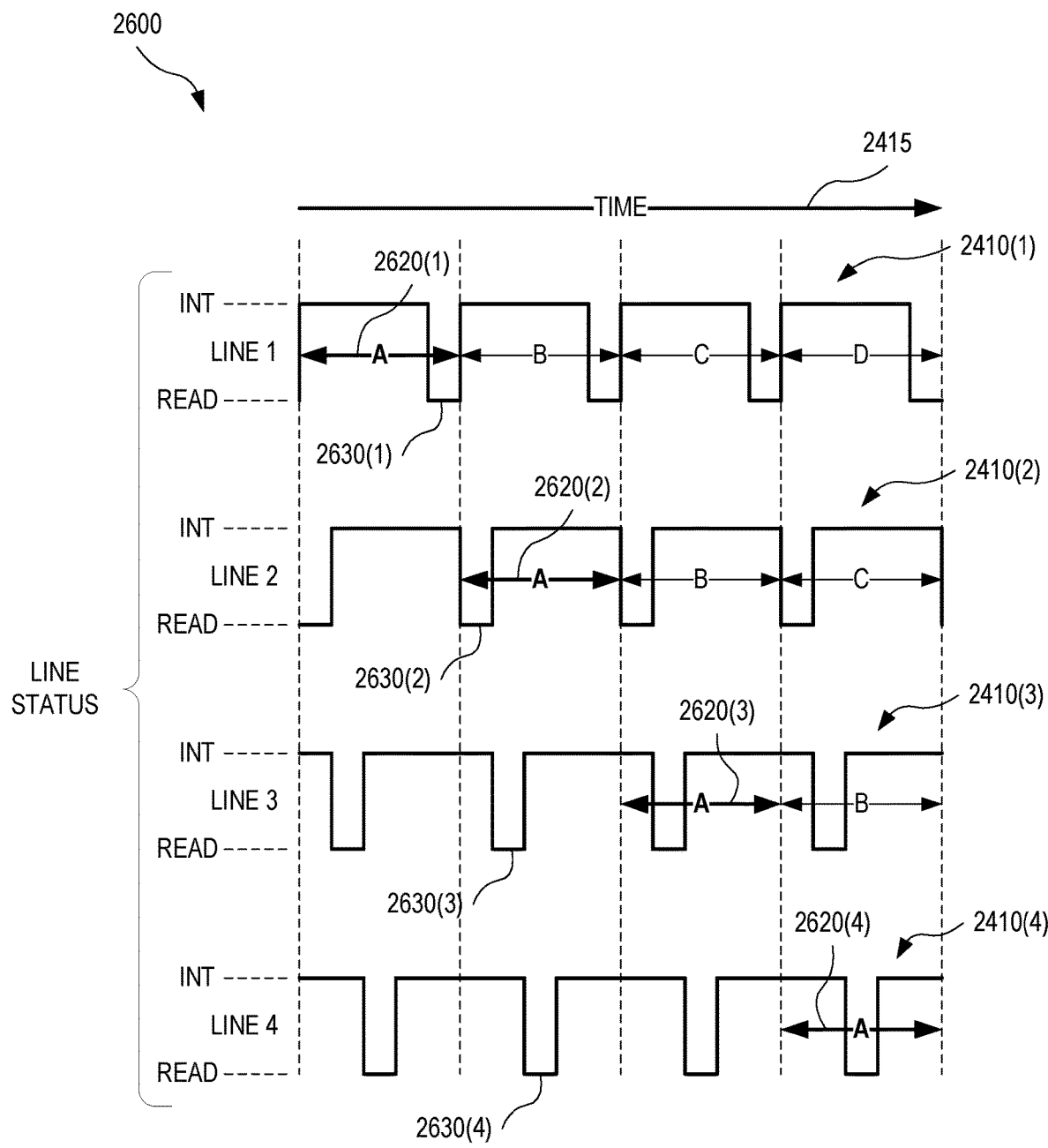
FIG. 26 illustrates integration and readout processes for the method of FIG. 24, according to an embodiment.

In another embodiment, lines 2410(1), 2410(2), 2410(3), and 2410(4) belong to a CMOS area scan image sensor. CMOS area scan image sensors may be configured with either a global shutter or a rolling shutter. The integration and readout process of a global shutter CMOS area scan image sensor is analogous to that of an interline CCD. Rolling shutter CMOS area scan image sensors may be implemented with a global reset or a rolling reset, where rolling reset is the more commonly available configuration. FIG. 25 illustrates the integration and readout process 2500 for a rolling shutter CMOS area scan image sensor implemented with global reset. FIG. 26 illustrates the integration and readout process 2600 for a rolling shutter CMOS area scan image sensor implemented with rolling reset. In a rolling shutter CMOS area scan image sensor implemented with global reset, all pixels are reset at the same time and then read out line by line. The pixels are not allowed to integrate during readout, which means that the sensor is inactive during the readout process. In a rolling shutter CMOS area scan image sensor implemented with rolling reset, individual pixel rows are reset and read out on a rolling basis. While one row is being read out, all other rows are still integrating. When readout of the one row is completed, it is again allowed to integrate and readout of the next row is initiated.

In order to compare the light collection efficiency of the two reset types, it is assumed that the integration time equals the readout time for both types. In the embodiment illustrated in FIG. 26, the four lines 2410(1), 2410(2), 2410(3), and 2410(4) coincide with pixel rows. Hence, pixels are read out line by line. Accordingly, in a case of N lines of a rolling shutter CMOS area scan image sensor, implemented with rolling reset and running at its maximum frame rate, N readout periods are completed in a full frame cycle. With equal readout and integration times, each line integrates for a duration equivalent to N readout periods before being read out. Applying the same assumptions to a rolling shutter CMOS area scan image sensor implemented with global reset, the embodiment illustrated in FIG. 25, yields that the sensor spends half a frame cycle integrating and half a frame cycle reading out.

In FIG. 25, the line status for lines 2410(1), 2410(2), 2410(3) and 2410(4) is indicated as a function of time 2415. It is assumed that the duration of the reset operation is negligible and the line status is therefore either "integrate" (INT) or "readout" (READ). The image of each segment of object 2420 shifts by one line during a frame cycle, as indicated by segment A which is imaged onto line 2410(1) during frame 2401 (label 2520(1)), line 2410(2) during frame 2402 (label 2520(2)), 2410(3) during frame 2403 (label 2520(3)), and line 2410(4) during frame 2404 (label 2520(4)). Frame 2401, for example, consists of readout signals 2530(1), 2530(2), 2530(3), and 2530(4), all resulting from a synchronized integration.

Time delay integration can be performed by integrating lines as discussed for FIG. 24. The result is equivalent to that obtained with an interline CCD area scan image sensor, or global shutter CMOS area scan image sensor, except that the light collection efficiency is 50%. The rolling shutter CMOS area scan image sensor with global reset may for example be implemented in systems 100 (FIG. 1), 200 (FIG. 2), 600 (FIG. 6), 2000 (FIG. 20), or 2100 (FIG. 21). Time delay integration may for example be performed using method 300 of FIG. 3.

In FIG. 26, the line status for the lines 2410(1), 2410(2), 2410(3) and 2410(4) is indicated as a function of time 2415. As for FIG. 25, it is assumed that the duration of the reset operation is negligible and the line status is therefore either "integrate" (INT) or "readout" (READ). The image of each segment of object 2420 shifts by one line during a frame cycle. However, in this case, not all lines are read out at the same time. An exemplary frame consists of readout signals 2630(1), 2630(2), 2630(3), and 2630(4). These readout signals result from asynchronous integration. While the readout signal for line 2410(1) is aligned with segment positions, the readout signals for lines 2410(2), 2410(3), and 2410(4) are increasingly shifted therefrom. Likewise, as segment A shifts from line to line, indicated by labels 2620(1), 2620(2), 2620(3), and 2620(4), the corresponding readout signal contains an increasing contribution from segment B. However, the frame rate may be adjusted to compensate for the asynchronous integration such that a rolling shutter image sensor implemented with rolling reset may be used without degradation of the TDI images generated therefrom. For example, the frame rate at which images are captured may be increased, as compared to the nominal frame rate of a global shutter image sensor, such that the image of a passing object moves by one line in the duration of one frame time plus one readout time.

A benefit of the rolling shutter CMOS area scan image sensor implemented with rolling reset is that the light collection efficiency may approximate 100%. For a rolling shutter CMOS area scan image sensor with N lines and rolling reset, the readout time associated with a line is only 1/(N+1) of the frame cycle duration. The light integration duty cycle is therefore N/(N+1). In the embodiment with four lines, illustrated in FIG. 26, the light integration duty cycle is 80%. However, for a sensor with, e.g., 1024 lines, the light integration duty cycle is 99.9%.

Time delay integration can be performed by integrating lines as discussed for FIG. 24. The result is equivalent to that obtained with an interline CCD area scan image sensor, or a global shutter CMOS area scan image sensor, except for a small sub-frame blur and a slight decrease in light integration duty cycle. The rolling shutter CMOS area scan image sensor with rolling reset may be implemented in, e.g., systems 100 (FIG. 1), 600 (FIG. 6), 2000 (FIG. 20), or 2100 (FIG. 21). Time delay integration may for example be performed using, e.g., method 300 of FIG. 3.

Figure 27:
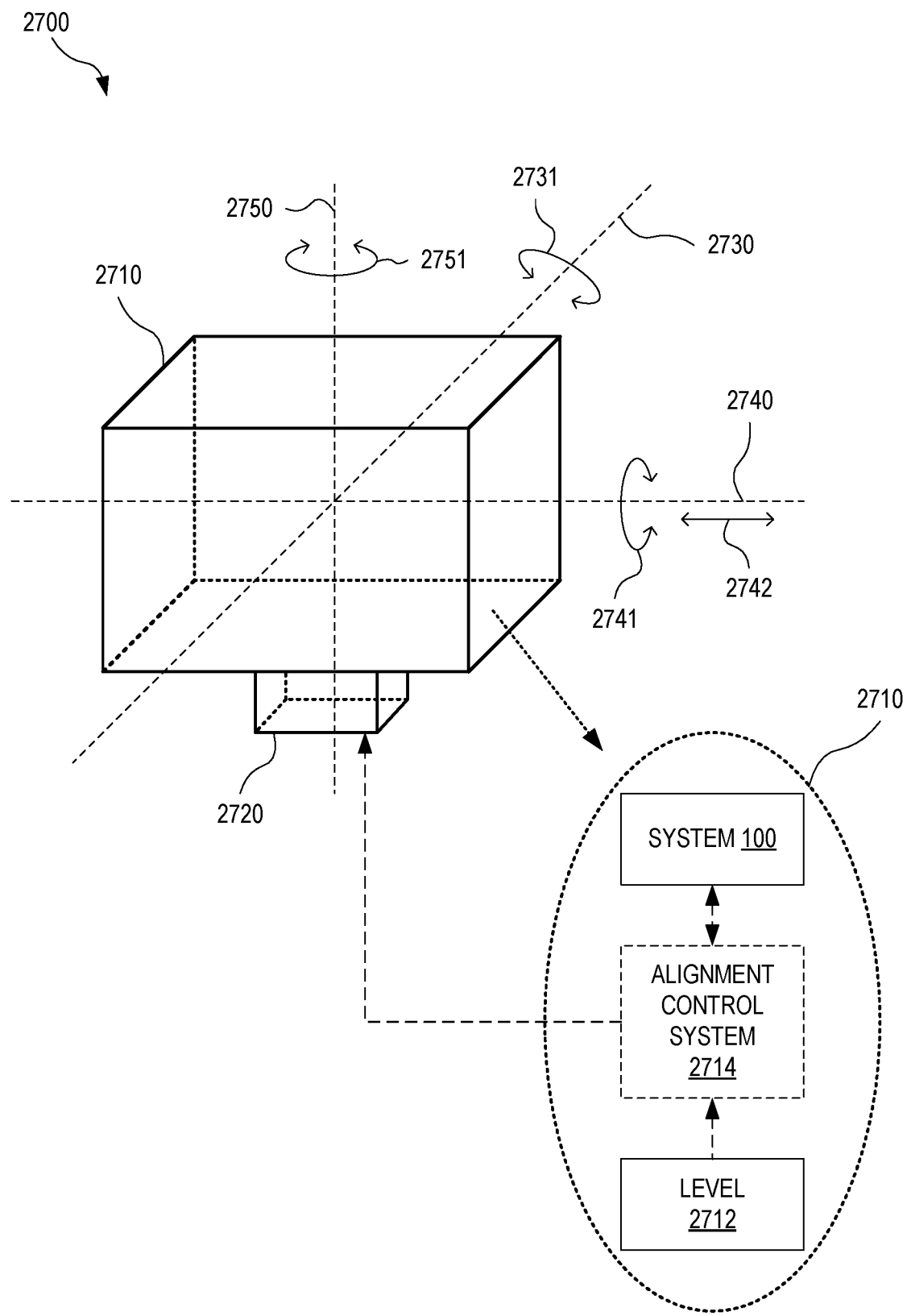
FIG. 27 illustrates one time delay integration camera system, according to an embodiment.

FIG. 27 illustrates one exemplary camera system 2700 configured with an alignment assistance system. Camera system 2700 includes a camera 2710 coupled with a mount 2720 that has at least four-axis movement including three orthogonal rotational degrees of freedom and one translational degree of freedom. Camera 2710 includes system 100 of FIG. 1, a level 2712, and an optional alignment control system 2714. Camera 2710 may be implemented without TDI module 140 of system 100 (FIG. 1) without departing from the scope hereof. Camera 2710 is associated with a coordinate system defined by three orthogonal axes 2730, 2740, and 2750. The coordinate system is fixed relative to camera 2710 such that it moves with camera 2710. Axis 2750 is parallel to a vertical direction in images captured by camera 2710. The origin of the coordinate system, i.e., the intersect of axes 2730, 2740, and 2750, may be located within camera 2710 or externally thereto. Mount 2720 is configured to provide at least rotation 2731 about axis 2730, rotation 2741 about axis 2740, rotation 2751 about axis 2750, and translation 2742 along axis 2740.

In an exemplary use scenario, camera system 2700 is used to capture images of a finish line. The direction of the finish line and the direction of the gravitational force together define a finish plane. Alternatively, the finish plane is defined by the direction of the finish line and another direction that is generally perpendicular to the direction of motion of race participants crossing the finish line. Mount 2720 is used to align camera 2710 to be level, as indicated by level 2712, such that the direction of the gravitational force is vertical in images 115 (FIG. 1) captured by camera 2712. This corresponds to axis 2750 being parallel to the direction of the gravitational force. Note that in this example camera 2710 has been placed relative to the finish line such that translation along axis 2740 results in generally left-right movement of the finish line in images captured by camera 2710. Mount 2720 is further used to place camera 2710 in the finish plane, such that the finish line is vertical in images 115 (FIGS. 1 and 2). FIGS. 28 through 31, discussed below, illustrate two methods for performing this alignment.

In one embodiment, level 2712 is an electronic level and mount 2720 includes motorized actuation. Level 2712 is communicatively coupled to an alignment control system

2714. Alignment control system 2714 is further communicatively coupled to system 100 and mount 2720. Alignment control system 2714 processes measurements by level 2712 and images captured by system 100. Alignment control system 2714 controls mount 2720 accordingly to achieve the desired alignment of camera 2710. This embodiment facilitates automatic alignment of camera 2710.

In another embodiment, alignment camera 2710 is aligned manually by an operator using measurements by level 2712 and images captured by system 100. In yet another embodiment, alignment control system 2714 controls a portion of the degrees of freedom of mount 2720, while other degrees of freedom are controlled by an operator. In this embodiment, the operator may be aided by instructions provided by control system 2714. For example, alignment control system 2714 controls mount 2720 to control rotations 2731, 2741, and 2751, and, as needed, provides instructions to an operator for adjusting translation 2742.

Camera 2710 may include camera 2015 of FIG. 20, instead of system 100, without departing from the scope hereof. Additionally, camera 2710 may be a camera that does not have TDI functionality without departing from the scope hereof.

Figure 28:
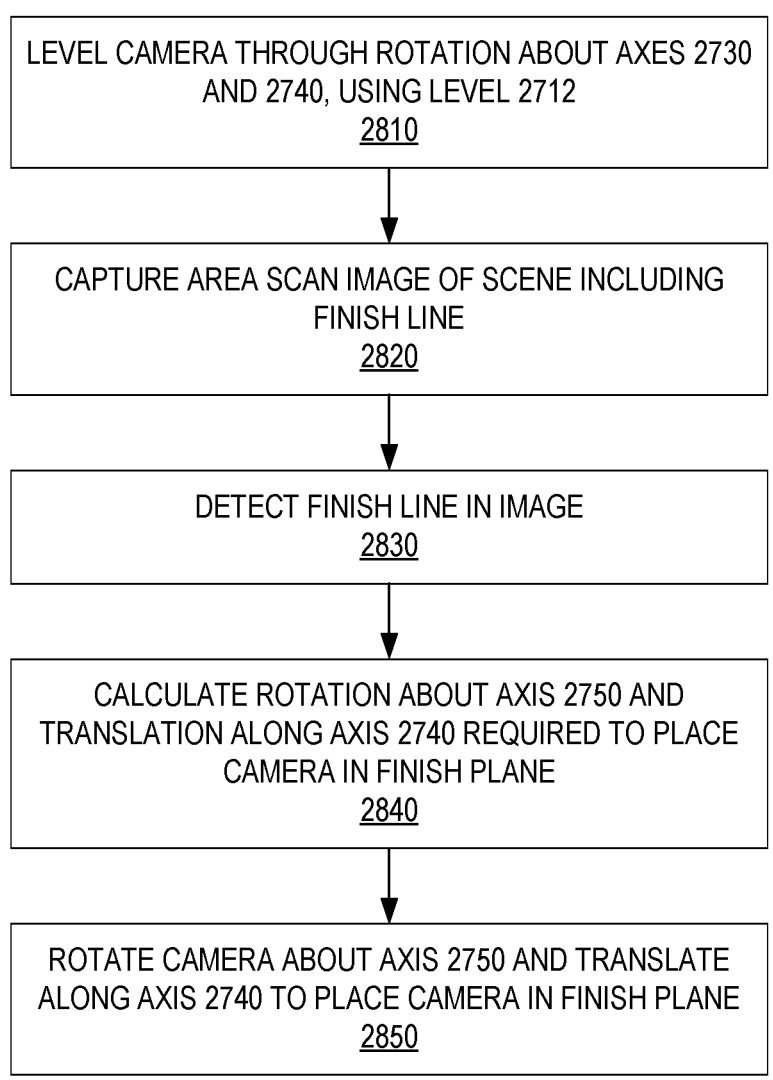
FIG. 28 illustrates a method for aligning the time delay integration camera system of FIG. 27, according to an embodiment.
Figure 29:
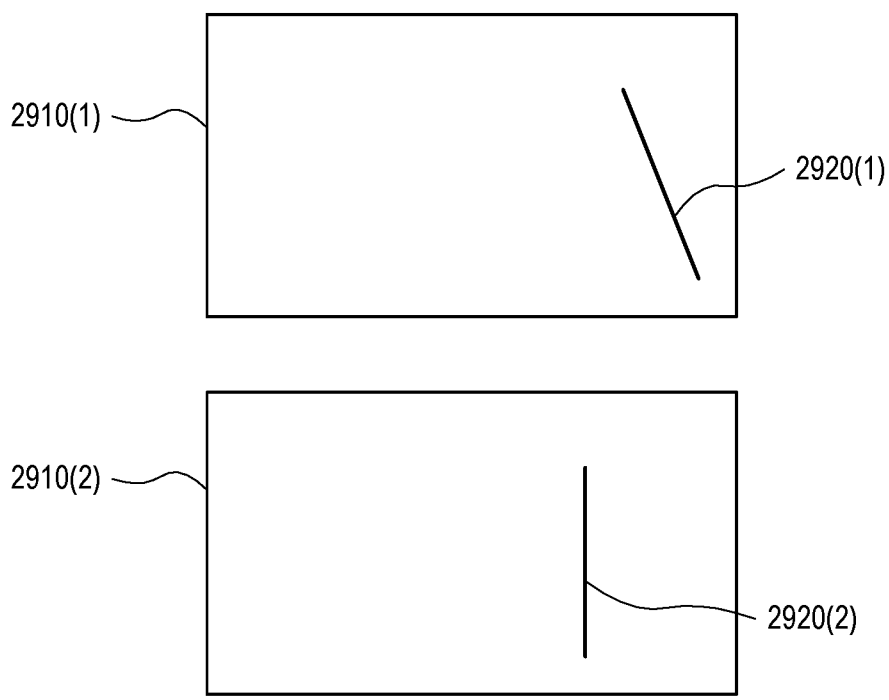
FIG. 29 illustrates exemplary images captured by the time delay integration camera system of FIG. 27 while performing the method of FIG. 28, in an embodiment.

FIG. 28 illustrates one exemplary method 2800 for aligning camera 2710 of camera system 2700 (FIG. 27) with a finish line. FIG. 28 is best viewed together with FIG. 27 and FIG. 29. Method 2800 may be performed manually or automatically, or a combination thereof, as discussed above. In a step 2810, mount 2720 rotates camera 2710 about axes 2730 and 2740 to level camera 2710. This corresponds to making axis 2750 parallel to the direction of the gravitational force. For example, alignment control system 2714 receives measurements from level 2712 and controls mount 2720 to level camera 2710. In a step 2820, camera 2710 captures an image of a scene that includes the finish line. For example, alignment control system 2714 triggers camera 2710 to capture an image 115 (FIGS. 1 and 2). An exemplary image 2910(1) including a finish line image 2920(1) is illustrated in FIG. 29. In a step 2830, the finish line is detected in the image captured in step 2820. For example, alignment control system 2714 detects the finish line image 2920(1) in image 2910(1). In another example, an operator identifies the finish line image 2920(1) in image 2910(1) and provides the identified location to alignment control system 2714. In a step 2840, the finish line image 2920(1) in image 2910(1) is used to calculated the rotation 2751 about axis 2750 and translation 2742 along axis 2740 required to place camera 2710 in the finish plane. For example, alignment control system 2714 analyzes the location and orientation of finish line 2920(1) in image 2910(1) to determine rotation 2751 and translation 2742 required to place camera 2710 in the finish plane. This may include utilizing knowledge of the distance from camera 2710 to a specified point in the imaged scene. In a step 2850, mount 2720 rotates and translates camera 2710 according to the output of step 2840. Mount 2720 performs rotation 2751 and translation 2742. For example, alignment control system 2714 controls mount 2720 to perform rotation 2751 and translation 2742. A resulting image 2910(2), if one is captured, is illustrated in FIG. 29. The finish line image 2920(2) is vertical in image 2910(2).

Figure 30:
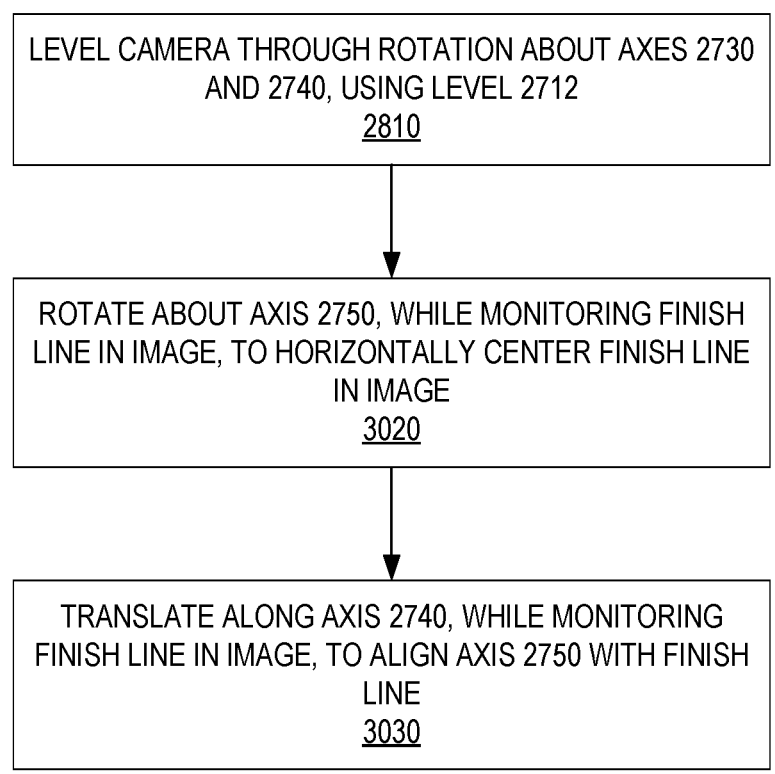
FIG. 30 illustrates a method for aligning the time delay integration camera of the system of FIG. 27, according to an embodiment.
Figure 31:
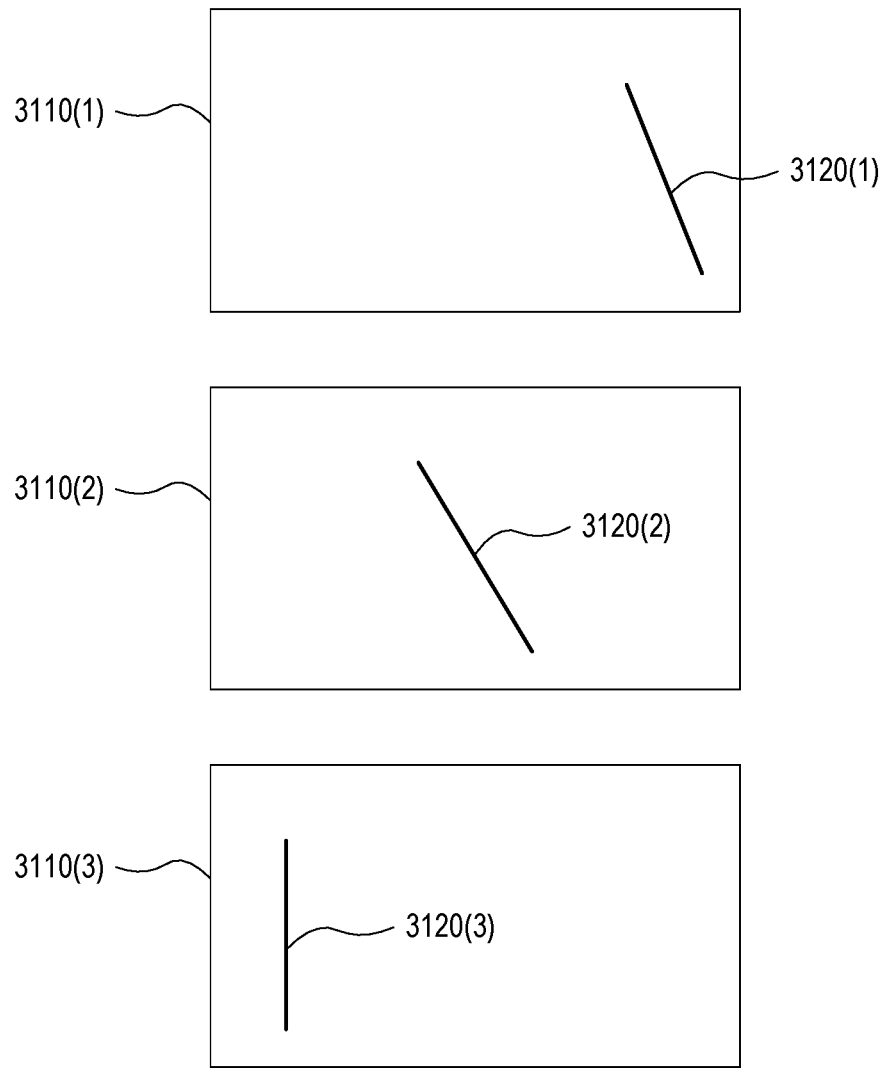
FIG. 31 illustrates exemplary images captured by the time delay integration camera system of FIG. 27 while performing the method of FIG. 30, in an embodiment.

FIG. 30 illustrates another exemplary method 2600 for aligning camera 2710 of camera system 2700 (FIG. 27) with a finish line. FIG. 30 is best viewed together with FIG. 27 and FIG. 31. Method 3000 may be performed manually or automatically, as discussed above. Method 3000 begins with performing step 2810 of FIG. 28. In a subsequent step 3020, mount 2720 rotates camera 2710 about axis 2750 while the position of the finish line in images 115 (FIGS. 1 and 2) is monitored. FIG. 31 illustrates an exemplary image 3110(1) captured prior to performing this rotation. In image 3110(1), the finish line image 3120(1) is located in the right-hand portion of image 3110(1). Mount 2720 rotates camera 2710 until the finish line is horizontally centered in image 115 (FIGS. 1 and 2). This is illustrated in FIG. 31 as exemplary image 3110(2) wherein the finish line image 3120(2) is horizontally centered. For example, alignment control system 2714 continuously analyzes images 115 (FIGS. 1 and 2) captured by system 100 while controlling mount 2720 to rotate camera 2710 as needed. In a step 3030, mount 2720 translates camera 2710 along axis 2750, while the position of the finish line in images 115 (FIGS. 1 and 2) is monitored, until the finish line is vertical. When a vertical finish line image is achieved, camera 2710 is located in the finish plane. FIG. 31 illustrates an exemplary image 3110(3), with a vertical finish line image 3120(3), captured after performing this translation. For example, alignment control system 2714 continuously analyzes images 115 (FIGS. 1 and 2) captured by system 100 while controlling mount 2720 to translate TDI camera 2010 as needed.

Figure 32:
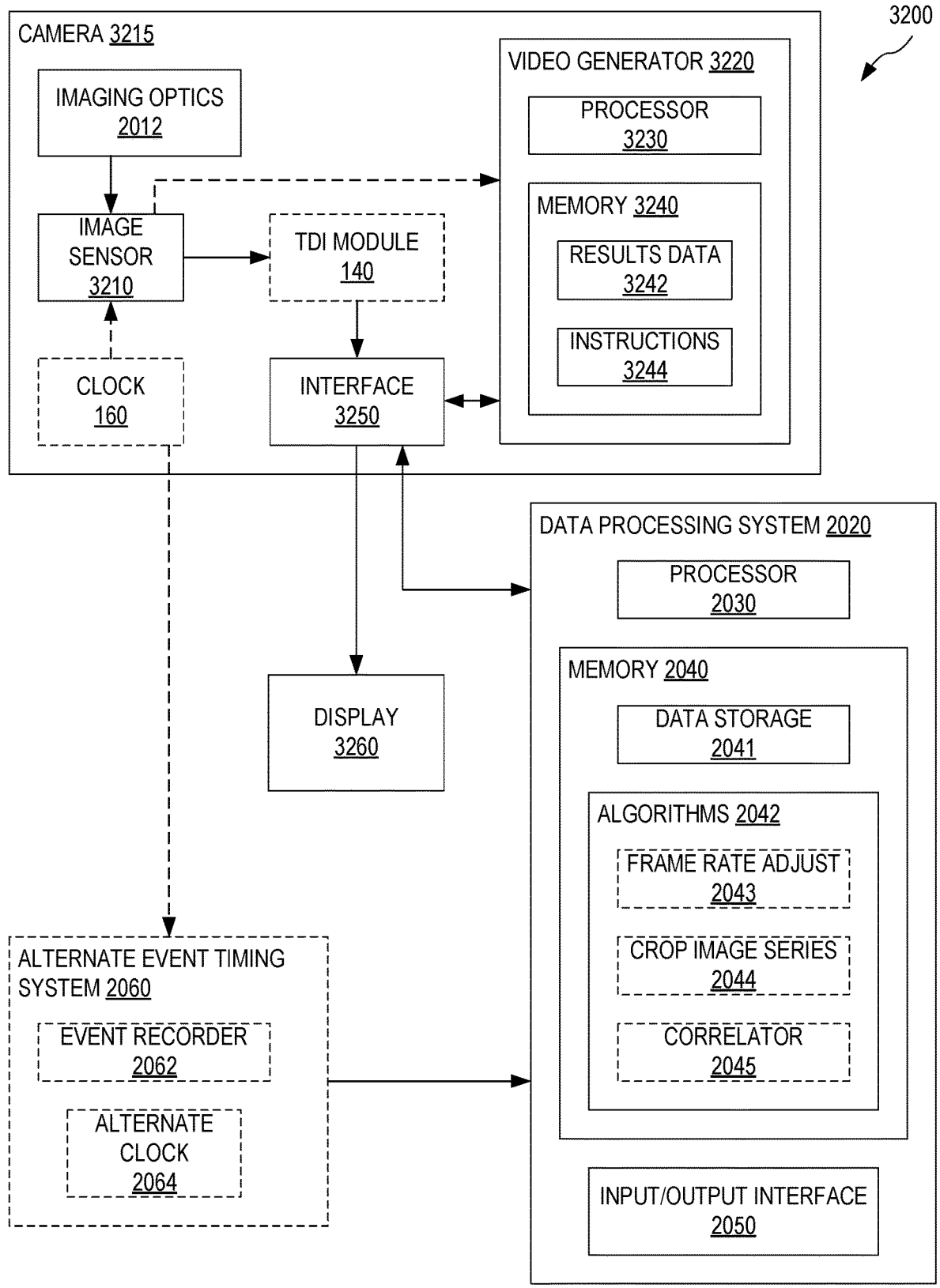
FIG. 32 illustrates a system for generating and displaying scoreboard video using a system for processing event timing images, according to an embodiment.

FIG. 32 illustrates one exemplary system 3200 for generating and displaying scoreboard-type video using an event timing system with an image sensor and a display. Scoreboard-type video includes, for example, results lists, standings, images generated by a TDI camera or other photo-finish system, video, commercials, and other graphics. System 3200 is an embodiment of system 2000 of FIG. 20. System 3200 includes a camera 3215, which is an embodiment of optional camera 2015 (FIG. 20), data processing system 2020 (FIG. 20), and a display 3260. System 3200 may further include alternate event timing system 2060 (FIG. 20). Camera 3215 includes an image sensor 3210, imaging optics 2012 (FIG. 20), an interface 3250, and a video generator 3220 for generating scoreboard-type video. In certain embodiments, image sensor 3210 is an area scan image sensor, such as area scan image sensor 110 (FIG. 1). Optionally, camera 3215 further includes TDI module 140 (FIG. 1) and/or clock 160 (FIG. 1). Video generator 3220 includes a memory 3240. Memory 3240 includes a results data storage 3242 for storing results data generated by data processing system 2020 and received by video generator 3220 through interface 3250. Additionally, memory 3240 includes machine-readable instructions 3244 encoded in memory 3240. In an embodiment, machine-readable instructions 3244 are located in a non-volatile portion of memory 3240. In another embodiment, video generator 3220 retrieves machine-readable instructions 3244 from a non-volatile memory, located externally to video generator 3220, and stores machine-readable instructions 3244 to a volatile portion of memory 3240. Video generator 3220 further includes a processor 3230 for processing of results data 3242, according to instructions 3244, to produce scoreboard-type video. Video generator 3220 communicates the scoreboard-type video to display 3260 through interface 3250. Instructions may be communicated to video generator from a user or an external computer system, e.g., data processing system 2020, via interface 3250 and stored to instructions 3244. Such instructions include, for example, typographical settings, graphical settings, and overall screen layout. Interface 3250 may include communication ports for communicating the scoreboard-type video to other displays such as a computer, or a network of computers. Interface 3250 may include one or more wireless communication ports.

System 3200 provides a simple and cost-effective alternative to conventional scoreboard generation, which is based on separate timing system(s) and generation of scoreboard data. Conventionally, scoreboard data is generated using a scoreboard with an integrated scoreboard controller or an external scoreboard controller. The scoreboard controller receives results from a timing system, processes the results using scoreboard controller software, and generates video for the scoreboard. In contrast, system 3200 utilizes video generation capability integrated in the timing system, specifically in camera 3215, for generating scoreboard type video. The scoreboard type video is communicated directly to display 3260 through interface 3250. Interface 3250 may include a High-Definition Multimedia Interface (HDMI) and/or a wireless communication port, for this purpose. The wireless communication port may be a Wi-Fi communication port, for example capable of communicating scoreboard type video to a wireless-to-HDMI converter communicatively coupled with an HDMI port of display 3260. Thus, system 3200 eliminates the need for a scoreboard and scoreboard controller. Since many commercially available area scan image sensors include video generation capability, the electronic elements of camera 3215 may be based on affordable and readily available electronic components. In an embodiment, display 3260 is a Light Emitting Diode (LED) display.

The video generation capability of system 3200 may be employed during alignment of camera 3215 with respect to a scene. In an embodiment, camera 3215 is configured to communicate images captured by image sensor 3210 directly to video generator 3220. Video generator 3220 may process a stream of such images to generate scoreboard-type video including the stream of images. This scoreboard-type video may be communicated to display 3260 via interface 3250, such that an operator may align camera 3215 by watching a real-time image stream on display 3260.

Figure 33:
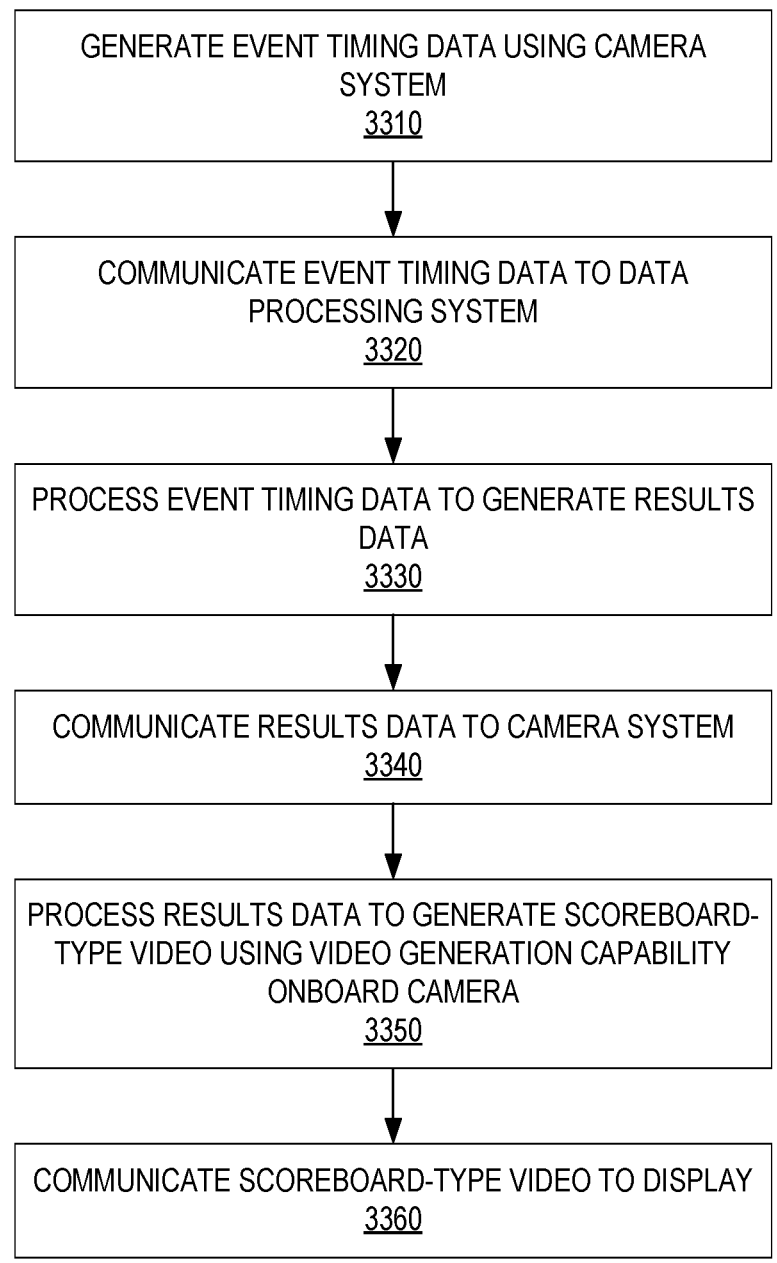
FIG. 33 illustrates one method for generating and displaying scoreboard video using a system for processing event timing images, according to an embodiment.

FIG. 33 illustrates one exemplary method 3300 for generating and displaying scoreboard-type video using an event timing system with integrated video generation capability. Method 3300 may be performed using system 3200 of FIG. 32. In a step 3310, event timing data is generated using a camera system. In one embodiment, the camera system is a TDI camera system, such as system 100 (FIG. 1) or camera system 3215 (FIG. 32), and event timing data includes images, such as TDI images 145 (FIGS. 1 and 2). In another embodiment, the event timing data includes area scan images, such as digital two-dimensional images 115 (FIGS. 1 and 2) or two-dimensional images captured by area scan image sensor 110 (FIGS. 1 and 32). Step 3310 is performed, for example, by camera 3215 (FIG. 32).

In a step 3320, event timing data is communicated to a data processing system. For example, camera 3215 (FIG. 32) communicates event timing data, such as images, to data processing system 2020 (FIGS. 20 and 32) via interface 3250 (FIG. 32).

In a step 3330, the data processing system processes the event timing data, communicated thereto in step 3320, to generate results data. In an embodiment, the results data include event timing results determined by analyzing images, such as TDI images 145 (FIGS. 1 and 2) received from the event timing system. For example, processor 2030 (FIGS. 20 and 32) of data processing system 2020 (FIGS. 20 and 32) processes images received from camera 3215 (FIG. 32) in step 3320 according to algorithms 2042 (FIGS. 20 and 32) to generate event timing results. The event timing results may be stored to data storage 2041.

In a step 3340, the results data generated in step 3330 are communicated to the camera system. For example, data processing system 2020 (FIGS. 20 and 32) communicates the results data to interface 3250 of camera 3215 (FIG. 32).

In a step 3350, the results data are processed by the camera to generate scoreboard-type video. The camera processes the results data using onboard video generation capability. For example, video generator 3220 (FIG. 32) processes results data received from interface 3250 (FIG. 32) to generate scoreboard-type video. Processor 3230 (FIG. 32) stores data received from interface 3250 (FIG. 32) to results data 3242 (FIG. 32). Processor 3230 (FIG. 32) then retrieves and processes the results data from results data 3242 (FIG. 32) according to instructions 3244. The scoreboard type video may include other elements based on other data than the results data generated in step 3330 without departing from the scope hereof. For example, the scoreboard type video may include images captured by the image sensor, such as a live stream of images.

In a step 3360, the scoreboard-type video generated in step 3350 is communicated to a display. For example, camera 3215 (FIG. 32) communicates scoreboard-type video generated by video generator 3220 (FIG. 32) to display 3260 (FIG. 32) via interface 3250 (FIG. 32). The scoreboard-type video may be streamed to display 3260 (FIG. 32) as it is generated or temporarily stored to memory 3240 (FIG. 32) and communicated to display 3260 (FIG. 32) at a later time. Memory 3240 (FIG. 32) may function as a buffer that ensures continuous streaming.

Figure 34:
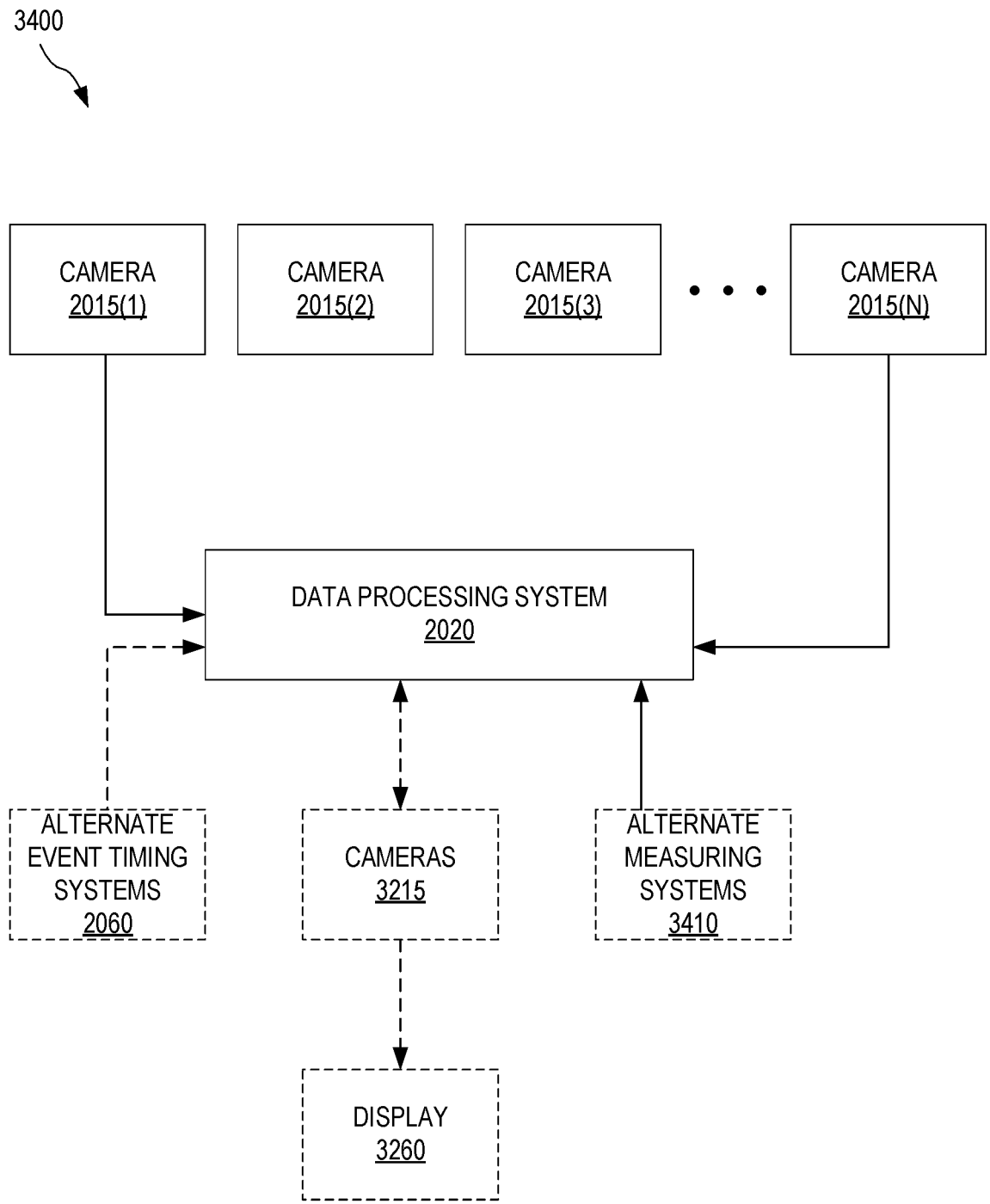
FIG. 34 illustrates yet another system for processing event timing images, according to an embodiment.

FIG. 34 illustrates one exemplary event timing system 3400 that uses a single data processing system 2020 (FIG. 20) to generate results based on data received from multiple separate cameras 2015 (FIG. 20) and/or other data generating systems. In an embodiment, system 3400 includes one or more alternate event timing systems 2060 (FIG. 20). In certain embodiments, system 3400 includes at least one camera 3215 (FIG. 32) capable of generating scoreboard-type video, and at least one display 3260 (FIG. 32) for displaying the scoreboard-type video. Optionally, system 3400 includes one or more alternate measuring systems 3410 for providing event results that are not time-based. For example, alternate measuring system 3410 is a system for measuring distance, such as the length of a jump or a throw. System 3400 may include any number of cameras 2015, alternate event timing systems 2060, alternate measuring systems 3410, and cameras 3215 communicatively coupled to data processing system 2020, without departing from the scope hereof. System 3400 may further include any number of displays 3260 communicatively coupled to one or more cameras 3215 without departing from the scope hereof.

In an exemplary use scenario, cameras 2015 and, optionally alternate event timing systems 2060, cameras 3215, and alternate measuring systems 3410 are employed in a sports event that includes several individual events occurring concurrently or sequentially. For example, a track and field event typically includes a variety of running competitions, jumping competitions, throwing competitions. Each one of these competitions has associated needs for measuring results using one or more of cameras 2015 and, optionally alternate event timing systems 2060, cameras 3215, and alternate measuring systems 3410. Frequently, multiple displays 3260 are installed in the stadium area to display different types of results.

Processes disclosed herein as being performed by a TDI module included in a camera, for example TDI module 140 (FIG. 1), in certain embodiments, may alternatively be either fully or partly performed by another processing system external to the camera, for example data processing system 2020 (FIG. 20), without departing from a scope hereof. Such a data processing system may receive captured images and process these at any later point in time. The camera may be equipped with a data compression module for reducing the data rate associated with export of captured (as opposed to TDI) images. Likewise, processes disclosed herein as being performed by a data processing system external to a camera, such as data processing system 2020 (FIG. 20), may alternatively be either fully or partly performed by a TDI module included in the camera, such as embodiments of TDI module 140 (FIG. 1), or by a another data processing module included in the camera.

Features described above as well as those claimed below may be combined in various ways without departing from the scope hereof. For example, it will be appreciated that aspects of one system or method for processing event timing images described herein may incorporate or swap features of another system or method for processing event timing images described herein. The following examples illustrate possible, non-limiting combinations of embodiments described above. It should be clear that many other changes and modifications may be made to the methods and device herein without departing from the spirit and scope of this invention:

(A1) A system for processing event timing images may include (a) an area scan image sensor for generating sequential digital two-dimensional images of a scene, and (b) a time delay integration module for processing the sequential digital two-dimensional images to generate a time delay integration image of a moving object in the scene.

(A2) In the system denoted as (A1), the time delay integration module may be separate from the area scan image sensor.

(A3) In the systems denoted as (A1) and (A2), the area scan image sensor may be implemented in a camera, and the time delay integration module may be separate from the camera.

(A4) In the systems denoted as (A1) through (A3), the area scan image sensor may be a CMOS image sensor.

(A5) In the systems denoted as (A1) through (A4), the area scan image sensor may be a CMOS image sensor with a rolling shutter.

(A6) In the system denoted as (A5), the CMOS image sensor with a rolling shutter may be implemented with rolling reset.

(A7) In the systems denoted as (A1) through (A6), the scene may include a moving object, the sequential two-dimensional images may include lines, and the area scan image sensor may have a frame rate corresponding to object image movement at a rate of one line per sequential digital two-dimensional image.

(A8) In the systems denoted as (A1) through (A6) of claim 1, the scene may include a moving object, the sequential two-dimensional images may include lines, and the area scan image sensor may have a frame rate corresponding to object image movement at a rate of half a line per sequential digital two-dimensional image.

(A9) In the systems denoted as (A1) through (A8), the scene may include a finish line of a race and the moving object may include a race participant, or a portion of a race participant.

(A10) The systems denoted as (A1) through (A9) may further include (a) a camera with the area scan image sensor and a level, and (b) an adjustable mount coupled with the camera.

(A11) The system denoted as (A10) may further include an alignment control system for automatically adjusting the mount to align the camera with respect to a finish line.

(A12) In the systems denoted as (A10) and (A11), the mount may include three mutually orthogonal, rotational degrees of freedom and one translation degree of freedom.

(A13) In the systems denoted as (A1) through (A12), the time delay integration module may include image processing circuitry, implemented in a field programmable gate array, wherein the image processing circuitry may be adapted for processing the sequential digital two-dimensional images to generate the time delay integration image (A14) In the systems denoted as (A1) through (A13), the area scan image sensor may include color pixels, where each color pixel is composed of a plurality of photosites (A15) In the system denoted as (A14), the time delay integration image may be a color time delay integration image.

(A16) In the system denoted as (A15), the image processing circuitry may be adapted for processing individual ones of the photosite signals to generate the color time delay integration image with greater resolution than resolution of the sequential digital two-dimensional images.

(A17) In the systems denoted as (A1) through (A16), the time delay integration module may include image processing circuitry adapted for segmenting at least a portion of each of the sequential digital two-dimensional images into input lines and forming the time delay integration image from integrals of input lines, wherein each input line of an integral corresponds to a different one of the sequential digital two-dimensional images.

(A18) In the system denoted as (A17), the number of input lines of at least one integral may be non-integer.

(A19) The systems denoted as (A17) and (A18) may further include a controller communicatively coupled to the time delay integration module, and the image processing circuitry may be adapted to adjust the number of input lines, according to signals received from the controller, to adjust the brightness of the time delay integration image.

(A20) In the system denoted as (A19), the image processing circuitry may be further adapted to independently adjust, for individual pixels of the time delay integration image, the number of input lines.

(A21) In the system denoted as (A20), the number of input lines may be non-integer for at least a portion of the time delay integration image.

(A22) In the systems denoted as (A21), the area scan image sensor may include a filter having a plurality of filter portions with a respective plurality of transmissions, and the sequential digital two-dimensional images may include a plurality of image portions having a respective plurality of brightnesses, wherein each image portion corresponds to one of the filter portions.

(A23) In the systems denoted as (A17) through (A22), the area scan image sensor being a color sensor, wherein each color sensor pixel includes a Bayer type array of photosites, and the input lines may alternate between (a) original pixels composed of signals from photosites from the same line image frame captured by the color sensor and (b) crossover pixels composed of signals from photosites from two sequentially captured line image frames, to produce input lines at twice the resolution of the sequential digital two-dimensional images perpendicular to the input lines.

(A24) In the systems denoted as (A17) through (A22), the area scan image sensor may be a color sensor with a plurality of trilinear color lines, wherein each of the trilinear color lines includes first, second, and third photosite lines having a respective first, second, and third color sensitivity, and the input lines may alternate between (a) original pixels composed of signals from first, second, and third photosite lines belonging to a first line image frame captured by the area scan image sensor, (b) first crossover pixels composed of signals from the first line image frame and a subsequently captured second line image frame, wherein the crossover pixels comprise signals from two photosite lines of the first line image frame and one photosite line of the second line image frame, and (c) second crossover pixels composed of signals from the first line image frame and the second line image frame, the second crossover pixels comprising signals from one photosite line of the first line image frame and two photosite lines of the second image line image, to produce input lines at three times the resolution of the sequential digital two-dimensional images perpendicular to the input lines.

(A25) In the systems denoted as (A1) through (A24), the area scan image sensor may be a color sensor, and the time delay integration image may include original color pixels of the color sensor and crossover color pixels formed by combining photosites from different images captured by the color sensor.

(A26) In the systems denoted as (A1) through (A25), the area scan image sensor and the time delay integration module may be integrated in a camera that is communicatively coupled with (a) a data processing system for generating results data from images received from the camera, and (b) a display for displaying scoreboard-type video, wherein the camera further includes a video generator for processing the results data to generate the scoreboard-type video.

(B1) A method for processing event timing images may include (a) capturing sequential digital two-dimensional images of a scene using an area scan image sensor, and (b) processing the sequential digital two-dimensional images to generate a time delay integration image of an object moving in the scene.

(B2) The method denoted as (B1), may further include communicating the sequential digital two-dimensional images from the area scan image sensor to a module, separate from the area scan image sensor, for performing the step of processing.

(B3) In the methods denoted as (B1) and (B2), the area scan image sensor may be implemented in a camera, and the module may be separate from the camera.

(B4) In the methods denoted as (B1) through (B3), the step of processing may include integrating the sequential digital two-dimensional images to form a time delay integration image of at least a portion of a moving object in the scene by (a) segmenting at least of portion of each of the sequential digital two-dimensional images into input lines, and (b) populating each line of the time delay integration image with an integral over a plurality of input lines, each of the plurality of input lines being selected from a different one of the sequential digital two-dimensional images to substantially match the movement of the moving object in a direction perpendicular to the input lines.

(B5) In the method denoted as (B4), the step of processing may further include adjusting the number of input lines to adjust brightness of the time delay integration image.

(B6) In the method denoted as (B5), the step of adjusting the number of input lines may include independently adjusting, for each pixel of the time delay integration image, the number of input lines to locally adjust the brightness of the time delay integration image.

(B7) In the methods denoted as (B4) through (B6), the number of input lines may be non-integer for at least a portion of the time-delay integration image.

(B8) In the methods denoted as (B1) through (B7), the area scan image sensor may be a color sensor.

(B9) In the method denoted as (B8), the step of processing the sequential digital two-dimensional images may further include increasing resolution of the time delay integration image by including crossover pixels formed by combining photosites from sequentially captured two-dimensional images.

(B10) In the methods denoted as (B1) through (B9), the scene may include a moving object, the two-dimensional images may include lines, and the step of capturing may include capturing images at a frame rate corresponding to object image movement at a rate of one line per sequential image.

(B11) In the methods denoted as (B1) through (B9), the scene may include a moving object, the two-dimensional images may include lines, and the step of capturing may include capturing images at a frame rate corresponding to object image movement at a rate of half a line per sequential image.

(B12) In the methods denoted as (B1) through (B11), the scene may include a finish line of a race and the object may include a participant in the race, or a portion of a participant in the race.

(B13) In the methods denoted as (B1) through (B12), the area scan image sensor may include a rolling shutter.

(B14) In the methods denoted as (B1) through (B12), the area scan image sensor may include a rolling shutter implemented with rolling reset.

(B15) In the methods denoted as (B1) through (B14), the area scan image sensor may include a filter having a plurality of filter portions with a respective plurality of transmissions, and the step of processing may further include selecting an portion of the sequential digital two-dimensional images associated with one of the filter portions to generate a time delay integration image of a certain brightness.

(C1) A method for processing a plurality of input images associated with a respective plurality of input times, wherein the input images and input times are provided by an event timing system, may include (a) selecting an output frame rate, (b) generating a plurality of output images, corresponding to the output frame rate, from the plurality of input images, and (c) assigning to each output image a final output time provided by the event timing system, wherein the final output time is the input time associated with an input image contributing to the output image.

(C2) The method denoted as (C1) may further include determining an initial output time series corresponding to the output frame rate.

(C3) In the method denoted as (C2), in the step of generating, each output image may be identical to an input image, when the initial output time is identical to an input time, and a weighted average of input images captured close to the initial output time, when the initial output time is not identical to an input time.

(C4) In the method denoted as (C3), the weighted average may be a weighted average of the two input images with associated input times nearest the initial output time, wherein one of the two input images is captured before the initial output time and the other of the two input images is captured after the initial output time, when the initial output time is not identical to an input time.

(C5) In the method denoted as (C4), weights of the weighted average may decrease with increasing time difference between the initial output time and the input time associated with the input images contributing to the weighted average.

(C6) The methods denoted as (C1) through (C5) may further include generating the input images using any one of the systems denoted as (A1) through (A26).

(C7) In the method denoted as (C6), the input images may be time-delay integration images generated by any one of the systems denoted as (A1) through (A26).

(C8) In the method denoted as (C6), the input images may be digital two-dimensional images captured by the area scan image sensor of any one of the systems denoted as (A1) through (A26).

(C9) The methods denoted as (C1) through (C7) may further include generating the input images as time delay integration images according to any one of the methods denoted as (B1) through (B15).

(D1) A method for processing images and associated event times provided by an event recording and timing system may include: (a) receiving (i) images and associated times and (ii) a correspondence between times and events, (b) selecting events of interest, and (c) automatically discarding images not associated with an event of interest, using a processor and machine-readable instructions.

(D2) In the method denoted as (D1), the correspondence between times and events may be provided by a radio frequency identification timing system.

(D3) In the methods denoted as (D1) and (D2), the images may be time delay integration images.

(D4) The methods denoted as (D1) through (D3) may further include generating the images using any one of the systems denoted as (A1) through (A26).

(D5) In the method denoted as (D4), the images may be time-delay integration images generated by any one of the systems denoted as (A1) through (A26).

(D6) The method denoted as (D3) may further include generating the time delay integration images according to any one of the methods denoted as (B1) through (B15).

(E1) A system for recording and timing of events may include (a) a camera system for capturing images of the events and comprising a clock, (b) an event recorder for detecting the events and being communicatively coupled with the clock, and (c) a data processing system capable of assigning times provided by the clock to the images captured by the camera system and events detected by the event recorder.

(E2) In the system denoted as (E1), the data processing system may include a processor and machine-readable instructions encoded in non-volatile memory, wherein the instructions are adapted for, when executed by the processor, assigning the times.

(E3) In the systems denoted as (E1) and (E2), the camera system may include a CMOS image sensor.

(E4) In the system denoted as (E3), the CMOS image sensor may include a rolling shutter.

(E5) In the system denoted as (E4), the rolling shutter may be implemented with rolling reset function.

(E6) The systems denoted as (E1) through (E5) may further include a time delay integration module having circuitry for performing time delay integration of the images captured by the camera system.

(E7) In the system denoted as (E6), the circuitry being implemented in a field programmable gate array.

(E8) In the systems denoted as (E6) and (E7), the time delay integration module may be the time delay integration module of any one of the systems denoted as (A1) through (A26).

(E9) In the systems denoted as (E1) through (E2), the camera may utilize the area scan image sensor of any one of the systems denoted as (A1) through (A26) to capture the images of the events.

(E10) In the systems denoted as (E1) through (E9), the event recorder may be a radio-frequency identification decoder for detecting and identifying radio-frequency identification chips in proximity.

(E11) In the systems denoted as (E1) through (E10), the data processing system may include instructions adapted for, when executed by the processor, correlating images of events captured by the camera system with events detected by the event recorder.

(E12) In the systems denoted as (E1) through (E11), the data processing system may include instructions adapted for, when executed by the processor, discarding images captured by the camera system not associated with an event detected by the event recorder.

(F1) An area scan image sensor may include a plurality of color pixels, wherein each color pixel includes three different photosite types sensitive to three different colors, the photosites being arranged in a 3×3 array such that each row and each column of 3×3 array comprises the three photosite types and every row and column has photosite configuration different from any other row and column, respectively.

(F2) In the area scan image sensor denoted as (F1), the three photosite types may have sensitivity to red, green, and blue light respectively.

(F3) Each of the area scan image sensors denoted as (F1) and (F2) may be implemented in an event timing system for providing time delay integration images from images captured by the area scan image sensor.

(F4) Each of the area scan image sensor denoted as (F1) and (F2) may be implemented in an event timing system for providing time delay integration images, from images captured by the area scan image sensor, at a resolution that is increased compared to the resolution of color pixels of the area scan image sensor.

(F5) In the area scan image sensors denoted as (F3) and (F4), the event timing system may be any one of the systems denoted as (A1) through (A22), (A25), (A26), and (E1) through (E12).

(G1) A system for processing event timing images may include (a) a camera comprising (i) an area scan image sensor for capturing images of a scene including a line and (ii) a level, (b) an adjustable mount coupled with the camera, and (c) an alignment control system for automatically adjusting the mount to align the camera with respect to the line.

(G2) In the system denoted as (G1), the line may be a finish line of a race.

(G3) In the systems denoted as (G1) and (G2), the camera may further include a time delay integration module for processing images captured by the area scan image sensor to generate a time delay integration image.

(G4) In the system denoted as (G3), the area scan image sensor may be the area scan image sensor of any one of the systems denoted as (A1) through (A26).

(G5) In the systems denoted as (G3) and (G4), the time delay integration module may be the time delay integration module of any one of the systems denoted as (A1) and (A26).

(H1) A system for processing event timing images may include (a) a camera comprising an image sensor for capturing images and a video generator for generating scoreboard type video, and (b) a data processing module, communicatively coupled with the camera, for generating results data from images received from the camera and communicating the results data to the video generator.

(H2) The system denoted as (H1), may further include a display for displaying the scoreboard-type video, wherein at least a portion of the scoreboard-type video is generated from the results data.

(H3) In the system denoted as (H1) and (H2), the camera may include a time delay integration module, communicatively coupled with the image sensor, for processing images captured by the image sensor to generate time delay integration images.

(H4) In the system denoted as (H3), the time delay integration module may be the time delay integration module of any one of the systems denoted as (A1) through (A26).

(H5) In the systems denoted as (H1) through (H4), the image sensor may be an area scan image sensor and the images may be two-dimensional area scan images.

(I1) A software product includes instructions, stored on non-transitory computer-readable media, wherein the instructions, when executed by a computer, perform steps for processing sequential digital two-dimensional images of a scene comprising a moving object to form a time delay integration image, wherein the software product may include: (a) instructions for segmenting at least of portion of each of the sequential digital two-dimensional images into input lines, and (b) instructions for populating each line of the time delay integration image with an integral over a plurality of input lines, wherein each of the plurality of input lines being selected from a different one of the sequential digital two-dimensional images to substantially match the movement of the moving object in a direction perpendicular to the input lines.

(I2) In the software product denoted as (I1), the instructions for processing sequentially captured digital two-dimensional images may further include instructions for adjusting the number of input lines to adjust brightness of the time delay integration image.

(I3) In the software product denoted as (I2), the instructions for adjusting the number of input lines may include instructions for independently adjusting, for each pixel of the time delay integration image, the number of input lines to locally adjust the brightness of the time delay integration image.

(I4) In the software product denoted as (I3), the number of input lines may be non-integer for at least a portion of the time-delay integration image.

(I5) In the software products denoted as (I1) through (I4), the sequential digital two-dimensional images may be color images.

(I6) In the software product denoted as (I5), the instructions for processing the sequential digital two-dimensional images may further include instructions for increasing resolution of the time delay integration image by including crossover pixels formed by combining photosite signals from sequentially captured two-dimensional images.

(I7) The software products denoted as (I1) through (I6) may be implemented in any one of the systems denoted as (A1) through (A26).

(J1) A software product includes instructions, stored on non-transitory computer-readable media, wherein the instructions, when executed by a computer, perform steps for processing a plurality of input images associated with a respective plurality of input times, the input images and input times being provided by an event timing system, wherein the instructions may include: (a) instructions for selecting an output frame rate, (b) instructions for generating a plurality of output images, corresponding to the output frame rate, from the plurality of input images, and (c) instructions for assigning to each output image a final output time provided by the event timing system, wherein the final output time being the input time associated with an input image contributing to the output image.

(J2) In the software product denoted as (J1), the instructions for processing a plurality of input images may further include instructions for determining an initial output time series corresponding to the output frame rate, and the instructions for generating a plurality of output images may include instructions for setting each output image to equal an input image, when the initial output time is identical to an input time, and a weighted average of input images captured close to the initial output time, when the initial output time is not identical to an input time.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for increasing resolution of a time delay integration color image, comprising:
receiving a sequence of color images captured by an area scan color image sensor, each of the color images having color-pixel lines, each of the color-pixel lines comprising:
a first row of photosite values obtained from a corresponding row of first-type and second-type photosites of the area scan color-image sensor; and
a second row of photosite values obtained from a corresponding row of second-type and third-type photosites of the area scan color-image sensor;
integrating a first series of rows into an integrated row, each of the first series of rows being the first row of one color-pixel line of a corresponding one of the sequence of color images;
integrating a second series of shifted rows into an integrated shifted row, each of the second series of shifted rows being the second row of one color-pixel line of a corresponding one of a shifted sequence of the color images;
combining the integrated row and the integrated shifted row into a line of crossover pixels; and
generating the time delay integration color image to include the line of crossover pixels.

2. The method of claim 1, further comprising outputting the time delay integration color image to an external processing system.

3. The method of claim 1, wherein:
the time delay integration color image alternates between even lines and odd lines; and
the line of crossover pixels is one of the odd lines.

4. The method of claim 3, further comprising:
integrating a third series of matched rows into an integrated matched row, each of the third series of matched rows being the second row of said one color-pixel line of the corresponding one of the sequence of color images; and
combining the integrated row and the integrated matched row into one of the even rows of the time delay integration color image.

5. The method of claim 1, wherein the sequence of color images and the shifted sequence of the color images are shifted by one color image.

6. The method of claim 1, wherein the sequence of color images was captured at a frame rate such that an image of an object moves across the area scan color image sensor at a rate of one line per frame.

7. The method of claim 1, the first-type photosites being sensitive to red light, the second-type photosites being sensitive to green light, the third-type photosites being sensitive to blue light.

8. The method of claim 1, wherein:
the sequence of color images alternate between even-numbered images and odd-numbered images;
each of the first series of rows is the first row of one color-pixel line of a corresponding one of the even-numbered images; and
each of the second series of shifted rows is the second row of one color-pixel line of a corresponding one of the odd-numbered images.

9. The method of claim 8, wherein the sequence of color images was captured at a frame rate such that an image of an object moves across the area scan color image sensor at a rate of half a line per frame.

10. A system for increasing resolution of a time delay integration color image, comprising:
an area scan color image sensor configured to capture a sequence of color images, each of the color images having color-pixel lines, each of the color-pixel lines comprising:
a first row of photosite values obtained from a corresponding row of first-type and second-type photosites of the area scan color-image sensor; and
a second row of photosite values obtained from a corresponding row of second-type and third-type photosites of the area scan color-image sensor; and
image processing circuitry configured to:
integrate a first series of rows into an integrated row, each of the first series of rows being the first row of one color-pixel line of a corresponding one of the sequence of color images;
integrate a second series of shifted rows into an integrated shifted row, each of the second series of shifted rows being the second row of one color-pixel line of a corresponding one of a shifted sequence of the color images;
combine the integrated row and the integrated shifted row into a line of crossover pixels; and
generate the time delay integration color image to include the line of crossover pixels.

11. The system of claim 10, further comprising an interface for outputting the time delay integration color image to an external processing system.

12. The system of claim 10, wherein:
the time delay integration color image alternates between even lines and odd lines; and
the line of crossover pixels is one of the odd lines.

13. The system of claim 12, the image processing circuitry being further configured to:
integrate a third series of matched rows into an integrated matched row, each of the third series of matched rows being the second row of said one color-pixel line of the corresponding one of the sequence of color images; and
combine the integrated row and the integrated matched row into one of the even rows of the time delay integration color image.

14. The system of claim 10, the area scan color image sensor being configurable to capture the sequence of color images at a frame rate such that an image of an object moves across the area scan color image sensor at a rate of one line per frame.

15. The system of claim 10, the first-type photosites being sensitive to red light, the second-type photosites being sensitive to green light, the third-type photosites being sensitive to blue light.

16. The system of claim 10, wherein:
the sequence of 2D color images alternate between even-numbered images and odd-numbered images;
each of the first series of rows is the first row of one color-pixel line of a corresponding one of the even-numbered images; and
each of the second series of shifted rows is the second row of one color-pixel line of a corresponding one of the odd-numbered images.

17. The system of claim 16, the area scan color image sensor being configurable to capture the sequence of color images at a frame rate such that an image of an object moves across the area scan color image sensor at a rate of half a line per frame.

* * * * *